United States Patent
Wilding

(10) Patent No.: US 11,507,462 B2
(45) Date of Patent: Nov. 22, 2022

(54) WORKFLOWS FOR AUTOMATED OPERATIONS MANAGEMENT

(71) Applicant: salesforce.com, inc., San Francisco, CA (US)

(72) Inventor: Mark F. Wilding, Issaquah, WA (US)

(73) Assignee: salesforce.com, inc., San Francisco, CA (US)

( * ) Notice: Subject to any disclaimer, the term of this patent is extended or adjusted under 35 U.S.C. 154(b) by 418 days.

(21) Appl. No.: 16/702,095

(22) Filed: Dec. 3, 2019

(65) Prior Publication Data
US 2020/0174887 A1 Jun. 4, 2020

Related U.S. Application Data

(60) Provisional application No. 62/840,892, filed on Apr. 30, 2019, provisional application No. 62/774,811, filed on Dec. 3, 2018.

(51) Int. Cl.
*G06F 11/14* (2006.01)
*G06F 8/60* (2018.01)
(Continued)

(52) U.S. Cl.
CPC .......... *G06F 11/1405* (2013.01); *G06F 8/60* (2013.01); *G06F 9/4881* (2013.01); *G06F 9/541* (2013.01);
(Continued)

(58) Field of Classification Search
CPC .......... G06F 11/1405; G06F 11/1407
See application file for complete search history.

(56) References Cited

U.S. PATENT DOCUMENTS

| | | |
|---|---|---|
| 5,701,488 A | 12/1997 | Mulchandani et al. |
| 6,320,867 B1 | 11/2001 | Bellenger et al. |

(Continued)

OTHER PUBLICATIONS

Du et al., "Vulnerability Testing of Software System Using Fault Injection," published Apr. 6, 1998; COAST Department of Computer Science, SERC Department of Computer Science; 20 pages.
(Continued)

*Primary Examiner* — Joseph R Kudirka
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to automated operations management. In various embodiments, a computer system accesses operational information that defines commands for an operational scenario and accesses blueprints that describe operational entities in a target computer environment related to the operational scenario. The computer system implements the operational scenario for the target computer environment. The implementing may include executing a hierarchy of controller modules that include an orchestrator controller module at a top level of the hierarchy that is executable to carry out the commands by issuing instructions to controller modules at a next level. The controller modules may be executable to manage the operational entities according to the blueprints to complete the operational scenario. In various embodiments, the computer system includes additional features such as an application programming interface (API), a remote routing engine, a workflow engine, a reasoning engine, a security engine, and a testing engine.

16 Claims, 28 Drawing Sheets

(51) Int. Cl.
  *G06F 9/48* (2006.01)
  *G06F 9/54* (2006.01)
  *G06F 11/36* (2006.01)
  *G06F 21/51* (2013.01)
  *G06F 21/54* (2013.01)
(52) U.S. Cl.
  CPC ...... *G06F 11/3664* (2013.01); *G06F 11/3692* (2013.01); *G06F 21/51* (2013.01); *G06F 21/54* (2013.01)

(56) References Cited

U.S. PATENT DOCUMENTS

| | | | |
|---|---|---|---|
| 6,601,082 | B1 | 7/2003 | Durham et al. |
| 7,082,553 | B1 | 7/2006 | Wang |
| 7,085,814 | B1 | 8/2006 | Gandhi et al. |
| 8,014,756 | B1 | 9/2011 | Henderson |
| 8,396,665 | B2 | 3/2013 | Siereveld et al. |
| 8,997,088 | B2 | 3/2015 | Gurikar et al. |
| 9,239,715 | B1 * | 1/2016 | Jaisinghani ............ H04L 67/34 |
| 9,286,060 | B2 | 3/2016 | Fiebig et al. |
| 9,588,685 | B1 * | 3/2017 | Watson ................ G06F 3/0655 |
| 9,753,826 | B2 | 9/2017 | Deng et al. |
| 9,825,823 | B2 | 11/2017 | Maes et al. |
| 10,044,522 | B1 | 8/2018 | Shamis et al. |
| 10,382,275 | B1 | 8/2019 | Stickle et al. |
| 10,509,680 | B2 * | 12/2019 | Kumar ................. G06F 9/4881 |
| 10,719,414 | B2 * | 7/2020 | Giannetti ............. G06F 9/4881 |
| 10,908,967 | B2 | 2/2021 | Schmidt et al. |
| 10,951,661 | B1 | 3/2021 | Medan et al. |
| 11,144,363 | B1 * | 10/2021 | Francis Conde ..... G06F 9/4843 |
| 11,212,286 | B2 | 12/2021 | Schmitt et al. |
| 2004/0049509 | A1 | 3/2004 | Keller et al. |
| 2005/0097595 | A1 | 5/2005 | Lipsanen et al. |
| 2005/0169185 | A1 | 8/2005 | Qiu et al. |
| 2005/0234931 | A1 | 10/2005 | Yip et al. |
| 2006/0037000 | A1 | 2/2006 | Speeter et al. |
| 2006/0195822 | A1 | 8/2006 | Beardslee et al. |
| 2006/0271825 | A1 | 11/2006 | Keaffaber et al. |
| 2009/0019420 | A1 | 1/2009 | Johnson |
| 2009/0172670 | A1 | 7/2009 | Bobak et al. |
| 2010/0042659 | A1 | 2/2010 | Rose |
| 2011/0040836 | A1 | 2/2011 | Allen et al. |
| 2011/0125932 | A1 | 5/2011 | Oh et al. |
| 2011/0302132 | A1 * | 12/2011 | Muthuvelu ............ G06Q 10/06 707/607 |
| 2012/0124553 | A1 | 5/2012 | Eschenroeder et al. |
| 2012/0173825 | A1 | 7/2012 | Ehrlich et al. |
| 2012/0290706 | A1 | 11/2012 | Lin et al. |
| 2013/0232463 | A1 | 9/2013 | Nagaraja et al. |
| 2014/0143422 | A1 | 5/2014 | Joseph et al. |
| 2014/0165060 | A1 | 6/2014 | Muller et al. |
| 2014/0201218 | A1 | 7/2014 | Catalano et al. |
| 2014/0380308 | A1 | 12/2014 | Hassine et al. |
| 2015/0081243 | A1 | 3/2015 | Ganai et al. |
| 2015/0180734 | A1 | 6/2015 | Maes et al. |
| 2015/0378743 | A1 | 12/2015 | Zellermayer et al. |
| 2016/0019043 | A1 | 1/2016 | Ramasamy |
| 2016/0065417 | A1 | 3/2016 | Sapuram et al. |
| 2016/0239595 | A1 | 8/2016 | Maes et al. |
| 2016/0255095 | A1 | 9/2016 | Maes |
| 2017/0024299 | A1 | 1/2017 | Deng et al. |
| 2017/0039046 | A1 | 2/2017 | Henke et al. |
| 2017/0041189 | A1 | 2/2017 | Aswathanarayana et al. |
| 2017/0161028 | A1 | 6/2017 | Wood et al. |
| 2017/0192772 | A1 | 7/2017 | Islam et al. |
| 2017/0337099 | A1 | 11/2017 | Raghavendra et al. |
| 2017/0351528 | A1 | 12/2017 | Kono |
| 2017/0351535 | A1 | 12/2017 | Mao et al. |
| 2018/0060184 | A1 | 3/2018 | Thakkar et al. |
| 2018/0060202 | A1 | 3/2018 | Papak et al. |
| 2018/0142638 | A1 | 5/2018 | Jalel |
| 2018/0145884 | A1 | 5/2018 | Stefanov et al. |
| 2018/0165071 | A1 | 6/2018 | Raghavan et al. |
| 2018/0203963 | A1 | 7/2018 | Eghbal et al. |
| 2018/0322556 | A1 | 11/2018 | Padmanabh et al. |
| 2018/0329981 | A1 | 11/2018 | Gupte et al. |
| 2019/0044790 | A1 | 2/2019 | Dickens et al. |
| 2019/0114168 | A1 | 4/2019 | Lee et al. |
| 2019/0114200 | A1 | 4/2019 | Lee et al. |
| 2019/0190778 | A1 | 6/2019 | Easterling et al. |
| 2019/0243665 | A1 | 8/2019 | Bolik et al. |
| 2019/0334909 | A1 | 10/2019 | Schmitt et al. |
| 2020/0059495 | A1 | 2/2020 | Karame et al. |

OTHER PUBLICATIONS

Aidemark et al., Goofi, "Generic Object-Oriented Fault Injection Tool," published 2001 source: IEEE; pp. 83-88.
International Search Report and Written Opinion in Appl. No. PCT/US2019/064021 dated Feb. 25, 2020, 13 pages.
International Search Report and Written Opinion in Appl. No. PCT/US2019/064023 dated Mar. 26, 2020, 16 pages.
International Search Report and Written Opinion in Appl. No. PCT/US2019/064025 dated Apr. 2, 2020, 16 pages.
What is Kubernetes; page last modified on Nov. 25, 2019; https://kubernetes.io/docs/concepts/overview/what-is-kubernetes/; 7 pages. [Retrieved Dec. 3, 2019].
Concepts—Spinnaker; https://www.spinnaker.io/concepts/; 5 pages. [Retrieved Dec. 3, 2019].
Ed-douibi, "Modeling Web APIs: your best choices", https://modeling-languages.com/modeling-web-api-com paring/; Jan. 2, 2016, 16 pages. [Retrieved Dec. 5, 2020].
Nguyen, et al., "Blueprinting Approach in Support of Cloud Computing," Future Internet, ISSN 1999-5903, 2012, 4, pp. 322-346.
Boue et al., "MEFISTO-L: A VHDL-Based Fault Injection Tool for the Experimental Assessment of Fault Tolerance," Digest of Papers. Twenty-Eighth Annual International Symposium on Fault-Tolerant Computing, Jun. 23-25, 1998, 6 pages.
Kalbarczyk et al., "Hierarchical Simulation Approach to Accurate Fault Modeling for System Dependability Evaluation," IEEE Transactions on Software Engineering, vol. 25, No. 5, Sep./Oct. 1999, pp. 619-632.

\* cited by examiner

| Permission 2102 | Subject 2104 | Actions 2106 | Parameters 2108 | Parameters 2108 | | |
|---|---|---|---|---|---|---|
| Rule 2100A { REJECT : | John | : * | : * | : * | # | Do not allow John to do anything |
| 2100B { ACCEPT : | Jan | : CREATE | : DB | : INSTANCE | # | Jan can create DB instances |
| 2100C { ACCEPT : | Jan | : TRANSITION | : DB_SERVER | : INSTANCE | # | ... and Jan can transition DB servers |
| ... | | | | | | |

Authorization Sheets 2020

*FIG. 21*

WORKFLOWS FOR AUTOMATED OPERATIONS MANAGEMENT

RELATED APPLICATIONS

The present application claims priority to U.S. Provisional Appl. No. 62/840,892, filed Apr. 30, 2019, and U.S. Provisional Appl. No. 62/774,811, filed Dec. 3, 2018; the disclosures of each of the above-referenced applications are hereby incorporated by reference herein in their entireties.

BACKGROUND

Technical Field

This disclosure relates generally to operations management for computer systems.

Description of the Related Art

Historically, managing systems, such as ensuring that a service or a platform is running and available, has involved carrying out various run lists (sequences of commands). Such run lists were typically long and time-consuming for a user to manually enter the commands of the run lists into a command line. Eventually, software scripts were written that traversed through the run lists, entering the commands instead of the user. Those software scripts, however, often crashed, leaving the managed system in an unknown state. As a result, users still had to become involved by determining the current state of the system and then resetting the system to a state where the software scripts could be run again. Moreover, since the system generally involved multiple subsystems, multiple run lists had to be maintained and carried out, each having their own steps and ways for managing the system.

BRIEF DESCRIPTION OF THE DRAWINGS

FIG. 21 is a block diagram illustrating example elements of an authorization sheet, according to some embodiments.

Figure 1:
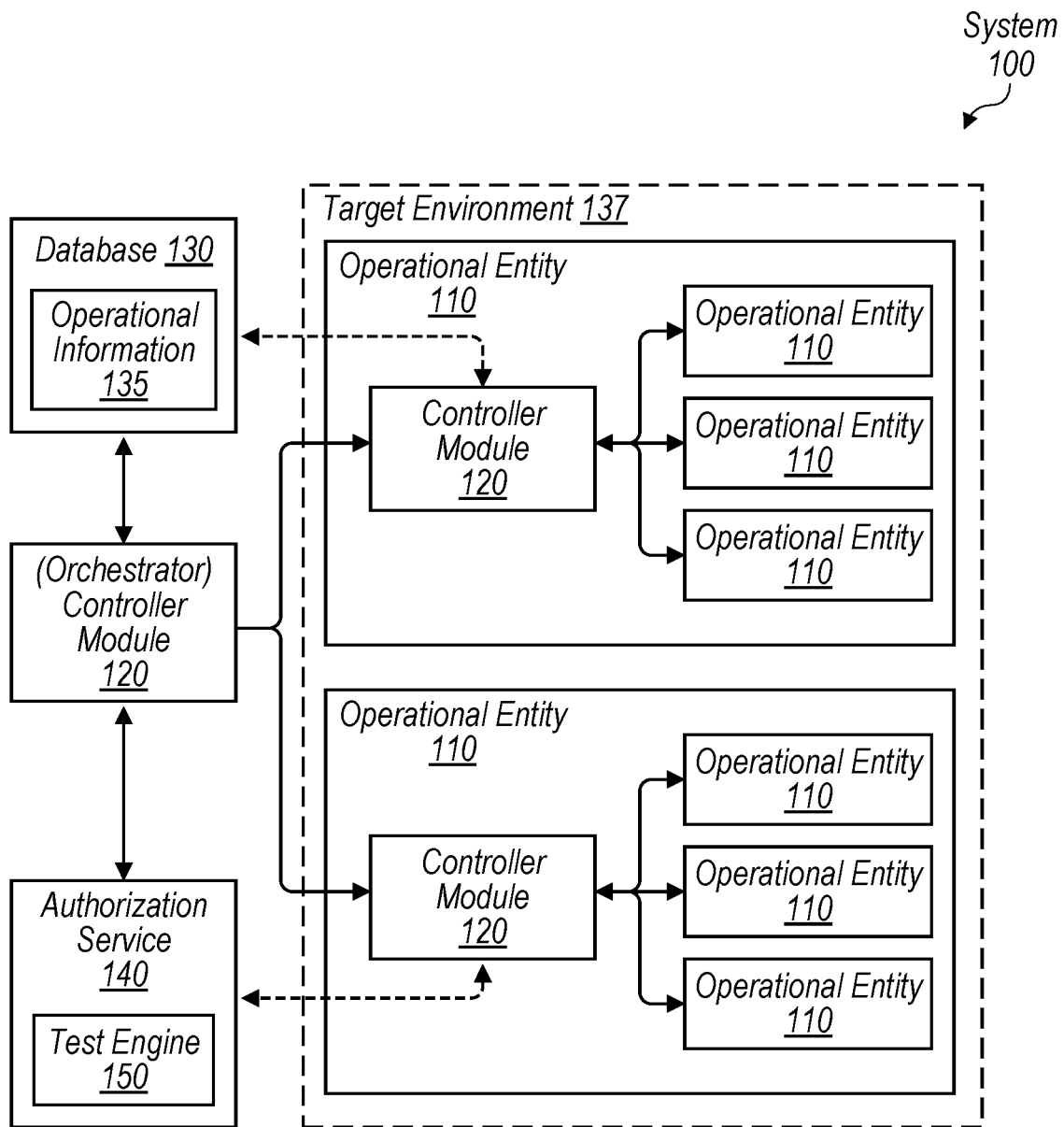
FIG. 1 is a block diagram illustrating example elements of a system capable of managing operational entities, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to"

perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Instead of using software scripts that enter commands from a run list, some developers have started to use large-scale deployment systems, such as Kubernetes®, for managing their systems. Kubernetes® provides a container-centric management environment for automating the deployment and management of containers, which are portable, self-sufficient units having an application and its dependencies. Accordingly, developers may use Kubernetes® to deploy containers that include database servers, for example. Kubernetes®, however, is deficient for managing an entire system for various reasons. Kubernetes® was designed to manage containers on top of worker nodes (e.g., virtual machines). For example, Kubernetes cannot be used to manage hardware or information entities, such as a logical database or a configuration specification. Kubernetes® does not provide visibility and/or control over everything within a container. For example, Kubernetes® cannot interface with a database server instantiated in a container. As a result, management objectives, such as starting up systems within a container, troubleshooting those systems, and gathering metadata on those systems, are not viable using Kubernetes® alone. Other approaches, such as Spinnaker®, share the same deficiencies with Kubernetes® as they lack the ability to control the full range of components that can be found within a system.

While managing systems has traditionally been terribly difficult, testing those systems or troubleshooting issues that occur has been equally difficult. As previously expressed, when a run list fails, it is usually difficult to discern the current state of the system as the run list does not provide information about the state that it left the system in before crashing. Additionally, there is generally a great deal of complexity within a system that has to be tested. As a result, parts of a system may not be tested if overlooked due to the complexity of the system and those parts that are tested may not be tested thoroughly enough.

The present disclosure describes techniques for managing systems that overcome some or all of the deficiencies of prior approaches. In various embodiments described below, the operational entities (e.g., database servers, logical databases, etc.) within a system are described in a formal, structured manner and are then subsequently managed by controller modules. Generally speaking, many of the operational entities within a system are either hardware or information stored on hardware. If an operational entity is solely a physical, tangible component of a system, then it is referred to within this disclosure as a "hardware entity." A physical server rack and a blade are examples of hardware entities. If an operational entity is not hardware, then it may consist of information—i.e., data that is stored on hardware. This information may either be executable or non-executable. Information that is executable by a system to perform operations is referred to within this disclosure as a "software entity." A database server instance, an alert server instance, and a metric server instance are examples of software entities. On the other hand, information within a system that is not executable is referred to within this disclosure as an "information entity" (or alternately, an "information-oriented entity"). A database backup image and a tenant construct that includes data for a tenant of a multi-tenant database are examples of information entities.

Those three entity types-hardware, software, and information—can be considered the "building blocks" for any operational entity that may be found within a system. For purposes of the present disclosure, any operational entity within a system can either be described using one of the three building block entity types, or using a combination entity type (or alternatively, a "formation") that includes two or more of these building blocks. One example of a formation entity may be an operational entity for a "database system" as the database system may include a processor and a storage medium (hardware entities), a database server (a software entity) that executes on that processor, and a logical database (an information entity) that is managed by that database server. Another example of a formation entity may be an operational entity for a "storage area network" as the storage area network may include storage mediums, network switches (which themselves might be formations of hardware and software entities), and data objects (information entities) that are stored on the storage mediums.

In various embodiments, the intended/expected state for a system is initially defined—the state that an operator of the system wishes the system to be in. Defining the intended state for a system may involve creating definitions and blueprints that define the various operational entities that make up the system along with the relationships between those operational entities. These definitions and blueprints may follow a common schema that provides a structured way to describe operational entities. As will be explained further, definitions and blueprints may convey information to a controller module that enables that controller module to manage the operational entities corresponding to the definitions and blueprints. For example, if a controller module is managing a database service operational entity, then the controller module may learn from a blueprint linked to that database service that the database service should include three running database servers. If the controller module observes that the database service includes only two running database servers, then the controller module may start a third database server to reach the intended state of that database service entity.

That transition from two running database servers to three running database servers can be viewed as a state transition of the system between two states. Accordingly, the operational management of a system can be viewed as or compared to a state machine in which the system can exist in and transition through different states. As mentioned, the definitions and blueprints may define the intended state for entities within the system and thus the system as a whole. In various embodiments, the controller modules of the system transition the system from one state to another state until the system arrives at the intended state. The controller modules may then continue monitoring the system to ensure that the system remains in the intended state. If the system leaves the intended state (e.g., an entity crashes), the controller modules may implement one or more commands to move the system back to the intended state by issuing instructions to components within the system. In some cases, a command may be written in a manner that allows for it be read by a user (i.e., a human-readable command) and thus a controller module may translate that command into an instruction understandable by components in the system; in some cases, a command may be the understandable instruction and thus a controller module may not have to translate it—the controller module may issue the command as the instruction to a component. As used herein, the term "component" is intended to encompass operational entities and controller modules. Thus, the term "component" can refer to an operational entity or a controller module.

To facilitate transitions between states of the system, in various embodiments, a control application programming interface (API) is implemented that provides a way to understand the current state of the system and to make changes to the system if and when needed. The control API may provide structured access to the operational entities in a system through a set of API calls that provide a mechanism for learning about an operational entity's state and for invoking functionality supported by that operational entity. In various embodiments, controller modules host the control API and thus enable users and/or other controller modules to have access to the operational entities managed by those controller modules via the control API.

In various embodiments, the controller modules and the operational entities in a system may form a hierarchy where an orchestrator controller module may reside at the top level of the hierarchy and may issue instructions (which may include control API calls) down through the hierarchy to controller modules and operational entities that reside in lower levels. As an example, the orchestrator controller module may receive, from a user via a command line tool, a command pertaining to a particular entity. Accordingly, the orchestrator controller module may route an instruction (that is based on the command) through the levels of the hierarchy to the managing controller module that may implement the instruction by making an appropriate control API call to the particular entity. That call may cause the particular operational entity to transition to another state.

This paradigm permits operational scenarios to be implemented. Broadly speaking, the term "operational scenario" is used herein to refer to a sequence of steps used to perform some action. For example, one operational scenario might include starting up a database service and another operational scenario might include updating a database service. Operational scenarios may be implemented using a workflow that includes an ordered set of commands, which may be carried out via a set of control API calls. For example, a workflow for updating a database service might include a command for transitioning operational entities of the database service from "online" to "offline," a command for transitioning them from their current version to the updated version, and a command for transitioning them from offline back to online. In some embodiments, the orchestrator controller module accesses workflow information and issues instructions based on the workflow information down through the hierarchy to make changes to the appropriate operational entities in order to complete the corresponding workflow.

An operational scenario may alternatively be implemented by defining a set of intended states for the appropriate entities. An orchestrator controller module may then determine, from the set of intended states, commands for reaching those states. For example, an intended state (or goal) might be to have a running database service that includes three database servers. Thus, an orchestrator controller module may generate commands having control API calls for starting up three database servers. This process can be referred to as the orchestrator "reasoning" about the intended state. This reasoning thus allows a user, in some instances, to define a goal without having to articulate the specific steps or actions needed to achieve that goal, which may instead be determined by "reasoning" performed by the orchestrator. In some cases, this approach may be more robust than defining workflows since the system might end up in an intended state on its own (e.g., the disappearance of a container might fulfill the intended state of not having that container).

These techniques may be advantageous over prior approaches as these techniques allow for entire systems to be described and then managed in an automated manner. Prior approaches such as Kubernetes® allow for containers to be defined and instantiated, but do not provide a mechanism for controlling the full range of components in a system (e.g., hardware, software within a container, information constructs such as logical databases, etc.). Additionally, these techniques allow for the intended state of a system to be defined and thus allow for the system to be controlled in an automated fashion that reduces reliance on human intervention to manage the system. That is, controller modules within the system may continually monitor the system to ensure that the system is in the intended state. If the system changes to a different, undesired state, controller modules may transition the system back to the intended state without human intervention in many cases. This automated fashion can reduce the number of humans involved in managing the system. Moreover, the use of a common format for describing entities may simplify operations, increase the ability to test operational scenarios, and reduce the amount of code needed to manage software in a production environment. These techniques may further be applied to mutable deployments, in which the deployment can be changed (e.g., by adding a set of nodes to a pool of application servers) without recreating that entire deployment, and to immutable deployments (e.g., where an entire deployment is recreated for each change to the deployment). These techniques also provide integrated fault testing (versus having to use a completely separate tool), integrated security, and integrated troubleshooting.

Turning now to FIG. 1, a block diagram of a system 100 is depicted. In the illustrated embodiment, system 100 includes operational entities 110, controller modules 120 (including an orchestrator controller module 120), a database 130, and an authorization service 140. Also as illustrated, database 130 includes operational information 135 and authorization service 140 includes a test engine 150. In some embodiments, system 100 may be implemented differently than shown. As an example, system 100 may include multiple orchestrator controller modules 120, another level of operational entities 110 and/or controller modules 120, multiple databases 130, etc.

An operational entity 110, in various embodiments, includes one or more elements and a collection of information relating to those elements. Examples of elements may include, for example, a physical processor, physical memory, a virtual machine, a virtual machine image, a logical database, a database snapshot, a container, a container image, a database service, an operating system, a workflow, a database center, a network boundary/domain, etc. As discussed earlier, there are three basic types of operational entities 110: hardware entities 110, software entities 110, and information entities 110. An operational entity 110's type, in various embodiments, is dependent on what elements make up that operational entity. For example, an operational entity 110 that includes only a physical processor is considered a hardware entity 110. These three basic types may be used to make formation operational entities 110. A formation entity 110 is a collection of two or more entities, each with zero or more relationships with the other entities. An example of a formation entity 110 is a database system entity 110 that includes a processor and a storage medium (hardware entities 110), a database server (a software entity 110) executing on that processor, and a logical database (an information entity 110) managed by that database server.

An operational entity 110 may include or be associated with a collection of information that describes that operational entity. The information may include: a definition that may define what elements and variables can be used to make up a particular species of operational entity 110; and a blueprint that may define an instance of that species of operational entity 110. For example, a definition may define a database service entity 110 as including database server entities 110 while a blueprint may define a particular database service entity 110 as including 15 database server entities 110. In various embodiments, the information that is associated with an operational entity 110 further defines functions of a control API. Such information may be used by a controller module 120 to learn about what functions may be called for an operational entity 110 to manage that operational entity, such as by transitioning that operational entity to different states.

A controller module 120, in various embodiments, is a set of software routines that are executable to manage a set of operational entities 110 and/or controller modules 120. In some embodiments, controller modules 120 are defined in a generic manner such that each controller module 120 in system 100 supports the same functionality, although they may serve in different roles within system 100. Controller modules 120 may also work in a variety of environments, including bare metal, Amazon Web Services® (AWS), and Kubernetes®. For example, in a Kubernetes® environment, a controller module 120 may serve as a Kubernetes® operator that interacts with other controller modules 120 that are within database containers. On AWS, the AWS cloud may be defined as an operational entity 110 that dispenses virtual machines entities 110. Inside each virtual machine entities 110 may be a controller module 120 that manages the contents (operational entities 110) of that virtual machine entity.

In order to manage operational entities 110 and/or controller modules 120, a controller module 120 may have access to a control API for each operational entity 110 under its control or authority. In various cases, the control API calls of the control API may be identical for all operational entities 110, although the implementation of the functions for those control API calls may be different between operational entities 110. Through issuing control API calls, a controller module 120 may obtain information pertaining to an operational entity 110 (e.g., a blueprint) and may transition that operational entity between states. As an example, a controller module 120 may send a "transition" control API call to a database server entity 110 to transition the database server element from offline to online.

In various embodiments, a controller module 120 maintains information relating to the operational entities 110 and/or controller modules 120 managed by that controller module. In some cases, when initiated, a controller module 120 may access a properties file that provides initial information to that controller module 120; such information may identify a port number to listen on and any operational entities 110 that are under the control of the controller module 120. The information maintained by a controller module 120 may also include information that is gathered from operational entities 110, such as blueprints, definitions, and advertised control API calls that are supported by those operational entities.

As mentioned earlier, operational entities 110 and controller modules 120 may form a hierarchy. The controller module 120 at the top of that hierarchy is referred to as an orchestrator controller module. The orchestrator controller module 120 may be tasked with implementing a high-level goal and thus may orchestrate other controller modules 120 in other levels of the hierarchy to achieve that goal. As an example, an orchestrator controller module 120 might be tasked with updating an entire database fleet entity 110. As a result, the orchestrator controller module 120 may coordinate the update of each database cluster entity 110 within the database fleet entity 110. This may leverage other controller modules 120 that manage the operational entities 110 within those database cluster entities 110. Those controller modules 120, however, may hide the details of what happens in updating those database cluster entities 110 from the orchestrator controller module 120. In some embodiments, system 100 may include multiple hierarchies, each of the hierarchies may include their orchestrator controller module 120.

Database 130, in various embodiments, is a collection of information that is organized in a manner that allows for access, storage, and manipulation of the information. Database 130 may be implemented by a single storage device or multiple storage devices that are connected together on a network, such as a storage attached network, and configured to redundantly store information in order to prevent data loss. Database 130 may include supporting software that permits controller modules 120 to perform operations (e.g., accessing, storing, manipulating, etc.) on information in database 130. In various embodiments, database 130 stores definitions, blueprints, operational information 135, and/or other information that pertain to the operational entities 110 within system 100. When managing an operational entity 110, a controller module 120 may access information from database 130 so that it may properly manage that operational entity.

Operational information 135, in various embodiments, is a collection of information defining operational scenarios for target environments 137. As noted, an operational scenario is a sequence of steps used to perform some action (or high-level goal). In some embodiments, operational scenarios are defined in workflow documents, where a given workflow document may specify a set of commands for implementing the sequence of steps for the corresponding operational scenario. A given operational scenario may be associated with a target environment 137 such that the operational scenario may change a state of that target environment.

Target environment 137, in various embodiments, is a group of operational entities 110 and/or controller modules 120 that may be operated on as part of an operational scenario. For example, in an operational scenario that updates a database fleet entity 110 to a newer version, the database fleet entity 110 (including all its operational entities 110 and controller modules 120) is considered the target environment 137 of that operational scenario. Another operational scenario might involve a different target environment 137 having different operational entities 110 and/or controller modules 120.

Authorization service 140, in various embodiments, is operable to protect system 100 from inappropriate use (whether it is malicious or non-malicious) by authenticating ("who is trying to change state?"), authorizing ("are they allowed to change state?"), and auditing (recording the outcomes for the authenticating and authorizing) commands being issued to controller modules 120 and/or operational entities 110. For example, service 140 may audit commands issued by a user to orchestrator controller module 120 in order to prevent performance of any unauthorized issued commands. Service 140 may also audit commands issued by orchestrator controller module 120 to other controller modules 120 (or other controller modules 120 to operational entities 110) in order to ensure a user has not attempted to gain authorized access by circumventing orchestrator controller module 120. As will be discussed below with respect to FIGS. 20-23, in various embodiments, authorization service 140 maintains a set of security rules defining permissible actions for implementing various operational scenarios within a target computing environment and verifies that issued commands comply with the permissible actions defined by the set of security rules.

Test engine 150, in various embodiments, is a test component operable to inject fault conditions into a system 100 in order to identify states in which system 100 fails to function properly. In general, these faults may pertain to crashes, hangs, errors, lock-step ordering issues, time injection, etc. For example, test engine 150 may disable a database server being used by system 100 to see if such an action places system 100 in a state in which it is unable to recover. As will be described in greater detail below in conjunction with FIGS. 24 and 25, in various embodiments, test engine 150 interfaces with one or more controller modules 120 and/or operational entities 110 in order to determine the current state of system 100. For example, test engine 150 may collect information about the current state of system 100 before injecting a fault condition and then collect information about the current state after the injection in order to determine how the state of system 100 has been altered. In some embodiments, test engine 150 may also monitor the state of system 100 in order to inject particular fault conditions when particular commands are being issued by controller modules 120. That is, as requests flow through authorization service 140, test engine 150 may use this point in the architecture for coordinating fault injections (e.g., before a change, after a change, and during a change). For example, test engine 150 may determine, from a request being processed by authorization service 140, that an operational entity 110 is undergoing an update and then may attempt to inject a fault condition, which may result in the update failing, in order to determine whether system 100 is able to handle a fault condition during the update process. In the illustrated embodiment, test engine 150 is shown as being integrated into authorization service 140 as such integration may allow test engine 150 to have greater insight into the current state of system 100 when various components ask service 140 for permission to perform various actions. In some embodiments, an external test system may interact with test engine 150 to orchestrator changes and inject faults into system 100.

Figure 2:
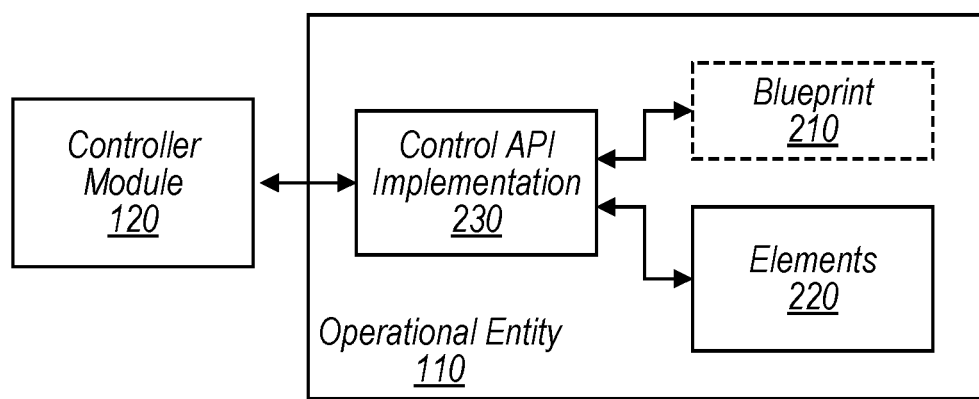
FIG. 2 is a block diagram illustrating example elements of an operational entity, according to some embodiments.

Turning now to FIG. 2, a block diagram of an operational entity 110 is depicted. In the illustrated embodiment, operational entity 110 includes a blueprint 210, one or more elements 220, and a control API implementation 230. As shown, operational entity 110 interfaces with a controller module 120. In some embodiments, operational entity 110 may include a controller module 120 that interfaces with an external controller module 120. As an example, operational entity 110 may be a software container having a controller module 120 that communicates with an orchestrator controller module 120. In some embodiments, operational entity 110 may be implemented differently than shown—e.g., blueprint 210 may be stored at database 130 instead of operational entity 110 (or it might be stored at both entity 110 and database 130).

As explained earlier, in order to enable the operational entities 110 of system 100 to be managed, in various embodiments, the entities 110 may be described using blueprints 210 and definitions (which are discussed in more detail with respect to FIG. 3A) that contain information about the operational entities themselves and their relationships with other entities 110. Such information may convey, to controller modules 120, how different operational entities 110 may be managed.

Blueprint 210, in various embodiments, is a collection of information defining aspects of a specific implementation of an operational entity 110. Blueprint 210 may define a desired or intended state for an operational entity 110 that an administrator of system 100 wishes that operational entity 110 to exist in. For example, one particular blueprint 210 might describe a database fleet entity 110 as including 15 database servers while another particular blueprint 210 might describe a database fleet entity 110 as including 10 database servers. As discussed in greater detail with respect to FIGS. 3A-3D, in various embodiments, blueprint 210 includes an entity descriptor that may define values for a selected set of attributes that are usable to manage an operational entity 110, relationship information that may describe relationships between the operational entity 110 and other entities, and entity-specific variables that may be used for configuring the operational entity 110. A blueprint 210 for an operational entity 110 may be provided and/or altered by a user of system 100, a user who developed that entity (e.g., the user who wrote the software), a controller module 120, etc.—this may include any combination thereof. For example, a managing controller module 120 might alter version information in the entity descriptor when updating the corresponding operational entity 110 to a new version.

In various embodiments, blueprint 210 may be deployable to spawn an instance of the operational entity 110 that is defined by that blueprint. For example, an operator may provide a blueprint 210 for a database service entity 110— that blueprint may define the intended state of that database service entity as having 15 database servers. The controller module 120 that is responsible for deploying that blueprint may observe the state of system 100 to determine whether the database service entity 110 exists. If the database service entity 110 does not exist, then the managing controller module 120 may instantiate the database service entity 110 according to its blueprint 210—e.g., by communicating with certain operational entities 110 that are capable of spawning the 15 database servers.

In some instances, blueprints 210 may form a hierarchy where implementing a top level blueprint 210 may involve implementing lower level blueprints 210. Accordingly, a blueprint 210 might include references to other blueprints 210. Returning to the previous example, the blueprint 210 for the database service entity 110 may include a reference to a blueprint 210 for a particular implementation of a database server entity 110. As such, when instantiating the database service entity 110, the managing controller module 120 may look up the blueprint 210 for the database server entity 110 via the blueprint 210 of the database service entity 110 so that it can cause instantiation of the 15 database servers.

Elements 220, in various embodiments, include hardware (e.g., physical processors and memory), software (e.g., database servers), information constructs (e.g., logical databases), or any combination thereof (e.g., an element 220 might be an operational entity 110 that includes its own set of elements 220 that are hardware, software, and information constructs). Examples of elements 220 include, but are not limited to, a physical processor and memory, a top-of-rack network switch, an operating system, a virtual machine, a virtual machine image, a database server, a logical database, a database snapshot, a container, a container image, a workflow, a database center, a tenant snapshot, and a tenant. In various cases, a controller module 120 may interface with elements 220 via control API implementation 230.

Figure 7:
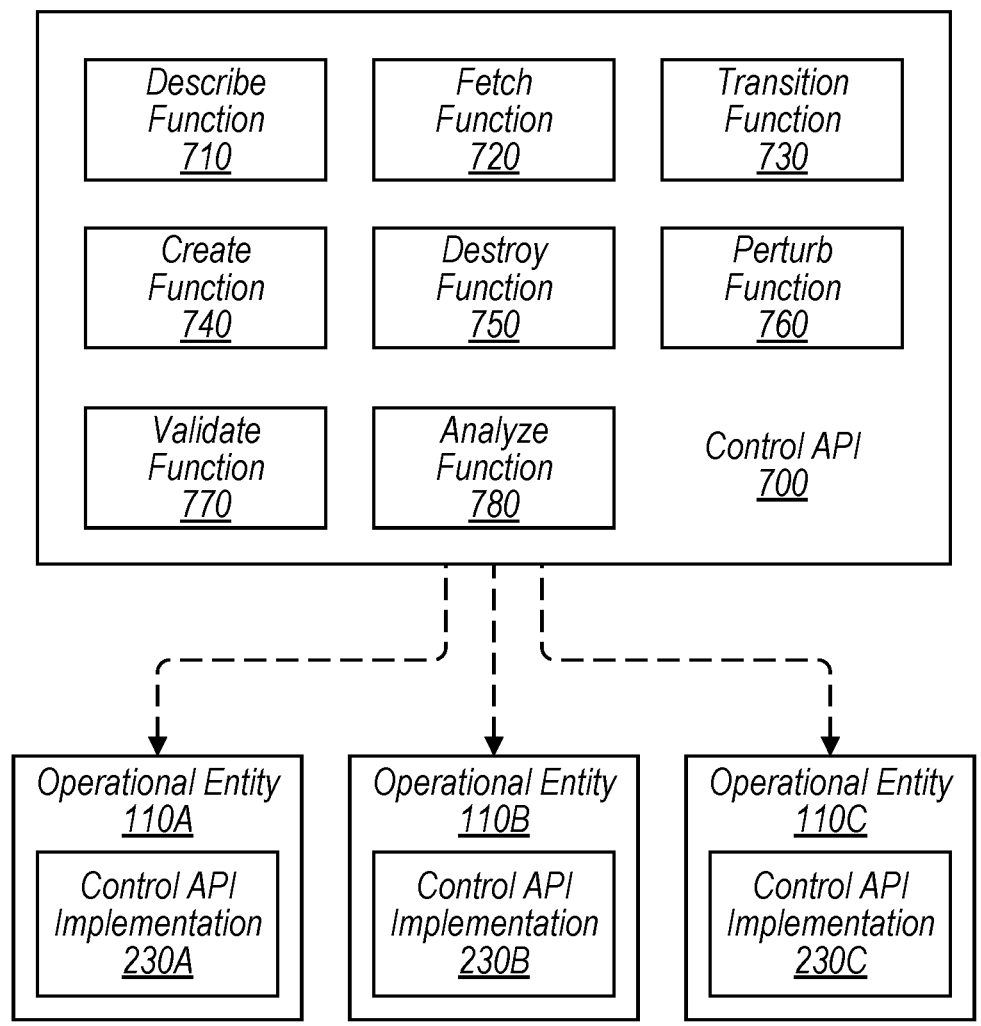
FIG. 7 is a block diagram illustrating example elements of a control API, according to some embodiments.

Control API implementation 230, in various embodiments, is a set of software routines executable to perform one or more functions of a control API (discussed in greater detail with respect to FIG. 7). Control API implementation 230 may serve as an interface between elements 220/blueprint 210 and a controller module 120. Consider an example in which the control API includes a "create" function and there exists a database server entity 110. That database server entity 110 may include a control API implementation 230 that defines, for that create function, a set of operations that creates a logical database entity 110. Accordingly, a controller module 120 that manages the database server entity 110 may issue a create function API call to invoke the logic of control API implementation 230 to create a logical database entity 110. Such logic may instruct a database server (an element 220) to create that logical database entity. In various embodiments, control API implementation 230 may be different between operational entities 110, where each operational entity 110 may uniquely implement one or more of the functions that are supported by the control API.

In various embodiments, control API implementation 230 is implemented as a wrapper that encapsulates and hides underlying complexity of an element 220. For example, a database server might include a service or command line tool responsible for starting and stopping the database server, and control API implementation 230 may sit on top of the service such that if a controller module 120 called a transition function of the control API to transition the database server to online, then control API implementation 230 may handle the communication with the database server's service to start the database server. The complexity of starting the database server may be hidden from a controller module 120—the controller module 120 may only have to make the appropriate control API call.

In some embodiments, an operational entity 110 may advertise, to a controller module 120, the functions of the control API that are implemented by control API implementation 230 and thus are invokable. In some cases, an operational entity 110 may advertise this information upon being instantiated; in other cases, this information might be advertised upon request by a controller module 120. For example, a controller module 120 may issue a "describe" function API call to an operational entity 110 to receive information about control API implementation 230. In some embodiments, a controller module 120 may be instantiated to include information about control API implementation 230 and may not have to communicate with an operational entity 110 to receive such information.

With knowledge about an operational entity 110's control API implementation 230, a controller module 120 may be able to process instructions. As an example, a controller module 120 may receive an instruction to create a logical database entity 110. That controller module 120 might be managing a database server entity 110 that advertises that it can create a logical database entity 110. As such, the controller module 120 may then issue a create function API call to that database server entity 110 to create a logical database entity 110. If, however, the information that is maintained by a controller module 120 indicates that an instruction cannot be processed as the managed operational entities 110 do not support the appropriate functions, then the controller module 120 may reject the instruction. In some cases, the controller module 120 may notify the issuing controller module 120 that the instruction has been or cannot be completed.

Figure 3A:
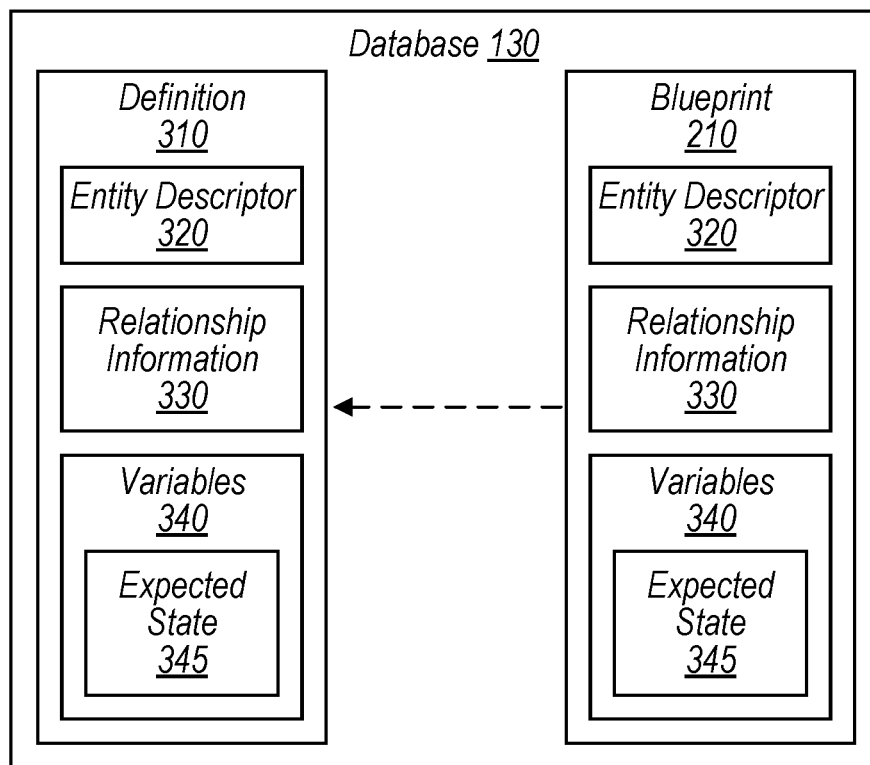
FIG. 3A is a block diagram illustrating example elements of a definition and a blueprint for an operational entity, according to some embodiments.

Turning now to FIG. 3A, a block diagram of a blueprint 210 and a definition 310 within database 130 is shown. In the illustrated embodiment, blueprint 210 and definition 310 both include an entity descriptor 320, relationship information 330, and variables 340 that include an expected state variable 345. In some embodiments, blueprint 210 and/or definition 310 may be implemented differently than shown. For example, blueprint 210 might correspond to more definitions 310 than one definition 310 as shown.

Definition 310, in various embodiments, is a collection of information that describes aspects of an operational entity 110. Similar to blueprint 210, definition 310 includes an entity descriptor 320, relationship information 330, and variables 340 as illustrated. In contrast to blueprint 210, definition 310 may not define a particular instance of an operational entity 110, but instead may describe what values may be included in a corresponding blueprint 210. That is, definition 310 may describe what blueprint 210 should look like. As an example, a definition 310 for a database fleet entity 110 might describe database fleets as including database server entities 110 while a corresponding blueprint 210 might define a particular database fleet entity 110 as including 15 database server entities 110. In various cases, definition 310 may be used to validate that a corresponding blueprint 210 is permitted. Continuing the previous example, if a blueprint 210 defines a certain database fleet entity 110 as including an application server entity 110 in addition to 15 database server entities 110, then that blueprint 210 may be rejected as the definition 310 of a database fleet entity 110 does not describe a database fleet entity 110 as including application server entities 110. In some embodiments, definition 310 may include a set of attributes with predefined values and a set of attributes whose values will be written in the corresponding blueprint 210 by a controller module 120 when that blueprint is deployed.

In some embodiments, blueprint 210 may correspond to multiple definitions 310. For example, a blueprint 210 for a particular platform service entity 110 may describe that platform service entity as having a database server entity 110 and an application server entity 110. As such, the blueprint 210 may be associated with a definition 310 for a database server entity 110 and a definition 310 for an application server entity 110. In various cases, a blueprint 210 may not be valid if it does not satisfy all the relationships specified by the definitions 310 associated with that blueprint. For example, the definition 310 for the application server entity 110 may describe the application server entity 110 as depending on a metric server entity 110. As such, the blueprint 210 of the previous example may not be valid unless it describes a metric server entity 110. Accordingly, blueprint 210 may describe how a set of operational entities 110 are put together to satisfy the relationships defined in the corresponding definitions 310.

Entity descriptor 320, in various embodiments, is a collection of information describing various attributes of a corresponding operational entity 110. These attributes may be the same across all operational entities 110, but the values given may differ between operational entities 110. For example, entity descriptor 320 may include a kind attribute that indicates whether an operational entity 110 is hardware, software, or information. Accordingly, an entity descriptor 320 for a processor entity 110 may indicate hardware while an entity descriptor 320 for a metric server entity 110 may specify software. In various embodiments, entity descriptor 320 conveys information to a controller module 120 about how a corresponding operational entity 110 may be managed. Continuing with the previous example, a controller module 120 may know that it cannot clone that processor entity 110 because its entity descriptor 320 specifies hardware for the kind attribute. The various attributes of entity descriptor 320 are discussed in greater detail with respect to FIG. 3B.

Relationship information 330, in various embodiments, is a collection of information that specifies the relationships between a particular operational entity 110 and other operational entities 110. The relationships between operational entities 110 may be defined using various attributes that may be common across all relationships, but whose values may differ between relationships. For example, relationship information 330 might include a "type" attribute for each relationship. The relationship information 330 for an application server entity 110 might specify that there is a "depend" type relationship between the application server entity 110 and a database server entity 110. Similar to entity descriptor 320, relationship information 330 may convey information to a controller module 120 about how a corresponding operational entity 110 may be managed. In various cases, the relationships between operational entities 110 may affect an order in which an operational scenario can be implemented—in which the commands that correspond to that operational scenario can be carried out. Continuing with the previous example, a controller module 120 might learn that the database server entity 110 ought to be instantiated before the application server entity 110 because the application server entity 110 depends on that database server entity 110. The various attributes of relationship information 330 are discussed in greater detail with respect to FIG. 3C.

Variables 340, in various embodiments, is a collection of additional information that is useful for managing a corresponding operational entity 110. As shown, variables 340 include an expected state variable 345. Expected state variable 345, in various embodiments, specifies the expected state of the corresponding operational entity 110. For example, the expected state variable 345 for a database server entity 110 might specify a value of "online." Variables 340 may be used to specify a current state, one or more service endpoints such as Internet Protocol (IP) ports, IP addresses, configuration variables, etc. For example, variables 340 may specify what persistent data stores that a particular database server entity 110 should use. In various embodiments, variables 340 may be hierarchical in nature. Variables 340 may further include attributes such as whether they will be defined on deployment or at another point in time. For example, an IP address variable 340 may be associated with an attribute indicating that the IP address variable 340 will be filled out during the deployment of the corresponding operational entity 110.

Figure 3B:
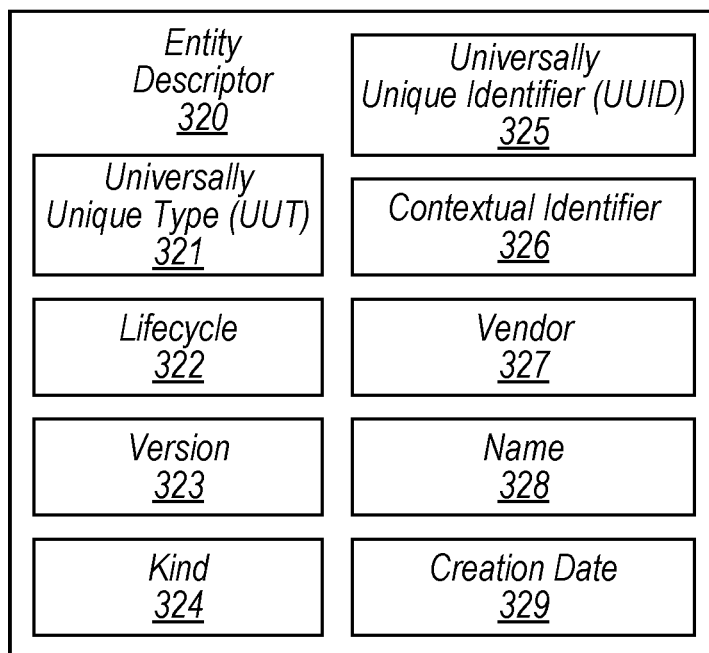
FIG. 3B is a block diagram illustrating example elements of an entity descriptor for an operational entity, according to some embodiments.

Turning now to FIG. 3B, a block diagram of an entity descriptor 320 is depicted. In the illustrated embodiment, entity descriptor 320 includes a universally unique type (UUT) 321, a lifecycle 322, a version 323, a kind 324, a universally unique identifier (UUI) 325, a contextual identifier 326, a vendor 327, a name 328, and a creation date 329. Entity descriptor 320 may include more or less information than illustrated. For example, entity descriptor 320 may not include name 328.

Universally unique type 321, in various embodiments, specifies a data value indicative of the type or species of an operational entity 110. Examples of UUTs 321 include, but are not limited to, "database server," "application server," "logical database," "physical host system," "database backup," "tenant," "workflow," "log extension," and "data extension." UUT 321, in some embodiments, may be used as a key for looking up a corresponding definition 310 and/or blueprint 210. For example, relationship information 330 might specify the operational entities 110 of a relationship using their UUTs 321. This may allow for a managing controller module 120 to access corresponding definitions 310 and blueprints 210 to obtain information that may be pertinent to managing those entities 110. As discussed in more detail with respect to FIG. 8, UUT 321 (with lifecycle 322 and version 323, in various cases) may further be used to route an instruction to a particular operational entity 110. Also, UUT 321 may be displayed to a user so that the user may understand what operational entities 110 are present within system 100.

Lifecycle 322, in various embodiments, specifies a data value indicative of the stage at which an operation entity 110 is within its lifecycle. Examples of lifecycle stages include, but are not limited to, specification, snapshot, and instance. For example, a database backup image may be the snapshot stage for a database. Lifecycle 322 may affect the types of operations that can be performed in respect to an operational entity 110. For example, when a database server entity 110 is in its instance stage, a controller module 120 may be able to instruct that database server entity to create a database backup image; however, if that database server entity 110 is in its specification stage, the controller module 120 may not instruct that database server entity to create the database backup image. In various embodiments, lifecycle 322 may be used with UUT 321 as a key for looking up a corresponding definition 310 and/or blueprint 210. In some embodiments, lifecycle 322 provides a path between different lifecycle stages and can be used to automate the pipeline of an operational entity 110, e.g., from source code to live production software through control API calls that transition that operational entity through states.

Version 323, in various embodiments, specifies a data value indicative of the version of an operational entity 110. For example, the version 323 of a particular database server entity 110 may specify version "3.2.4". Similar to lifecycle 322, version 323 may affect the types of operations that can be performed in respect to an operational entity 110. For example, a newer version of an operational entity 110 might include additional implementations for one or more of the functions of the control API. In some embodiments, version 323 may be used with both UUT 321 and lifecycle 322 as a key for looking up a particular definition 310 and/or blueprint 210.

Kind 324, in various embodiments, specifies a data value that is indicative of the form or manifestation (i.e., hardware, software, information, or a formation) of an operational entity 110. As with other attributes of entity descriptor 320, kind 324 may affect how an operational entity 110 can be managed by a controller module 120. As an example, if an operational entity 110 takes the form of software, then it may be cloneable; however, another operational entity 110 that takes the form of hardware may not be cloneable. In various embodiments, kind 324 affects what values can be used for the other attributes in entity descriptor 320. As an example, an operational entity 110 that takes the form of software may have a snapshot lifecycle stage, but an operational entity 110 that is hardware may not.

Universally unique identifier (UUID) 325, in various embodiments, specifies a data value that uniquely identifies an operational entity 110 independent of any other information specified by blueprint 210 or definition 310. As an example, a particular operational entity 110 may have a UUID 325 of "C7366F4-4BED-8BF0-BF281". UUID 325 may enable a particular operational entity 110 to be directly referenced by a controller module 120 or a user. This may remove ambiguity in situations where a controller module 120 manages multiple of the same type of operational entity 110 (e.g., two database server entities 110). As discussed in greater detail later, a given command may specifically identify an operational entity 110 using its UUID 325. As such, controller modules 120 may route a given command to the appropriate managing controller module 120 based on a UUID 325 that is identified by that command.

Contextual identifier (CID) 326, in various embodiments, specifies a data value that is indicative of a context associated with an operational entity 110. For example, CID 326 might specify an organization ID for the organization/tenant that is associated with the corresponding operational entity 110. In some embodiments, CID 326 may be used to associate metrics of an operational entity 110 with a particular tenant of system 100.

Vendor 327, in various embodiments, specifies a data value that identifies the vendor associated with an operational entity 110. Name 328, in various embodiments, specifies a data value that identifies a name for an operational entity 110, such as a product name, workflow name, tenant name, etc. Creation date 329, in various embodiments, specifies a data value that identifies the time when an operational entity 110 was created (e.g., in nanoseconds since the epoch UTC).

Figure 3C:
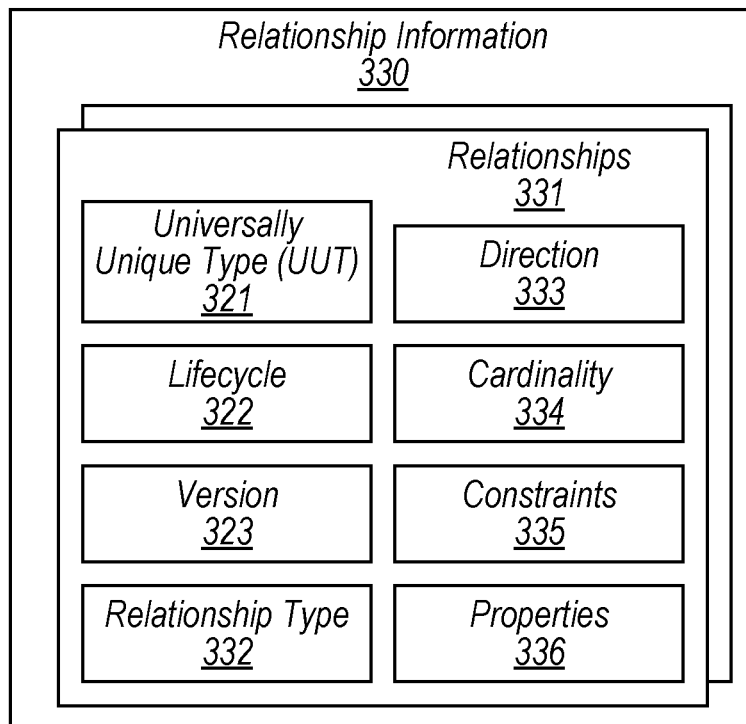
FIG. 3C is a block diagram illustrating example elements of relationship information for an operational entity, according to some embodiments.

Turning now to FIG. 3C, a block diagram of relationship information 330 is shown. In the illustrated embodiment, relationship information 330 includes relationships 331. As further illustrated, a relationship 331 includes a UUT 321, a lifecycle 322, a version 323, a relationship type 332, a direction 333, a cardinality 334, and properties 336. A relationship 331 may include more or less information than shown. For example, relationship 331 may not include version 323.

In many cases, the operational entities 110 within a system 100 may be related in some manner. As an example, an operational entity 110 that collects metric information from another operational entity 110 depends on the existence of that other entity. In various embodiments, the manner in which an operational entity 110 is managed by a controller module 120 depends on the relationships 331 that exist between that operational entity and other operational entities 110. As depicted, an entity's relationships 331 are defined in relationship information 330 and include multiple variables.

In order to identify the operational entities 110 that a particular operational entity 110 is related to, in various embodiments, a relationship 331 specifies a UUT 321, a lifecycle 322, and a version 323. For example, a controller module 120 may control a database server entity 110. Accordingly, a relationship 331 corresponding to the relationship between the controller module 120 and the database server entity 110 might specify a UUT 321 of "database server," a lifecycle 322 of "instance," and a version 323 of "3.21." In some embodiments, a relationship 331 may indicate UUIDs 325 that specifically identify the operational entities 110 associated with that relationship.

Relationship type 332, in various embodiments, specifies a data value indicative of the type of relationship between a certain operational entity 110 and one or more other operational entities 110. The types of relationships include, but are not limited to, a "host" relationship, a "control" relationship, a "depend" relationship, a "consist of" relationship, a "contained in" relationship, a "fraction" relationship, and a "provision" relationship. A host relationship, in various embodiments, is a relationship in which a particular operational entity 110 hosts one or more other operational entities 110. As an example, a database server entity 110 may host a logical database entity 110. A control relationship, in various embodiments, is a relationship in which a particular operational entity 110 controls one or more other operational entities 110. As an example, a controller module 120 may control a metric server entity 110 and a database server entity 110. A depend relationship, in various embodiments, is one in which a particular operational entity 110 depends on one or more other operational entities 110. As an example, a metric server entity 110 may depend on a database server entity 110 existing so that it might gather metrics. A "consist of" relationship, in various embodiments, is one in which a particular operational entity 110 consists of one or more other operational entities 110. As an example, a database service entity 110 may consist of two database server entities 110. A "contained in" relationship, in various embodiments, is one in which a particular operational entity 110 is contained in one or more other operational entities 110. As an example, a database server entity 110 may be contained in a container entity 110. A provision relationship, in various embodiments, is one that identifies one or more operational entities 110 that may be provisioned by a particular operational entity 110. As an example, a container environment entity 110 may provision (or instantiate) containers entities 110. In some embodiments, there may be an "I am" relationship where a particular operational entity 110 describes itself. For example, a database server entity 110 might have an "I am" relationship value of "database server."

Direction 333, in various embodiments, specifies a data value indicative of the direction of a relationship between a particular operational entity 110 and one or more other operational entities 110. Direction 333 may indicate if a particular operational entity 110 is subservient to another operational entity 110. Consider an example in which there is a relationship between a database server entity 110 and a logical database entity 110. The relationship 331 defined from the perspective of the database server entity 110 might specify a relationship type 332 of "host" and a direction 333 of "false." But the relationship 331 defined from the perspective of the logical database entity 110 may specify a relationship type 332 of "host" and a direction 333 of "true." The resulting interpretation of the two relationships 331 may be that the database server entity 110 hosts the logical database entity 110 and the logical database entity 110 is hosted by the database server entity 110. As another example, direction 333 may indicate that a controller module 120 controls a database server entity 110 (in that controller's relationship information 330) and that the database server entity 110 is controlled by that controller module (in that database server's relationship information 330).

Cardinality 334, in various embodiments, specifies a data value that is indicative of the number of operational entities 110 that are associated with a corresponding relationship type 332 (which may exclude the particular operational entity 110 for which the corresponding relationship 331 is defined). For example, a database service entity 110 may consist of three database server entities 110. As a result, cardinality 334 may specify a value of "3" for the relationship 331 between the database service entity 110 and the three database server entities 110 from the perspective of that database service entity.

Properties 335, in various embodiments, specify additional data values that are useful for managing a corresponding operational entity 110. Properties 335 may specify the protocol used by the related operational entities 110 to communicate, the status of the relationship that exist those operational entities, where those operational entities are located within system 100, etc. As an example, properties 335 may indicate that the operational entities 110 of a particular relationship are up and running. As the states of different relationships change within system 100, controller modules 120 may update relationship information 330 (e.g., update properties 335).

In a similar manner to the entity descriptor 320, in some embodiments, relationships 331 may convey information to a controller module 120 to help it understand how to manage operational entities 110. Consider an example in which a metric server entity 110 depends on a database server entity 110. A controller module 120 may determine, when wishing to start up the metric server entity 110, that the database server entity 110 needs to be started first as a result of the metric server entity 110 depending on the database server entity 110. Accordingly, a controller may use relationship information 330 along with the information from definitions 310 and blueprints 210 to reason about how to transition operational entities 110 between states (e.g., from offline to online). Relationship information 330 may, in various cases, be used to calculate the resource utilization of a system. For example, a container entity 110 may be contained by a host system entity 110—the container entity 110 thus uses a portion of that host system's resources. Similarly, the software that is contained within a container entity 110 uses a portion of that container's resources. This information may be useful for provisioning and automated capacity planning.

Figure 3D:
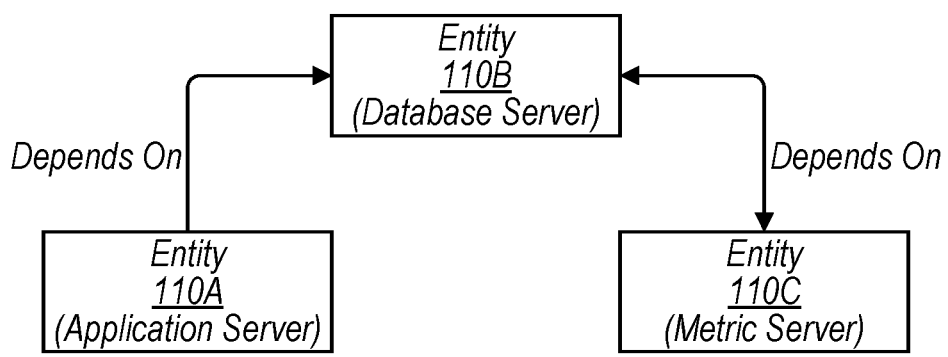
FIG. 3D is a block diagram illustrating example relationships between example operational entities, according to some embodiments.

Turning now to FIG. 3D, a block diagram of relationships between example operational entities 110 is shown. In the illustrated embodiment, operational entity 110A is an application server entity, operational entity 110B is a database server entity, and operational entity 110C is a metric server entity. As shown, operational entity 110B depends on operational entity 110A and there is a codependency between operational entities 110A and 110C. As discussed, the relationships between operational entities 110 may affect how controller modules 120 manage those operational entities. For example, when instantiating operational entities 110A-C, controller modules 120 may instantiate operational entity 110A before operational entity 110B as operational entity 110B depends on the existence of operational entity 110A.

Figure 4:
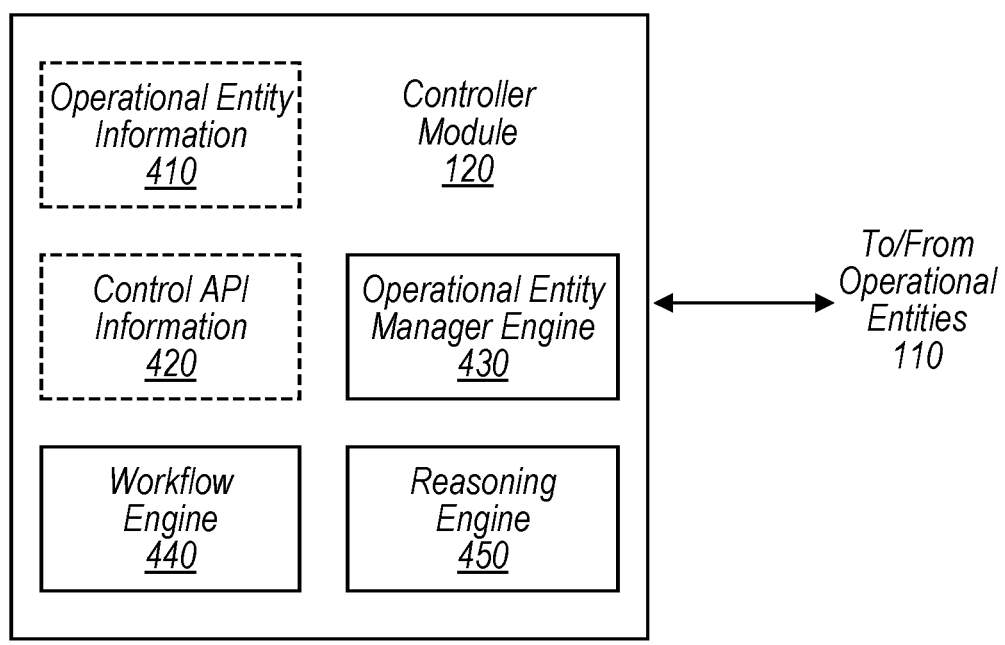
FIG. 4 is a block diagram illustrating example elements of a controller module, according to some embodiments.

Turning now to FIG. 4, a block diagram of a controller module 120 is shown. In the illustrated embodiment, controller module 120 includes operational entity information 410, control API information 420, an operational entity manager engine 430, a workflow engine 440, and a reasoning engine 450. In some embodiments, controller module 120 may be implemented differently than shown. For example, controller module 120 may not include reasoning engine 450.

As previously mentioned, controller module 120 may manage operational entities 110 and controller modules 120. To manage them, in various embodiments, controller module 120 maintains operational entity information 410 and control API information 420. In some cases, controller module 120 may maintain information 410 and 420 in a local storage; in other cases, it may maintain information 410 and 420 at database 130—this may enable controller module 120 to continue where it left off when it crashes as the local storage may not be persistent. That is, if controller module 120 crashes (or its container crashes), the information stored in its local storage may disappear along with it. Accordingly, any information that may be pertinent to the management of controller module 120's operational entities 110 may be maintained at database 130, which may be a non-volatile persistent storage. In yet other cases, controller module 120 may maintain information 410 and 420 in both its local storage and database 130.

When instantiated, in various embodiments, controller module 120 may be provided a properties file that provides initial information. This initial information may identify locations of the controller module 120's local storage and/or database 130 that include operational entity information 410 and control API information 420 that is relevant to that controller module. In some cases, the properties file may indicate the operational entities 110 that controller module 120 is responsible for managing and may indicate ports to listen on with respect to those entities 110 and other controller modules 120. In various embodiments, controller module 120 accesses information 410 and 420 using its properties file.

Operational entity information 410, in various embodiments, is information describing the operational entities 110 that are managed by controller module 120. Information 410 may include blueprints 210 and definitions 310 for the managed operational entities 110. In various embodiments, operational entity manager engine 430 uses operational entity information 410 to determine the intended states of its operational entities 110. With such knowledge, manager engine 430 may transition its operational entities 110 (e.g., by issuing control API calls) toward their intended states. In some instances, controller module 120 may be instantiated such that it includes operational entity information 410; in yet some instances, controller module 120 may issue control API calls to its operational entities 110 in order to retrieve information 410 (e.g., blueprints 210) from them.

Control API information 420, in various embodiments, is information that indicates the functions of the control API that are implemented by the operational entities 110 managed by controller module 120. As discussed earlier, in various embodiments, an operational entity 110 includes a control API implementation 230 implementing one or more functions of the control API. Through the control API implementation 230, controller module 120 may interface with the elements 220 of that operational entity 110. Accordingly, control API information 420 may indicate the one or more functions implemented by a control API implementation 230. In some cases, controller module 120 may be instantiated such that it includes control API information 420; in some cases, controller module 120 may issue a "describe" function call (of the control API) to the operational entities 110 that its manages in order to receive control API information 420 from them. Note that, in various embodiments, each operational entity 110 may implement the "describe" function call.

In various embodiments, control API information 420 include a function map that maps certain information about an operational entity 110 to the functions that that operational entity 110 implements. In various cases, the information that is mapped to the functions may include an operational entity's UUT 321 and lifecycle 322. Note that, in some instances, an operational entity 110 might include different implementations of the same API function call for different lifecycle stages. As discussed in more detail with respect to FIG. 8, controller module 120 may use an operational entity's UUT 321, lifecycle 322, and/or UUID 325 to route commands.

Operational entity manager engine 430, in various embodiments, is a set of software routines executable to manage operational entities 110. Note that a controller module 120 may be considered an operational entity 110 in various cases—it may be associated with a definition 310 and a blueprint 210. As such, manager engine 430 may manage controller modules 120 as well. To manage operational entities 110 and controller modules 120, in various embodiments, manager engine 430 includes various modules, such as a scheduler module, a sweeper module, a health assessment module, and an investigator module.

The scheduler module, in various embodiments, is a set of functionality that determines when to make changes to operational entities 110 that are being managed by controller module 120. In various embodiments, scheduler module causes actions to be performed by scheduling them to be performed by other components of manager engine 430. The scheduler module may be declarative (e.g., "this operational entity 110 should be in this intended state") or imperative ("create a snapshot of a DB"). To schedule actions, the scheduler module may write requested actions (e.g., commands from a user) with scheduled times to the local storage and/or database 130. The scheduler module may also write the progress and outcomes of scheduled actions to the local storage and/or database 130. Such information may be written to database 130 so that if controller module 120 crashes, a new instance of controller module 120 may pick up where the other one crashed. In various cases, scheduler module may schedule the times at which the sweeper module probes operational entities 110.

The sweeper module, in various embodiments, is a set of functionality that probes the operational entities 110 that are being managed to collect information about the health of those operational entities (e.g., resource utilization versus capacity, major health indicators, etc.). In some embodiments, the sweeper module reads operational entity information 410 from a local storage (which might be persistent) or database 130. From operational entity information 410, the sweeper module may learn about the operational entities 110 that are being managed by its controller module 120 and how to connect to them. The sweeper module may then probe those operational entities. In some embodiments, the sweeper module sends a status request message to each of the listed operational entities 110 that requests information detailing the current state of that operational entity 110. Instead of the sweeper module initially sending the status request message, in some embodiments, the operational entities 110 may periodically send information to the sweeper module that indicates their current state. In various embodiments, the sweeper module stores the information received from operational entities 110 as a part of operational entity information 410. Such information may indicate resource utilization, resource capacity, the status of that operational entity 110 (e.g., offline, online, etc.), the status of that operational entity's relationships with other operational entities 110 (e.g., the other operational entity 110 is not respondent), etc. The sweeper module may store any alerts that may have been triggered as "incidents" to be investigated. As an example, if the sweeper module does not hear from an operational entity 110, then it may store an indication that that operational entity might not be healthy. Information that is no longer operationally relevant (e.g., old, irrelevant records) may be removed from the local storage and/or database 130.

The health assessment module, in various embodiments, is a set of functionality that assesses the health of the managed operational entities 110 using the information obtained by the sweeper module. In various embodiments, the health assessment module reads operational entity information 410 from the local storage or database 130. The health assessment module may then determine, based on operational entity information 410, whether to create a report to trigger the investigator module to investigate an operational entity 110. For example, the health assessment module may assess the resource utilization of an operational entity 110 and, if the resource utilization is too high or low relative to what it ought to be, then the health assessment module may create a report for that operational entity 110. In various embodiments, the health assessment module may attempt to predict further events based on historical operational entity information 410. For example, if an operational entity 110 shows signs of following a certain trend that ends with the operational entity 110 failing, then the health assessment module may create a report to preemptively have that operational entity investigated.

The investigator module, in various embodiments, is a set of functionality that inspects operational entities 110. The investigator module may check for reports that have not yet been investigated. For each report, the investigator module may collect information that pertains to the relevant operational entities 110; such information may be leveraged by other components of system 100 or users to troubleshoot any issues. For example, the investigator module might collect log information detailing operations performed by an operational entity 110 prior to the operational entity 110 failing. In various cases, the investigator module may have access to relationship information 330 for whatever entity is not healthy. For example, the investigator module may have access to relationship information 330 for a database server entity 110 that is not healthy and depends on another service entity 110 that also might not be healthy. The fact that the database server entity 110 is not healthy may only be a symptom and the place to investigate may really by the service that it depends on. Accordingly, the investigator module may use the control API to drill down into the health of that service to determine if it is causing problems for the database server entity 110. In some embodiments, the investigator module may attempt to troubleshoot any issues that it discovers. For example, the investigator module may issue a set of commands to restart/reinitialize an operational entity 110 that has crashed. The investigator module may update a report' state and ownership after the automated investigation is complete (e.g., if the auto investigation failed to troubleshoot the issue, the ownership may be transferred to a user).

Accordingly, in various embodiments, the sweeper module gathers health information about the operational entities 110 that are managed by its controller module 120. That heath information may be assessed by the health assessment module to determine if there are issues with those operational entities 110. If there are potential issues, then the issues may be reported to the investigator module for further analysis.

In some embodiments, operational entity manager engine 430 may receive instructions pertaining to the management of operational entities 110 (in some cases, those under manager engine 430). For instructions pertaining to operational entities 110 not under manager engine 430, manager engine 430 may route the instructions to the appropriate controller modules 120 for processing. In some cases, manager engine 430 may route instructions based on information included in those instructions, such as a UUID 325 value of a corresponding operational entity 110. For example, manager engine 430 may determine, based on a UUID 325 value, a certain controller module 120 that manages the operational entity 110 that corresponds to that UUID 325 value. Accordingly, manager engine 430 may route the corresponding instruction to that controller module 120 for processing.

For instructions that pertain to operational entities 110 that are under the management of manager engine 430, manager engine 430 may process the instructions, which may include changing states of one or more operational entities 110. In various cases, manager engine 430 may access control API information 420 in order to determine which functions of the control API are available for invoking. An instruction may identify a corresponding operational entity 110 and a function to be performed with respect to that operational entity. Accordingly, if the appropriate control API function has been implemented by the operational entity 110 (as may be determined from control API information 420), then manager engine 430 may send a control API call to the operational entity 110 to execute that control API function. In some instances, manager engine 430 may invoke a control API function implementation of another operational entity 110 in order to make a change to the original operational entity 110. In issuing a control API call, manager engine 430 may carry out the received instruction.

Workflow engine 440, in various embodiments, is a set of software routines executable to implement workflows. As noted, an operational scenario might be described in a workflow that includes a set of commands for implementing the sequence of steps of that operational scenario. The commands may identify operations (e.g., state changes) to be performed on certain operational entities 110. In various embodiments, workflow engine 440 implements a workflow by issuing instructions to operational entities 110 and/or controller module 120 to carry out the commands of the workflow. As an example, workflow engine 440 may issue an instruction to a controller module 120 to change the state of an operational entity 110 (managed by the controller module 120) from "offline" to "online." In various cases, workflow engine 440 may obtain workflows from database 130; in some cases, workflow engine 440 may obtain workflows from reasoning engine 450.

Reasoning engine 450, in various embodiments, is a set of software routines executable to generate a workflow based on a high-level goal. Reasoning engine 450 may initially receive a request from a user to implement a particular high-level goal. For example, a user may request that a database server entity 110 be upgraded from one version to another version. Reasoning engine 450, in various embodiments, "reasons" about the requested high-level goal in order to generate a workflow having a set of commands that implement the goal. In some instances, the output of reasoning engine 450 (e.g., a workflow) may be provided to workflow engine 440 to implement the high-level goal via the output. Reasoning engine 450 may greatly reduce the amount of specific operational code that has to be written by developers of system 100. Reasoning engine 450 is discussed in more detail with respect to FIG. 17.

Figure 5:
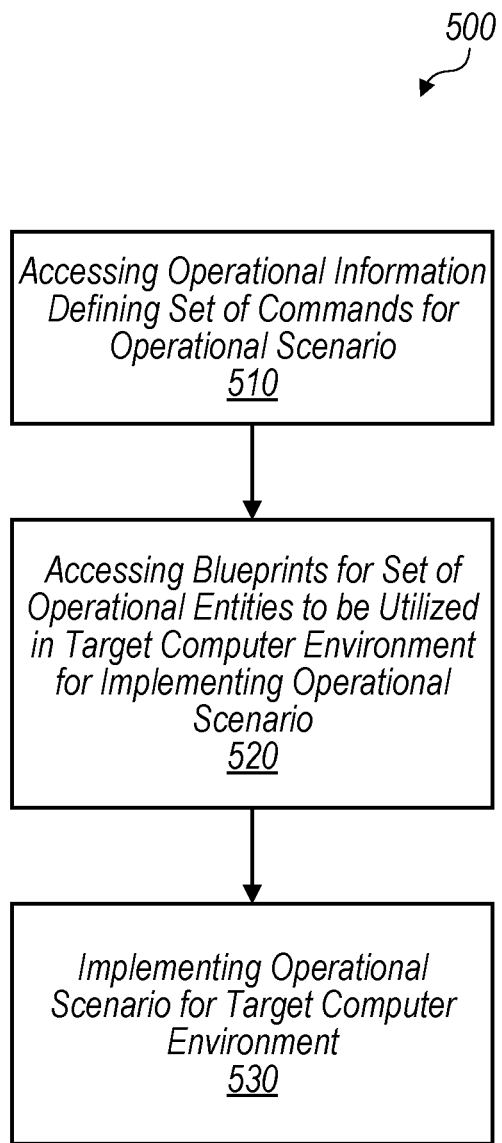
FIGS. 5 and 6 are flow diagrams illustrating example methods relating to managing the operational entities of a system, according to some embodiments.

Turning now to FIG. 5, a flow diagram of a method 500 is shown. Method 500 is one embodiment of a method performed by a computer system (e.g., system 100) for managing an operational scenario (e.g., in operational information 135) for a target computer environment (e.g., target environment 137). Method 500 may be performed by executing a set of program instructions stored on a non-transitory computer-readable medium. In some cases, method 500 may be performed in response to the computer system receiving a request from a user. In some embodiments, method 500 may include additional steps. As an example, the computer system may access definitions (e.g., definitions 310) to validate blueprints (e.g., blueprints 210).

Method 500 begins in step 510 with the computer system accessing operational information (e.g., operational information 135) defining a set of commands for the operational scenario. The operational scenario may include changing states of one or more software entities included in a set of operational entities to transition the one or more software entities from a first software version to a second software version.

In step 520, the computer system accesses blueprints (e.g., blueprints 210) for the set of operational entities (e.g., operational entities 110) that are to be utilized in the target computer environment for implementing the operational scenario. A given blueprint might indicate, for a first one of the set of operational entities, a set of relationships (e.g., relationships 331) between the first operational entity and one or more other operational entities of the set of operational entities. The set of operational entities may include a hardware entity (e.g., a set of processors), a software entity (e.g., a database server that executes on at least one of the set of processors), and an information entity (e.g., a logical database that is managed by the database server).

In step 530, the computer system implements the operational scenario for the target computer environment. In various cases, implementing the operational scenario may include executing a hierarchy of controller modules (e.g., controller modules 120) that may include an orchestrator controller module at top level of the hierarchy that is executable to carry out the set of commands by issuing instructions to controller modules at a next level of the hierarchy. In various cases, the hierarchy of controller modules may include controller modules that are executable to manage the set of operational entities according to respective blueprints in order to complete the operational scenario, including by changing states of one or more of the set of operational entities. In some cases, a first operational entity of the set of operational entities may be at a different level within the hierarchy than a second operational entity of the set of operational entities. Accordingly, ones of the controller modules that are executable to manage the set of operational entities may be at different levels of the hierarchy.

In some embodiments, a given operational entity implements one or more of a set of functions (e.g., control API implementation 230) that are supported by a control application programming interface (API). The one or more implemented functions may allow a controller module to change a state of the given operational entity. In various cases, a particular one of the blueprints may be associated with the given operational entity and may specify a lifecycle value (e.g., a value for lifecycle 322) indicative of a current lifecycle stage (e.g., specification stage) associated with the given operational entity. The lifecycle value may be usable by a controller module for determining which of the one or more implemented functions are callable for the lifecycle stage.

In some embodiments, the given operational entity is associated with a unique identifier (e.g., a value for UUID 325) that uniquely identifies that given operational entity. A particular one of the instructions may be associated with the given operational entity. In some instances, issuing the particular instruction might include determining, based on that unique identifier, a particular one of the controller modules that manages that given operational entity and issuing the particular instruction to the particular controller module. The particular instruction may include causing the software entity (e.g., a database server) to instantiate another information entity (e.g., a logical database).

In some embodiments, the set of relationships specified for the first operational entity affect an order in which ones of the set of commands can be carried out. In some cases, the set of relationships may include a relationship between the first operational entity and a second one of the set of operational entities. As such, performing a particular one of the instructions to change a state of the first operational entity may include changing a state of the second operational entity prior to changing the state of the first operational entity. In some cases, the relationship between the first operational entity and the second operational entity may be a dependence relationship in which the first operational entity depends on existence of the second operational entity.

Figure 6:

Turning now to FIG. 6, a flow diagram of a method 600 is shown. Method 600 is one embodiment of a method performed by a computer system (e.g., system 100) for managing a set of operational entities (e.g., operational entities 110). Method 600 may be performed by executing a set of program instructions stored on a non-transitory computer-readable medium. In some embodiments, method 600 may include additional steps. As an example, the computer system may maintain a database (e.g., database 130) that stores operational information (e.g., operational information 135).

Method 600 begins in step 610 with the computer system executing a hierarchy of controller modules (e.g., controller modules 120) having an orchestrator controller module at a top level of the hierarchy that is operable to communicate with other controller modules in the hierarchy to manage the set of operational entities. In various cases, the set of operational entities may include a hardware entity, a software entity, and an information entity.

In step 620, the orchestrator controller module accessing operational information (e.g., operational information 135) that specifies a workflow having commands for implementing a sequence of steps of an operational scenario involving the set of operational entities.

In step 630, the orchestrator controller module implements the commands of the workflow to implement the operational scenario. In some cases, implementing the commands may include issuing instructions to one or more of the other controller modules to change states of one or more of the set of operational entities. Particular controller modules within the hierarchy may be operable to manage the set of operational entities according to respective blueprints (e.g., blueprints 210) that define attributes (e.g., UUT 321, lifecycle 322, version 323, etc.) of the set of operational entities. In some embodiments, the attributes include relationship attributes (e.g., relationship type 332, direction 333, etc.) defining information that pertains to relationships (e.g., relationships 331) between ones of the set of operational entities. These relationships may affect an order in which the states of the one or more operational entities are to be changed based on the instructions.

In some cases, the one or more other controller modules may be operable to route one or more of the instructions received from the orchestrator controller module to the particular controller modules that manage the set of operational entities. In some cases, the one or more other controller modules may be operable to route the one or more instructions based on a set of unique identifiers (e.g., UUIDs 325) corresponding to the set of operational entities.

Turning now to FIG. 7, a block diagram of a control API 700 is shown. In the illustrated embodiment, control API 700 includes a describe function 710, a fetch function 720, a transition function 730, a create function 740, a destroy function 750, a perturb function 760, a validate function 770, and an analyze function 780. In various embodiments, control API 700 may include more functions than shown. For example, control API 700 may include a log function that enables a controller module 120 to retrieve log information maintained by an operational entity 110.

Control API 700, in various embodiments, is a collection of functions or API calls that are invokable to access information from an operational entity 110, make a change to an aspect of the operational entity 110 (e.g., transition that entity to another state), and/or make a change to another operational entity 110 managed by the operational entity 110. Control API 700 may include a selected set of functions that are common across all operational entities 110 in system 100, but the functionality of which is individually defined for each operational entity 110. For example, control API implementations 230A and 230B each might define create function 740 to create an operational entity 110, but the particular type of operational entity 110 created by control API implementation 230A may differ from the particular type created by control API implementation 230B. In various embodiments, an operational entity 110 may support multiple different implementations of the same type of function. As an example, a database server entity 110 may support two implementations of create function 740: one to create a logical database entity 110 and another to create a backup image entity 110. In some cases, an operational entity 110 may not support all function provided by control API 700. For example, perturb function 760 may not be implemented for a logical database entity 110.

Describe function 710, in various embodiments, returns information pertaining to an operational entity 110. The information may include an operational entity 110's blueprint 210, definition 310, and/or information pertaining to its control API implementation 230. Consider an example in which a controller module 120 wishes to discover what operational entities 110 that a particular operational entity 110 depends upon. That controller module 120 may invoke the describe function 710 of that particular operational entity 110 to receive its blueprint 210, which may identify the relationships 331 of the particular operational entity 110. In some cases, describe function 710 may be called to determine which of the other functions (e.g., functions 720, 730, etc.) have been implemented in an operational entity's control API implementation 230. Accordingly, in some embodiments, each operational entity 110 defines describe function 710 so controller modules 120 may have a guaranteed way of learning about those operational entities 110.

Fetch function 720, in various embodiments, fetches one or more variables 340 for an operational entity 110. As an example, a controller module 120 may invoke the fetch function 720 of an operational entity 110 to access a particular variable 340 that is indicative of whether that operational entity is "online" or "offline." When invoking fetch function 720, a controller module 120 may specify the requested variables 340 as inputs into fetch function 720. In some cases, a controller module 120 may invoke describe function 710 to determine what variables 340 may be requested from a specific operational entity 110 via its control API implementation 230. In some embodiments, the information returned by fetch function 720 may indicate certain properties of the returned variables 340. Such properties might include the name of a variable 340, its value, the minimum and maximum possible values for that variable, a data type (e.g., bool, integer, string, float, etc.), an information type (e.g., counter, rate, etc.), a unit type (e.g., seconds, kilobytes, etc.), and flags (e.g., mutable, canonical, etc.). For example, fetch function 720 may return information that specifies a variable 340 having a name of "status," a value of "online," and a flag of "mutable."

Transition function 730, in various embodiments, transitions or changes one or more variables 340 (or other information such as the values included in entity descriptor 320 and/or relationship information 330) for an operational entity 110 from a first value to a second value. As an example, the transition function 730 of a database server entity 110 might be invoked to change a status variable 340 from "offline" to "online." The control API implementation 230 of that database server entity 110 may invoke software routines that cause the database server entity 110 to transition from offline to online. The control API implementation 230 may then update the status variable 340 from "offline" to "online." That control API implementation 230 may hide the underlying complexity of transitioning the database server to an online state from the controller module 120 that invokes transition function 730. That is, from the perspective of a controller module 120, invoking transition function 730 may change a variable 340, while control API implementation 230 may actually implement the changes signified by the change in that variable. As such, in various embodiments, transition function 730 enables a controller module 120 to transition an operational entity 110 from a first state to a second state.

Other examples of using transition function 730 may include updating an operational entity 110 to a new version, disabling an operational entity 110 from creating other operational entities 110, changing a configuration specification of an operational entity 110, shutting down an operational entity 110, etc. In various embodiments, implementing an operational scenario may involve issuing multiple transition function 730 calls to multiple operational entities 110 to change their states.

Create function 740, in various embodiments, causes an operational entity 110 to create another operational entity 110. For example, a database server entity 110 may implement create function 740 to create logical database entities 110. As a result, a controller module 120 may invoke that create function 740 to create a logical database entity 110 if desired. In various embodiments, an operational entity 110 might control other operational entities 110 in that it may carry out actions on those operational entities or on behalf of those operational entities. In various cases, an operational entity 110 that controls another operational entity 110 may have the ability to create, destroy, list, and/or describe that other operational entity. In some cases, an operational entity 110 might create another operational entity 110 by cloning an operational entity 110 that is the same as that other operational entity. In some cases, an operational entity 110 might create another operational entity 110 by transiting that other operational entity along its lifecycle stages. For example, create a snapshot of a database persistence by transitioning a database persistence from an instance stage to a snapshot stage. In various embodiments, create function 740 receives source information as input that identifies a base (e.g., a disk image file) upon which to create a new operational entity 110.

Destroy function 750, in various embodiments, destroys/removes an operational entity 110 from system 100. In some cases, a controller module 120 may invoke the destroy function 750 of a particular operational entity 110 to destroy that operational entity in response to it no longer being needed in system 100. For example, a database server entity 110 that was created when there was high demand traffic may be destroyed when there is less traffic. In some cases, the destroy function 750 of an operational entity 110 may be invoked if that operational entity is malfunctioning. A controller module 120 might then instantiate another of the same type of operational entity 110.

Perturb function 760, in various embodiments, perturbs an operational entity 110 by causing that operational entity to behave anomalously. For example, the perturb function 760 of a particular operational entity 110 may inject faults into that operational entity. Such faults might include, for example, causing the particular operational entity 110 to crash, hang, or shut down. As discussed in more detail with respect to FIG. 24, perturb function 760 may be helpful in testing system 100 by causing issues in system 100 in order to see if system 100 can recover from those issues.

Validate function 770, in various embodiments, validates an operational entity 110 for correctness. For example, a controller module 120 may invoke the validate function 770 of an operational entity 110 to determine if the configuration and/or environment of that operational entity is correct (e.g., to determine if the configuration is using the appropriate values). Analyze function 780, in various embodiments, gathers metric information for an operational entity 110. As an example a controller module 120 may invoke the analyze method of an operational entity 110 to obtain an error log from that operational entity 110.

Figure 8:
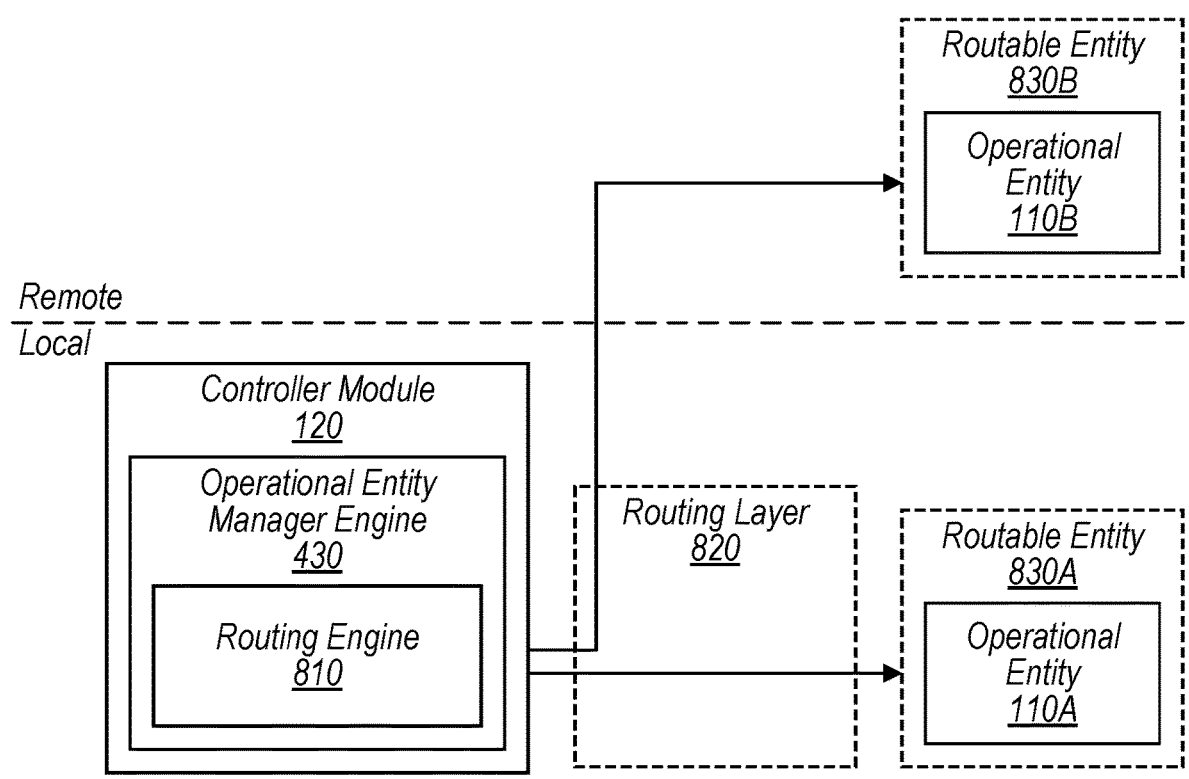
FIG. 8 is a block diagram illustrating example elements of a routing engine, a routing layer, and routable entities, according to some embodiments.

Turning now to FIG. 8, a block diagram of a routing engine 810 and routable entities 830 is shown. In the illustrated embodiment, controller module 120 includes operational entity manager engine 430 having routing engine 810. As further illustrated, routable entity 830A is located locally with respect to controller module 120 (e.g., located on the same network) while routable entity 830B is located remotely with respect to controller module 120.

As previously noted, operational entities 110 and controller modules 120 may form a hierarchy having an orchestrator controller module 120 at the top level. When implementing an operational scenario, the orchestrator controller module 120 may issue instructions through the hierarchy to controller modules 120 that manage operational entities 110. Such controller modules 120 may carry out the received instructions by issuing control API calls to invoke the appropriate functions of control API 700 that are implemented by those managed operational entities 110. By invoking the functions of control API 700, controller modules 120 may change the states of the operational entities 110.

Instructions may be received and/or accessed from various sources. In some cases, an instruction may be initially received from a command line tool that translates a human-readable command (entered by a user or ad hoc script) into an instruction that is understood by controller modules 120. The instruction derived from a command entered into the command line may be initially received by an orchestrator controller module 120 that may propagate the instruction through the hierarchy of operational entities 110 and controller modules 120. In various cases, instructions may be derived from workflow information stored in database 130. Accordingly, after being instructed (e.g., via the command line tool), an orchestrator controller module 120 may access workflow information from database 130 and propagate the instructions associated with the workflow information through the hierarchy. In some cases, the workflow information may include human-readable commands that may be translated by a controller module 120 into instructions for implementing those commands.

When a controller module 120 receives an instruction, the controller module 120 may make a routing decision. If the instruction corresponds to an operational entity 110 managed by the controller module 120, then the controller module 120 may issue the appropriate control API 700 call to that operational entity 110. But if the instruction corresponds to an operational entity 110 managed by another controller module 120, then the first controller module 120 may route the instruction to that other controller module. In order to route instructions and invoke the functions of control API 700, in various embodiments, a controller module 120 includes a routing engine 810.

Routing engine 810, in various embodiments, is a set of software routines executable to route instructions and to invoke the functions of control API 700. Instructions may be routed based on information included in those instructions. Such information may include a UUT 321 of the operational entity 110, a lifecycle 322 of the operational entity 110, a UUID 325 of the operational entity 110, a UUID 325 of the controller module 120 that manages the operational entity 110, a UUID 325 of a container entity 110 that includes the operational entity 110 and the controller module 120, a variable 340 name, a source, and/or other information, which may be included in blueprints 210 and/or definitions 310, such a name 328 of the operational entity 110. As an example, an instruction might correspond to fetch function 720 and might specify a variable 340 name (e.g., "status") to fetch, the UUID 325 of the operational entity 110 from which to fetch that variable, and the UUID 325 of the controller module 120 that manages that operational entity and thus should invoke the fetch function 720 of that operational entity.

After receiving an instruction, in various embodiments, routing engine 810 determines whether the instruction should be routed to another controller module 120 or a certain function of control API 700 should be called. To determine if that instruction should be routed, in some embodiments, routing engine 810 determines whether the instruction specifies a UUID 325 for a controller module 120. If that instruction specifies a UUID 325 for a controller module 120, but the specified UUID 325 belongs to another controller module 120, then routing engine 810 may route the instruction. In some cases, routing engine 810 may determine that an operational entity 110 is not local to its controller module 120 if its controller module 120 does not have access to a control API implementation 230 for that operational entity. Routing engine 810 may make this determination based on a map of local control API implementations 230 that is maintained by its controller module 120. In some cases, the UUID 325 plus the control API call identified in the instruction may be used as a key into the map. If the map does not have an entry for such a key, then routing engine 810 may route the instruction.

In some instances, routing engine 810 may route that instruction by broadcasting it to each controller module 120 that its controller module 120 manages. In some instances, if the specified UUID 325 belongs to a controller module 120 managed by routing engine's controller module 120, then routing engine 810 may provide that instruction directly to that controller module. Routing engine 810 may use blueprints 210 to determine who manages the operational entity 110 for whom the instruction is for. An instruction might not specify a UUID 325 for a controller module 120; the instruction, however, may still specify a UUID 325 of the operational entity 110. As such, routing engine 810 may determine, based on operational entity information 410, whether its controller module 120 manages that operational entity. If its controller module 120 does not manage that operational entity, then routing engine 810 may broadcast that instruction to each controller module 120 that its controller module 120 manages. In some embodiments, routing engine 810 determines whether its controller module 120 manages the operational entity 110 by attempting to look up the operational entity's information in operational entity information 410 using a UUID 325 of that operational entity (or using other information such as UUT 321). In some embodiments, a routing table may be used that advertises the capabilities of each controller module 120 along with what operational entities 110 that they manage. Accordingly, routing engine 810 may use this routing table to determine where to route an instruction.

If a received instruction corresponds to an operational entity 110 managed by routing engine's controller module 120, then routing engine 810 may check whether that operational entity implements a function of control API 700 for handling the action/operation indicated by the instruction. As discussed previously, in various embodiments, a controller module 120 may store a function map in control API information 420 that maps functions of control API 700 to an operational entity's UUT 321 and lifecycle 322. Accordingly, routing engine 810 may build a list of functions of control API 700 that have been implemented by the operational entity 110 based on the function map, UUT 321, and lifecycle 322. In cases where an instruction does not specify a UUT 321 and a lifecycle 322 for the operational entity 110, then routing engine 810 may look up the operational entity's blueprint 210 using a UUID 325 that may be specified in the instruction for that operational entity. Routing engine 810 may then extract UUT 321 and lifecycle 322 from the accessed blueprint 210. If no blueprint 210 can be located, then routing engine 810 may return an error to the issuer of the instruction. In various embodiments, routing engine 810 builds the list of functions by selecting functions indicated in the function map that correspond to the UUT 321 and lifecycle 322 of the relevant operational entity 110.

After building a list of implemented functions, in various embodiments, routing engine 810 determines whether there is a function included in that list for implementing the operation requested by the instruction. For example, if the instruction identifies a transition operation for transitioning a particular variable 340 to a new value, then routing engine 810 may determine, based on the list, whether the operational entity 110 implements a transition function 730 for transitioning that particular variable. If so, then routing engine 810 may invoke that transition function; otherwise, routing engine 810 may return an error to the issuer of the instruction. In this manner, routing engine 810 may process received instructions.

When routing an instruction or invoking a function of control API 700, routing engine 810 may make a call to routing layer 820. Routing layer 820, in various embodiments, is a set of software routines, hardware, or a combination thereof that is operable to route an instruction to another component (an operational entity 110 or a controller module 120) and/or invoke a function of control API 700. Routing layer 820 may receive a request from controller module 120 to send an instruction to another particular controller module 120 or to invoke a particular function implemented by a particular operational entity 110 for control API 700. Accordingly, that request may specify the instruction, a UUID 325 of a controller module 120, a UUID 325 of an operational entity 110, and/or a function call. Routing layer 820 may determine whether an instruction is to be routed or a function is to be called based on the contents of the request that is received from controller module 120. If the request specifies an instruction, then routing layer 820 may locate an appropriate controller module 120 (e.g., based on a UUID 325) and send the instruction to that controller module. If the request specifies a function, then routing layer 820 may locate the appropriate operational entity 110 (e.g., based on a UUID 325) and invoke the function implemented by that operational entity.

In various cases, routing layer 820 may have to communicate with operational entities 110 or controller modules 120 that are remote (e.g., operational entities 110 outside of the local network that is associated with routing engine 810). As used herein, an operational entity 110 or a controller module 120 is said to be "remote" to another operational entity 110 or controller module 120 if they are not within the same local network. To determine whether an operational entity 110 or a controller module 120 is local or remote, in various embodiments, routing layer 820 accesses information (e.g., a blueprint 210) for a routable entity 830 that is associated with that operational entity or controller module.

Routable entity 830, in various embodiments, is a specialized operational entity 110 that identifies whether another operational entity 110 or controller module 120 is remote from routing layer 820. In some cases, routable entity 830 may include a blueprint 210 or a definition 310 that specifies a remote host port (e.g., as a variable 340). In some embodiments, if routable entity 830 identifies a remote host port, then routing layer 820 determines that the associated operational entity 110 or controller module 120 is remote; otherwise it is local. For example, the information (e.g., blueprint 210) that is associated with routable entity 830A may indicate that operational entity 110A is local while the information associated with routable entity 830B may indicate that operational entity 110B is remote. Based on this information, routing layer 820 may select an appropriate communication protocol for communicating with the operational entity 110 or controller module 120. To access the appropriate routable entity 830, in various embodiments, routing layer 820 accesses relationship information 330 for the corresponding operational entity 110 or controller module 120. The relationship information 330 may identify a relationship 331 between the corresponding operational entity 110 and the relevant routable entity 830. For example, an operational entity 110 may be "contained" within a routable entity 830. Based on this, routing layer 820 may look up a blueprint 210 for that routable entity 830 from a local storage and/or database 130.

In various embodiments, a controller module 120 is agnostic to whether an operational entity 110 or controller module 120 is remote or local. That controller module 120 may instead rely on routing layer 820 to make that determination. From the point-of-view of the controller module, communicating with a local operational entity 110 and a remote operational entity 110 may be the same (it may appear as if all operational entities 110 are local). This may allow the process of communicating with an operational entity 110 to be simplified to one control API instead of using two different control APIs.

Figure 9:
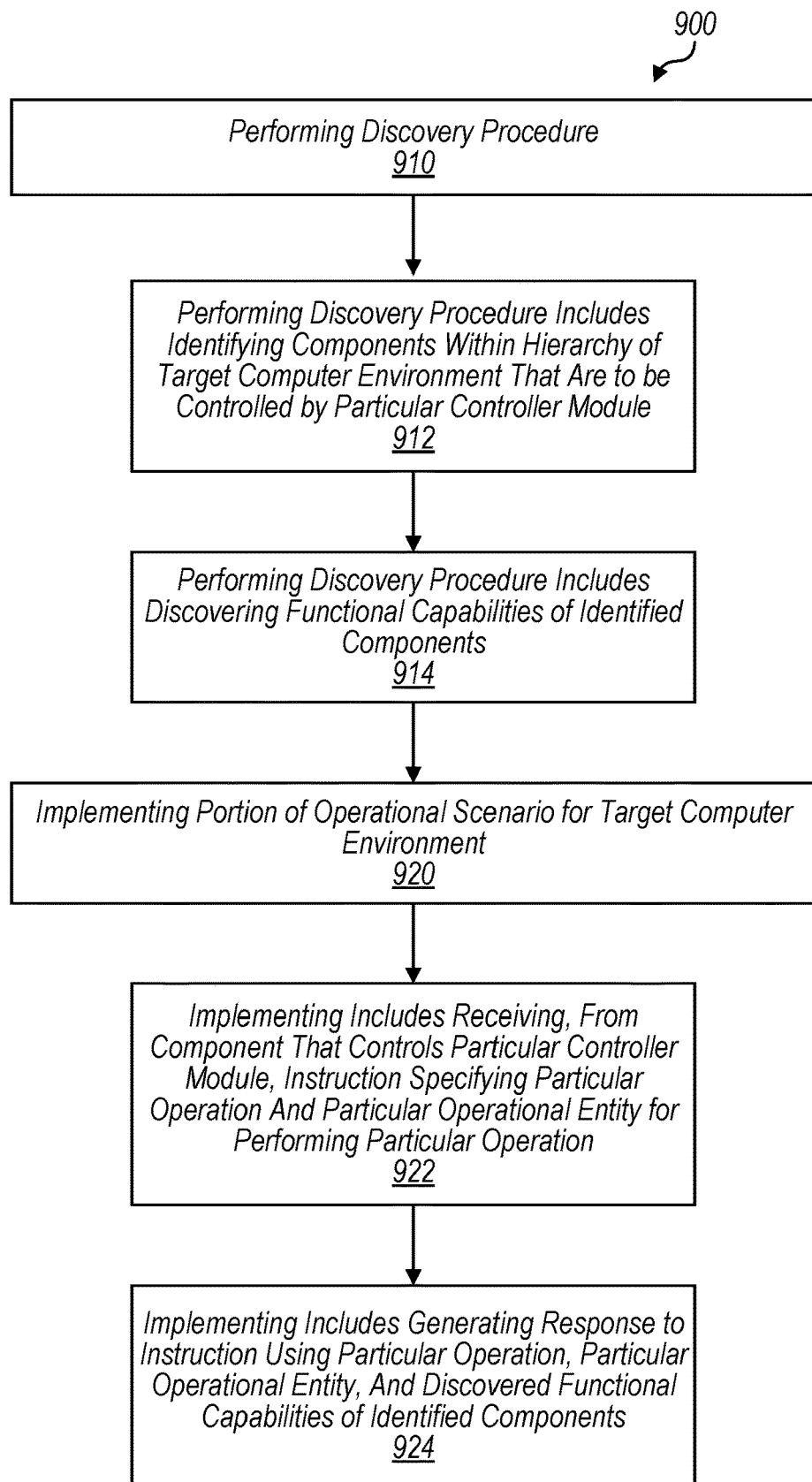
FIGS. 9 and 10 are flow diagrams illustrating example methods relating to implementing an instruction associated with an operational entity, according to some embodiments.

Turning now to FIG. 9, a flow diagram of a method 900 is shown. Method 900 is one embodiment of a method performed by a controller module (e.g., a controller module 120) for issuing an instruction to an operational entity (e.g., an operational entity 110) as part of an operational scenario (e.g., in operational information 135) for a target computer environment (e.g., target environment 137). Method 900 may be performed by executing a set of program instructions stored on a non-transitory computer-readable medium. In some cases, method 900 may be performed in response to the controller module receiving an instruction from a user or another controller module. In some embodiments, method 900 may include additional steps. For example, the controller module may route an instruction to another controller module for implementation.

Method 900 begins in step 910 with the controller module performing a discovery procedure. As part of the discovery procedure, in step 912, the controller module identifies components within a hierarchy of a target computer environment that are to be controlled by the controller module. The controller module may identify components within the hierarchy by accessing operational entity information (e.g., operational entity information 410) defining unique identifiers (e.g., UUIDs 325) that correspond to components within the hierarchy that are to be controlled by the controller module. In various cases, the hierarchy may include both controller modules and operational entities.

As part of the discovery procedure, in step 914, the controller module discovers functional capabilities of the identified components. A given component may implement one or more functions of a plurality of functions (e.g., functions 710, 720, 730, etc.) supported by a control application programming interface (API) (e.g., control API 700). The one or more functions may allow for the controller module to change a state of the given component. The controller module may generate a mapping that maps a given one of the set of operational entities to a set of functions implemented by that given operational entity from the plurality of functions supported by a control API. The controller module may control a particular operational entity and another particular operational entity. In various cases, the particular operational entity may implement a different set of the plurality of functions than the other particular operational entity.

In various embodiments, discovering the functional capabilities of the components may include discovering the functional capabilities of the particular operational entity by invoking a describe function (e.g., describe function 710) that is implemented by the particular operational entity for the control API. In response to invoking the describe function, the controller module may receive a response from the particular operational entity that identifies a set of functions of the plurality of functions of the control API implemented by the particular operational entity.

In step 920, the controller module implements a portion of an operational scenario for the target computer environment. The operational scenario may include updating a component identified during the discovery procedure from a first version to a second version. As part of implementing the portion of the operational scenario, in step 922, the controller module receives, from a component (e.g., another controller module 120) that controls the controller module, an instruction specifying a particular operation and a particular operational entity for performing the particular operation.

As part of implementing the portion of the operational scenario, in step 922, the controller module generates a response to the instruction using the particular operation, the particular operational entity, and the discovered functional capabilities of the identified components. Generating the response to the instruction may include the controller module identifying, from the set of functions, a particular function invokable to cause the particular operational entity to perform the particular operation. The controller module may determine, based on a lifecycle value that is indicative of a lifecycle stage, the particular function from the set of functions. In some cases, the instruction may define a unique identifier associated with the particular operational entity and thus the controller module may access, based on the unique identifier, a blueprint that corresponds to the particular operational entity. The blueprint may specify the lifecycle value. The particular function may be a transition function (e.g., transition function 730) that is invokable to transition the particular operational entity from a first state to a second state. The controller module may issue, to the particular operational entity, a control API call to invoke the particular function to perform the particular operation. The controller may further send, to the component that is controlling the particular controller module, a message specifying a result that indicates whether the particular operation was performed successfully.

In some cases, the controller module may receive another instruction that specifies another operation and another operational entity for performing the other operation. The controller module may determine, based on the other instruction, that the other operational entity is controlled by another particular controller module. As such, the controller module may route the other instruction to the other particular controller module.

Figure 10:
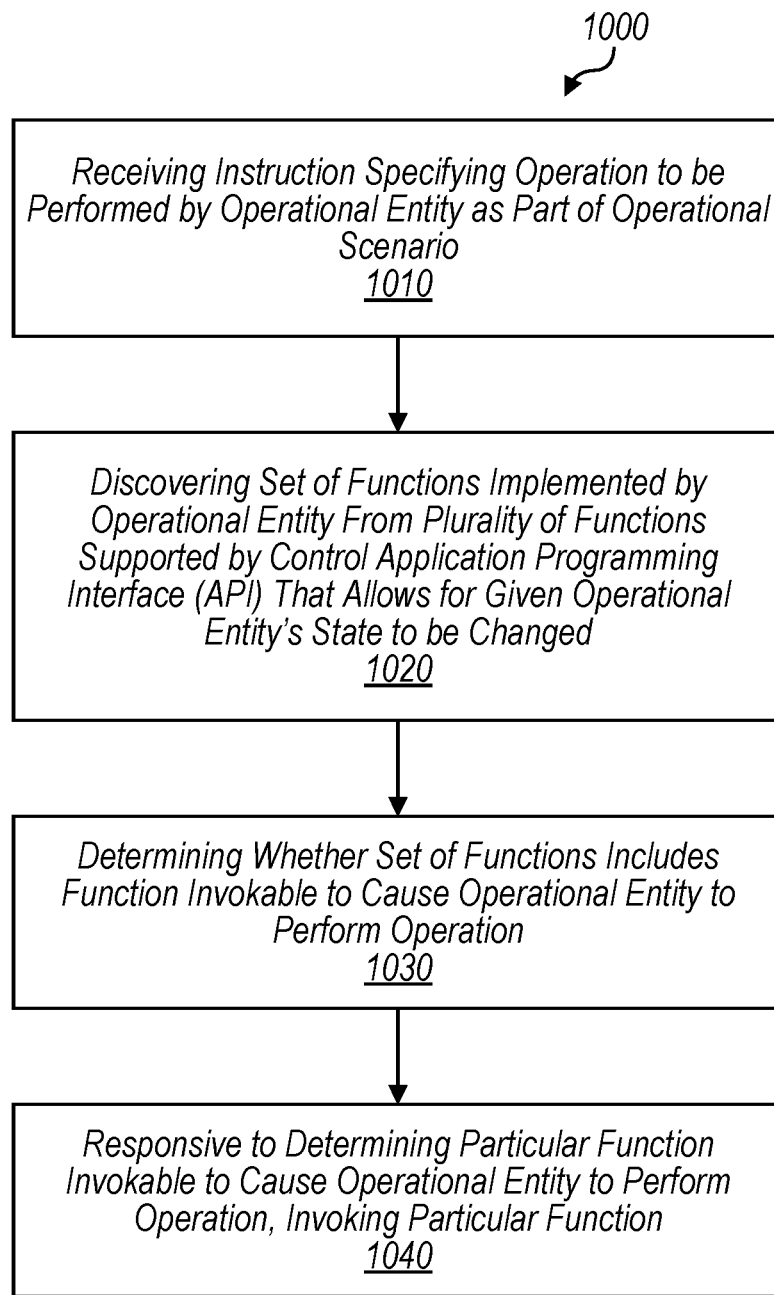

Turning now to FIG. 10, a flow diagram of a method 1000 is shown. Method 1000 is one embodiment of a method performed by a controller module (e.g., a controller module 120) for issuing an instruction to an operational entity (e.g., an operational entity 110) as part of an operational scenario (e.g., in operational information 135) for a target computer environment (e.g., target environment 137). Method 1000 may be performed by executing a set of program instructions stored on a non-transitory computer-readable medium. In some embodiments, method 1000 may include additional steps. For example, the controller module may route an instruction to another controller module for implementation.

Method 1000 begins in step 1010 with the controller module, within a hierarchy that includes controller modules and operational entities, receiving an instruction specifying an operation to be performed by an operational entity as part of an operational scenario. In some cases, the instruction may be received from another controller module within the hierarchy that controls the controller module.

In step 1020, the controller module discovers a set of functions (e.g., functions 710, 720, etc.) implemented by the operational entity from a plurality of functions supported by a control application programming interface (API) (e.g., control API 700) that allows for a given operational entity's state to be changed. Discovering the set of functions may include the controller module receiving, from the operational entity, a broadcast that identifies the set of functions implemented by the operational entity.

In step 1030, the controller module determines whether the set of functions includes a function invokable to cause the operational entity to perform the operation.

In step 1040, responsive to determining a particular function invokable to cause the operational entity to perform the operation, the controller module invokes the particular function. The particular function may be a destroy function invokable to cause the operational entity to be destroyed. In various cases, the controller module may send, to the other controller module that sent the instruction, a message that indicates that the instruction was implemented successfully.

Figure 11:
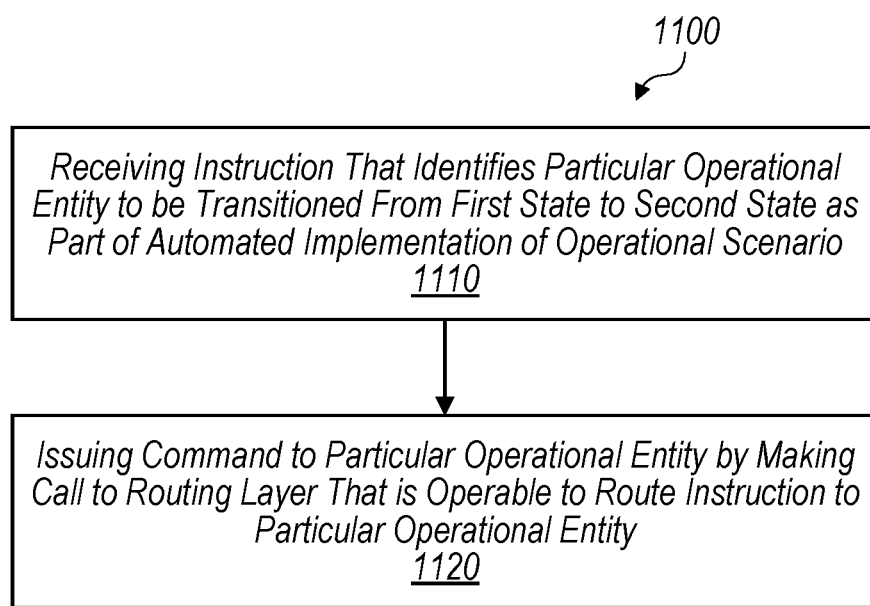
FIGS. 11-13 are flow diagrams illustrating example methods relating to routing an instruction associated with an operational entity, according to some embodiments.

Turning now to FIG. 11, a flow diagram of a method 1100 is shown. Method 1100 is one embodiment of a method performed by a controller module (e.g., a controller module 120) for issuing an instruction to an operational entity (e.g., an operational entity 110) as part of an operational scenario (e.g., in operational information 135). Method 1100 may be performed by executing a set of program instructions stored on a non-transitory computer-readable medium. In some cases, method 1100 may be performed in response to the controller module receiving an instruction from a user or another controller module. In some embodiments, method 1100 may include additional steps. For example, the controller module may communicate with its operational entities to determine which functions (e.g., functions 710, 720, etc.) of a control API (e.g., control API 700) have been implemented by those operational entities.

Method 1100 begins in step 1110 with the controller module receiving an instruction that identifies a particular operational entity to be transitioned from a first state to a second state as part of automated implementation of an operational scenario. The controller module may be included within a hierarchy of components having controller modules and operational entities. In various cases, the hierarchy may include an orchestrator controller module at a top level of the hierarchy that is executable to implement the operational scenario by issuing instructions to controller modules at a next level of the hierarchy. Accordingly, the instruction may be received by the controller module from the orchestrator controller module as part of implementing the operational scenario. The operational scenario may include starting up a database service having a set of database servers capable of performing database transactions on behalf of users of the computer system that executes the controller module.

In step 1120, the controller module causes the instruction to be carried out for the particular operational entity by making a call to a routing layer (e.g., routing layer 820). In some cases, the call may not specify whether the particular operational entity is remote relative to a local environment of the controller module. In various embodiments, the controller module makes the same call to the routing layer independent of whether the particular operational entity is within the local environment or remote to the local environment. The call may specify a particular function that is implemented by the particular operational entity for carrying out the instruction. In some cases, the routing layer may perform the routing operation by invoking the particular function. In some cases, the call may be made to the routing layer to cause the routing layer to invoke the particular function of the particular operational entity to instantiate a database server as part of starting up the database service. In yet some cases, the routing layer may perform the routing operation by routing the instruction to another controller module that manages the particular operational entity.

In various embodiments, the routing layer is operable to make a determination on whether the particular operational entity is within the local environment or remote to the local environment. The routing layer may use the determination to perform a routing operation in relation to the particular operational entity. In some embodiments, the routing layer is operable to access a blueprint (e.g., a blueprint 210) for a routable entity (e.g., a routable entity 830) associated with the particular operational entity. The routing layer may first access a blueprint for the particular operational entity that specifies relationship information (e.g., relationship information 330) for a relationship (e.g., a relationship 331) between the particular operational entity and the routable entity. That relationship may enable the routing layer to access the blueprint for the routable entity.

In various embodiments, the routing layer determines that the particular operational entity is remote to the local environment based on whether the blueprint specifies a remote host port. The routing layer may select a first routing protocol for routing the instruction to the other controller module based on the determination indicating that the particular operational entity is remote to the local environment. In various cases, the first routing protocol may be different than a second routing protocol usable to route instructions within the local environment.

Figure 12:
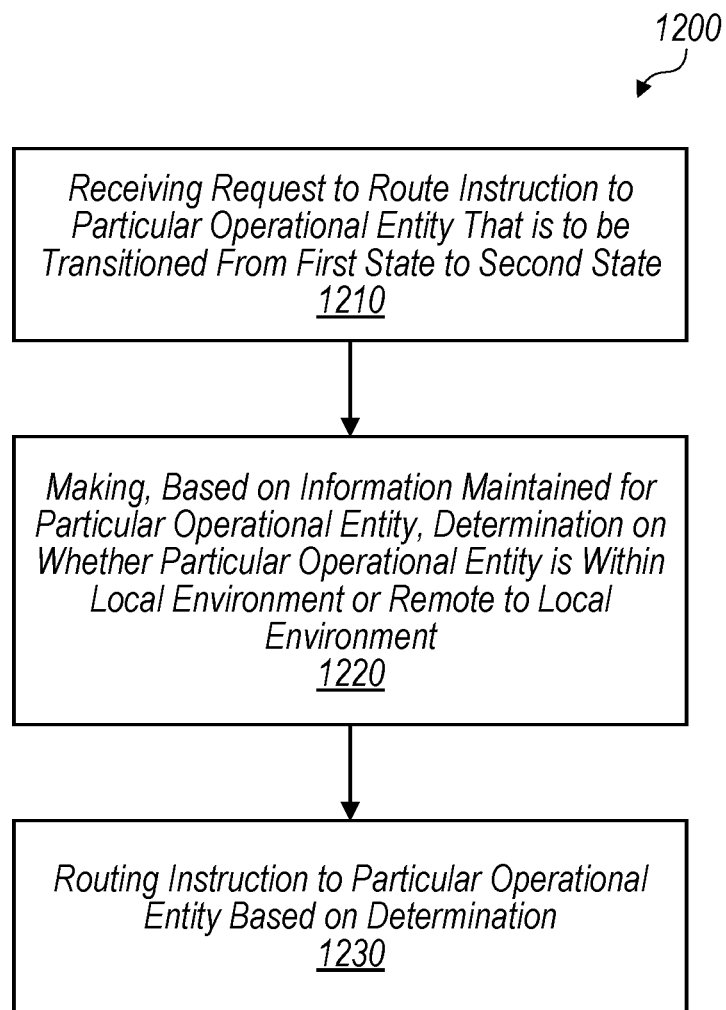

Turning now to FIG. 12, a flow diagram of a method 1200 is shown. Method 1200 is one embodiment of a method performed by a computer system to implement a routing layer to route an instruction to an operational entity (e.g., an operational entity 110) as part of an operational scenario (e.g., in operational information 135). Method 1200 may be performed by executing a set of program instructions stored on a non-transitory computer-readable medium. In some embodiments, method 1100 may include additional steps.

Method 1200 begins in step 1210 with a routing layer receiving a request to route an instruction to a particular operational entity that is to be transitioned from a first state to a second state. The request may not specify whether the particular operational entity is remote relative to a local environment of a controller module from which the request is received.

In step 1220, the routing layer makes, based on information maintained for the particular operational entity, a determination on whether the particular operational entity is within the local environment or remote to the local environment. The information may define a blueprint (e.g., a blueprint 210) for the particular operational entity. In various cases, the blueprint may define a relationship (e.g., a relationship 331) between the particular operational entity and a routable entity that is associated with a second blueprint that indicates whether the particular operational entity is within the local environment or remote to the local environment. The routing layer may access, based on the relationship, the second blueprint and determine that the particular operational entity is remote to the local environment based on the accessed second blueprint specifying a remote host port.

In step 1230, the routing layer routes the instruction to the particular operational entity based on the determination. As part of routing the instruction, the routing layer may invoke a particular function (e.g., transition function 730) that is implemented by the particular operational entity for transitioning the particular operational entity from the first state to the second state. In some cases, as part of routing the instruction, the routing layer may send the instruction to another controller module within a next level of a hierarchy of controllers relative to the controller module from which the request is received. This other controller module may directly manages the particular operational entity.

Figure 13:
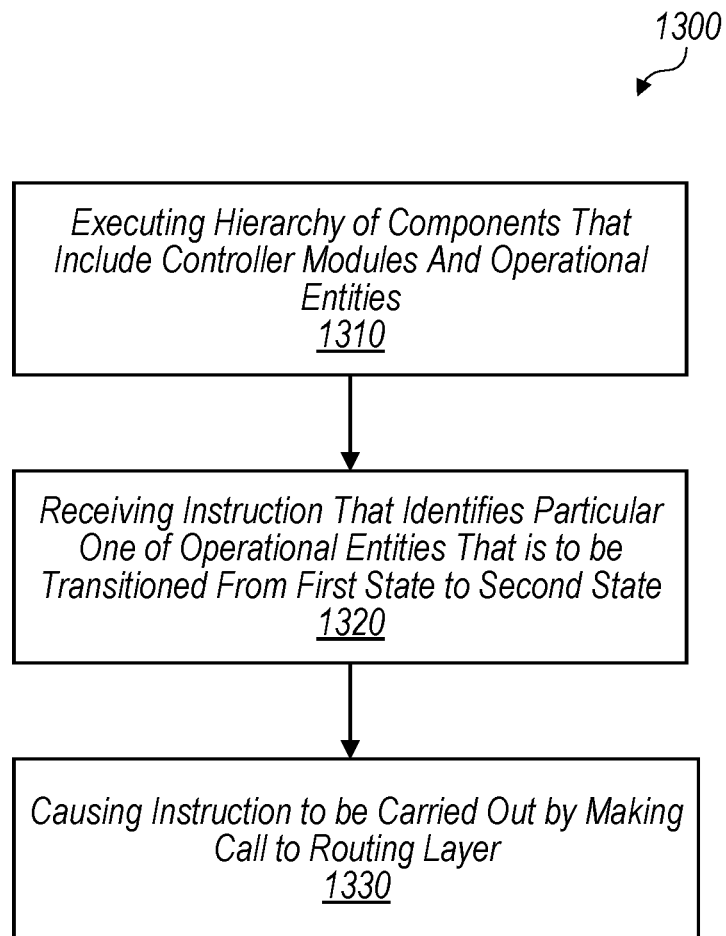

Turning now to FIG. 13, a flow diagram of a method 1300 is shown. Method 1300 is one embodiment of a method performed for issuing an instruction to an operational entity (e.g., an operational entity 110) as part of an operational scenario (e.g., in operational information 135). Method 1300 may be performed by executing a set of program instructions stored on a non-transitory computer-readable medium. In some embodiments, method 1300 may include additional steps. As an example, the controller module may communicate with the operational entities under its authority to determine which functions (e.g., functions 710, 720, etc.) of a control API (e.g., control API 700) have been implemented by those operational entities.

Method 1300 begins in step 1310 with a computer system (e.g., system 100) executing a hierarchy of components that include controller modules and operational entities. In various cases, the hierarchy may include an orchestrator controller module at a top level of the hierarchy that is executable to perform an operational scenario by issuing a set of instructions to controller modules at a next level of the hierarchy.

In step 1320, a controller module of the hierarchy receives an instruction that identifies a particular one of the operational entities that is to be transitioned from a first state to a second state.

In step 1330, the controller module causes the instruction to be carried out by making a call to a routing layer (e.g., routing layer 820). The call may not specify whether the particular operational entity is remote relative to a local environment of the controller module. In some embodiments, the controller module makes the same call to the routing layer independent of whether the particular operational entity is remote relative to the local environment of the controller module.

The routing layer may be operable to make a determination on whether the particular operational entity is within the local environment or remote to the local environment. The routing layer may use the determination to route the instruction to the particular operational entity. In various cases, the routing layer may determine that the particular operational entity is remote to the local environment in response to the particular operational entity being associated with a remote host port. The routing layer may utilize a first routing protocol for routing instructions to operational entities that are remote to the local environment and a second, different routing protocol for routing instructions to operational entities that are within the local environment. In some cases, routing the instruction may include routing the instruction to another controller module within a next level of the hierarchy that directly manages the particular operational entity.

Figure 14:
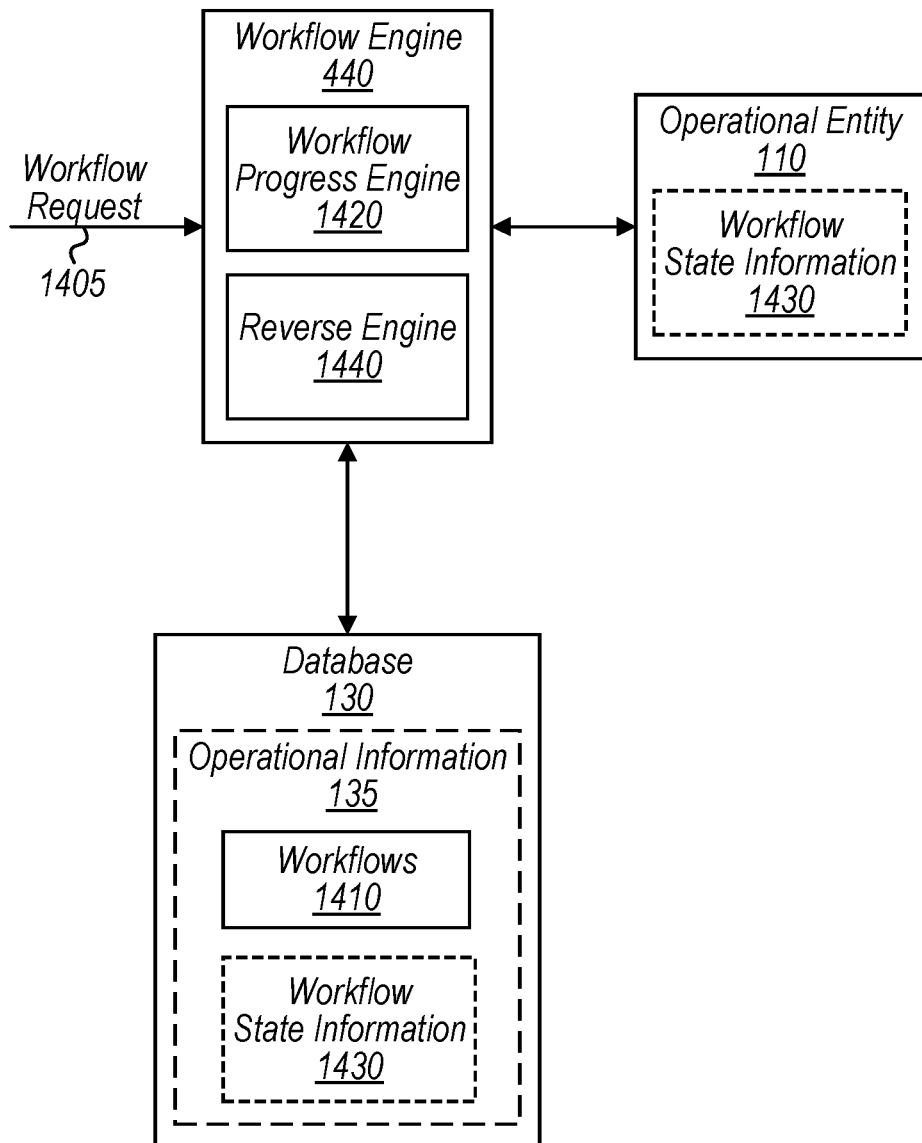
FIG. 14 is a block diagram illustrating example elements of a workflow engine, according to some embodiments.

Turning now to FIG. 14, a block diagram of a workflow engine 440 is shown. In the illustrated embodiment, workflow engine 440 includes a workflow process engine 1420 and a reserve engine 1440. As further shown, database 130 includes workflows 1410 and workflow state information 1430, which can be stored at an operational entity 110 as illustrated. In some embodiments, workflow engine 440 may be implemented differently than shown. For example, workflow engine 440 may include workflow state information 1430.

As noted earlier, operational scenarios may be implemented using a set of commands that correspond to a sequence of steps that perform some intended goal (e.g., updating a set of operational entities 110 to a new version). A workflow 1410, in various embodiments, specifies an ordered set of commands that correspond to a specific operational scenario. Accordingly, implementing the set of commands of a workflow 1410 may result in the associated operational scenario being carried out. In some cases, workflows 1410 may be provided by users and stored in database 130; workflows 1410 may be also provided by reasoning engine 450 as discussed in greater detail with respect to FIG. 17. A controller module 120 may access a workflow 1410 (e.g., from database 130) in response to a workflow request 1405.

Workflow request 1405, in various embodiments, is a request that instructs workflow engine 440 to implement a specified workflow 1410. Workflow request 1405 may identify a name or identifier that permits a controller module 120 to access the corresponding workflow 1410. Workflow request 1405 may be received from a user via a command line tool and/or from another controller module 120. For example, an orchestrator controller module 120 may receive workflow request 1405 from a user. In some cases, implementing a workflow 1410 might involve implementing other, different workflows 1410. In some embodiments, workflows 1410 may be stacked to form a hierarchy of workflows in which a top level workflow 1410 performs a high-level task and lower level workflows 1410 each perform a subtask of that high-level task. Continuing the previous example, implementing the particular workflow 1410 specified in the received workflow request 1405 may involve the orchestrator controller module 120 causing lower level controller modules 120 to implement a set of workflows 1410 that corresponds to the particular workflow 1410. In order to implement a given workflow 1410, in various embodiments, a controller module 120 includes a workflow progress engine 1420 and a reverse engine 1440.

Workflow process engine 1420, in various embodiments, is a set of software routines executable to implement the ordered set of commands specified in a workflow 1410. Workflow process engine 1420 may implement a set of commands by issuing instructions to components within system 100. As noted previously, in some embodiments, a command may be either in a human-readable format or in a format understandable by operational entities 110 and controller modules 120. As a result, an instruction issued by workflow process engine 1420 might be the actual corresponding command or a translation of the command into a format understandable by operational entities 110 and controller modules 120. Workflow process engine 1420 may issue instructions in the manners discussed earlier (e.g., by interacting with routing engine 810 to makes calls to routing layer 820).

When implementing an ordered set of commands, in various embodiments, workflow process engine 1420 maintains workflow state information 1430. Workflow state information 1430, in various embodiments, specifies a current state of an implementation of a workflow 1410 and/or a current state of a target environment 137. For example, workflow state information 1430 may identify commands of a workflow 1410 that have already been implemented. Accordingly, in response to a command being completed, workflow process engine 1420 may update workflow state information 1430 to reflect that completed command. Workflow state information 1430 may identify the state of a target environment 137 by identifying the states of the operational entities 110 and controller modules 120 within that target environment. For example, workflow state information 1430 may indicate which operational entities 110 are "online" and which are "offline." Workflow state information 1430 may also indicate whether the workflow is running forward or in reverse. As discussed below, in response to an error occurring in implementing a workflow 1410, reverse engine 1440 may use workflow state information 1430 to respond to the error.

Reverse engine 1440, in various embodiments, is a set of software routines executable to reverse the state of system 100 back to an initial state existing before a workflow 1410 was started. In some cases, an error may occur while implementing a workflow 1410. For example, a command may fail to complete every time that workflow engine 440 attempts to implement it. As another example, workflow engine 440 (and its controller module 120) may crash, hang, or experience another type of malfunction. If an error occurs while implementing a workflow 1410, in various cases, workflow engine 440 may reattempt the relevant step by implementing the corresponding commands again. In some cases, however, reverse engine 1440 may attempt to reverse the state of system 100 back to the initial state associated with the workflow 1410.

In order to reverse the state of system 100, reverse engine 1440 may traverse the set of commands in a backwards order. In various embodiments, the set of commands specified in a workflow 1410 can be traversed in a forward order to transition a target environment 137 to an intended state from an initial state and traversed in a backwards order to transition the target environment 137 to the initial state from a current state (e.g., the intended state). By traversing the commands in a backwards order, reverse engine 1440 may get back to a known state instead of leaving the system in a broken or unknown state. Accordingly, in response to an error (e.g., a command cannot be completed), reverse engine 1440 may walk backwards through those commands that have already been implemented, undoing the one or more state changes caused by those commands. For example, if a particular command caused an operational entity 110 to transition from "offline" to "online," then reverse engine 1440 may cause that operational entity 110 to transition back to "offline" (e.g., by invoking a function of control API 700 or issuing an instruction to a controller module 120 managing the operational entity 110). In some cases, a workflow command cannot be reversed—this may be indicated by metadata associated with the command. Accordingly, workflow engine 440 may stop and alert a user to the issue.

In various cases, a controller module 120 (e.g., an orchestrator controller module 120) may malfunction (e.g., crash) while implementing a workflow 1410. In such a situation, it may be desirable to resume implementation of that workflow 1410 once the controller module 120 has been restored (e.g., a new controller module 120 is instantiated). Accordingly, upon recovering or being restored, a controller module 120 may attempt to access workflow state information 1430 in order to determine if there is an in-progress implementation of a workflow 1410. The controller module 120 may subsequently resume implementation of a workflow 1410 if there is one in-progress. In some cases, the controller module 120 may attempt to execute the next command in the workflow 1410; in yet other cases, the controller module 120 may reverse the already completed commands to return the target environment 137 back to an initial state. The controller module 120 may then reattempt the entire workflow 1410.

Because a controller module 120 may malfunction, in various embodiments, workflow state information 1430 is stored at a location external to the controller module 120 such that if the controller module 120 malfunctions, workflow state information 1430 is not lost. Whether state information 1430 is stored at an external location may also depend on whether an entity 110 managed by a controller module 120 has "state" and whether that controller module's life is bound to that entity. As an example, if a controller module 120 is within the same container as a stateless application, it may not store workflow state information 1430 externally, but may store it in a local memory. If there was a problem that caused the container to exit, both that entity 110 and that controller module 120 would be destroyed and the state of the workflow would then be moot in that case. But, if the state that is being changed persists outside of that container, then that controller module 120 may store workflow state information 1430 at a location external to the container. As shown in the FIG. 14, workflow state information 1430 can be stored at an operational entity 110 and database 130. In some embodiments, if a controller module 120 manages an operational entity 110 that includes a database as an element 220, then the controller module 120 may utilize that database to store workflow state information 1430. When a controller module 120 is initiated, it may invoke the describe functions 710 of the operational entities 110 that it manages in order to learn about those operational entities. If an operational entity 110 is storing workflow state information 1430, then it may inform the controller module 120 about that information. In this manner, a controller module 120 may learn about an in-progress implementation of a workflow 1410 along with the corresponding workflow state information 1430.

Figure 15:
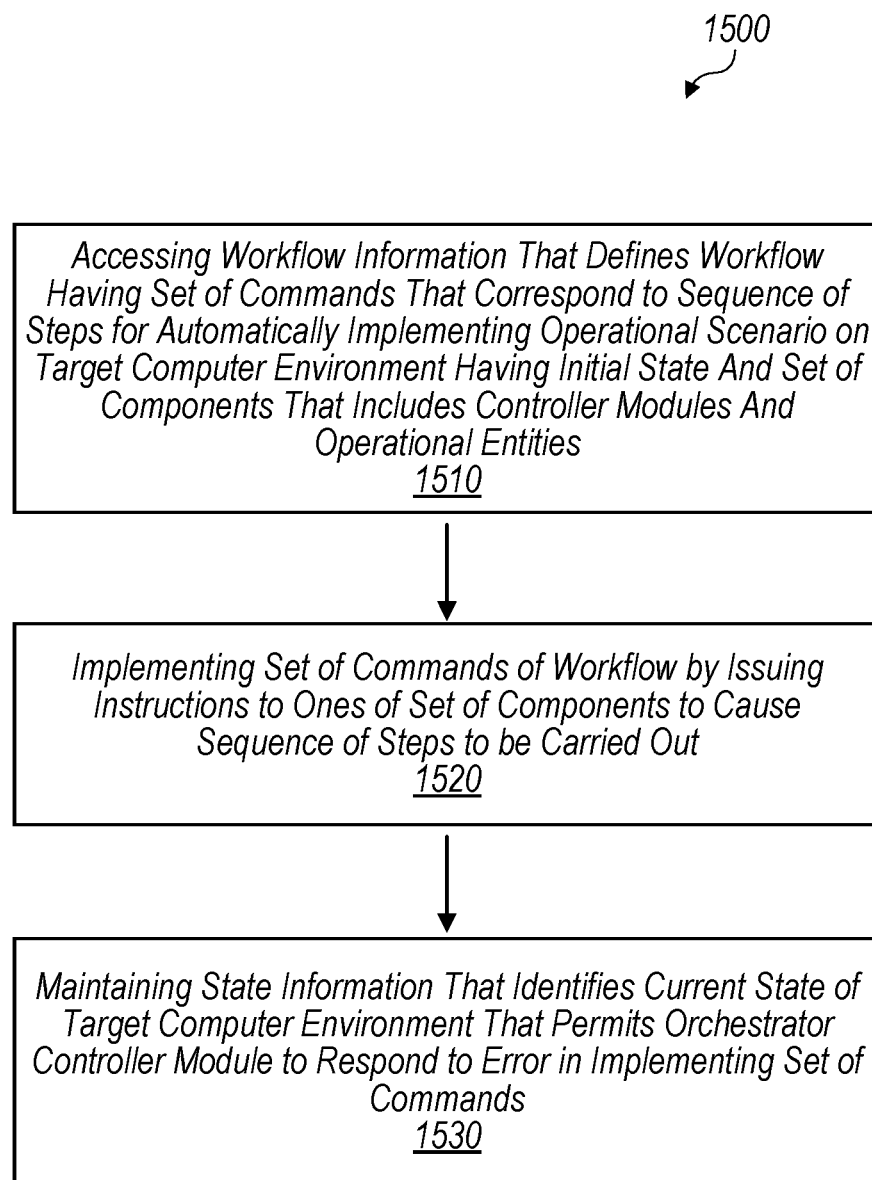
FIGS. 15 and 16 are flow diagrams illustrating example methods relating to implementing a workflow, according to some embodiments.

Turning now to FIG. 15, a flow diagram of a method 1500 is shown. Method 1500 is one embodiment of a method performed by an orchestrator controller module (e.g., a controller module 120) in order to implement a workflow on a target computer environment (e.g., target environment 137). Method 1500 may be performed by executing a set of program instructions stored on a non-transitory computer-readable medium. In some embodiments, method 1500 may include additional steps. As an example, the orchestrator controller module may receive a request (e.g., workflow request 1405) to perform the operational scenario. In some cases, the request may specify a name value corresponding the workflow that permits the workflow information to be accessed.

Method 1500 begins in step 1510 with the orchestrator controller module accessing workflow information (e.g., operational information 135) that defines a workflow (e.g., a workflow 1410) having a set of commands that correspond to a sequence of steps for automatically implementing an operational scenario on a target computer environment having an initial state and a set of components that includes controller modules and operational entities. In some cases, the operational scenario may include starting up a database service having one or more database servers capable of performing database transactions on behalf of users of the computer system.

In step 1520, the orchestrator controller module implements the set of commands of the workflow by issuing instructions to ones of the set of components to cause the sequence of steps to be carried out. Implementing the set of commands may cause one or more state changes in the target computer environment relative to the initial state. In various embodiments, the set of commands are defined such that ones of the set of commands can be implemented to transition the target computer environment from the initial state to a specified end state and reversed to transition the target computer environment from the current state back to the initial state. The one or more state changes in the target computer environment may include a state change in which a particular component of the set of components instantiates a new component in the target computer environment. In some cases, the new component may have a different role in the target computer environment than the particular component.

In step 1530, the orchestrator controller module maintains state information (e.g., workflow state information 1430) that identifies a current state of the target computer environment that permits the orchestrator controller module to respond to an error in implementing the set of commands. In response to detecting that a particular step of the sequence of steps failed to be carried out, the orchestrator controller module may reattempt the particular step by reissuing, to ones of the set of components, one or more instructions corresponding to the particular step. In some cases, the error may prevent the set of commands from being completed. Accordingly, orchestrator controller module may respond to the error by reversing the one or more state changes in the target computer environment to return the target computer environment to the initial state. In some embodiments, reversing the one or more state changes includes traversing backwards through an order in which ones of the set of commands have been completed. While performing the traversing, the orchestrator controller module may undo the one or more state changes caused by those commands that have been completed.

In some cases, the error includes the orchestrator controller module crashing while implementing the set of commands. The state information may allow for a reinstated orchestrator controller module to subsequently resume implementation of the set of commands. In some embodiments, the state information is maintained by the orchestrator controller module at a location (e.g., database 130) that is external to the orchestrator controller module such that the orchestrator controller module crashing does not cause the state information to be lost. The state information may be maintained by the orchestrator controller module at an operational entity within the target computer environment.

Figure 16:
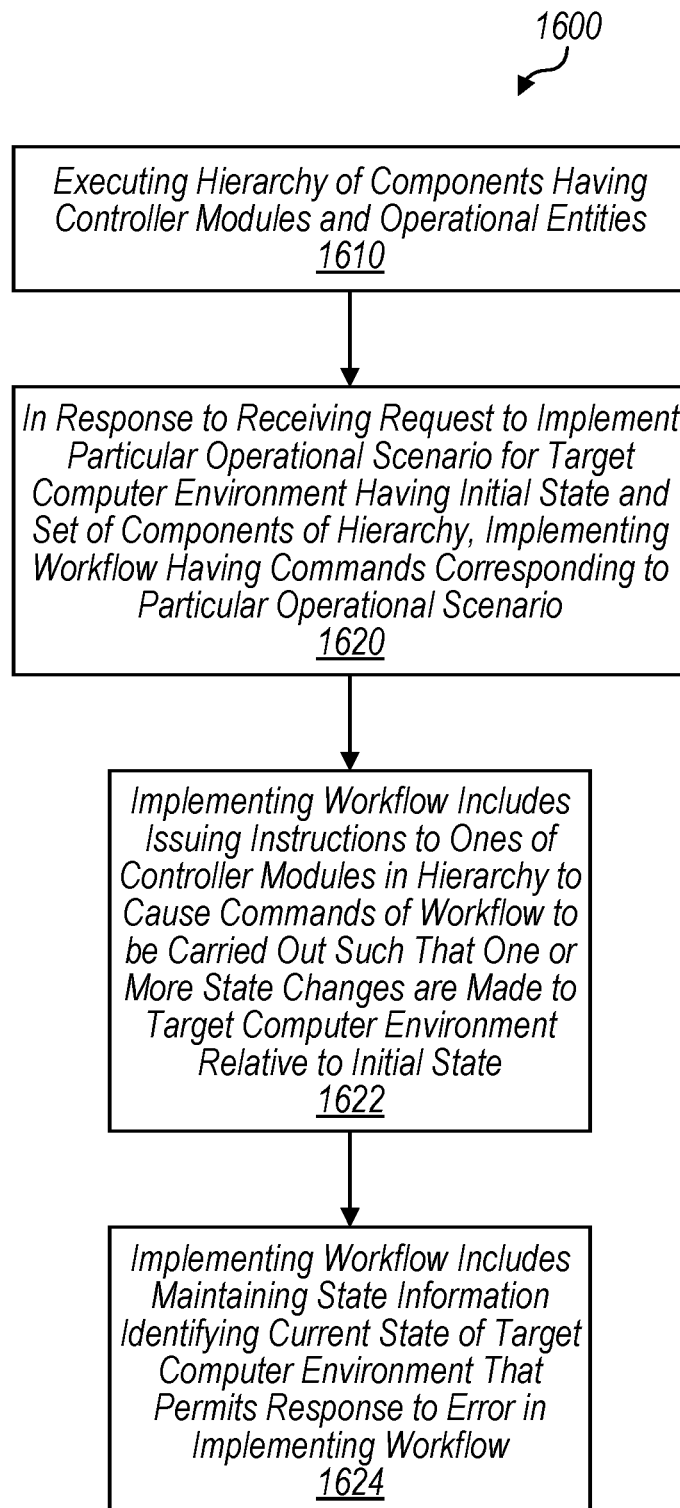

Turning now to FIG. 16, a flow diagram of a method 1500 is shown. Method 1600 is one embodiment of a method performed in order to implement a workflow on a target computer environment (e.g., target environment 137). Method 1600 may be performed by executing a set of program instructions stored on a non-transitory computer-readable medium. In some embodiments, method 1600 may include additional steps. As an example, the orchestrator controller module may receive a request (e.g., workflow request 1405) to perform the operational scenario. In some cases, the request may specify a name value corresponding the workflow that permits the workflow information to be accessed.

Method 1600 begins in step 1610 with a computer system executing a hierarchy of components having controller modules and operational entities. In various cases, the hierarchy may include an orchestrator controller module at a top level of the hierarchy that is executable to implement an operational scenario by carrying out a set of commands that correspond to a sequence of steps of the operational scenario.

In step 1620, in response to receiving a request to implement a particular operational scenario for a target computer environment having an initial state and a set of components of the hierarchy, the orchestrator controller module implementing a workflow having commands corresponding to the particular operational scenario.

In step 1622, as part of implementing the workflow, the orchestrator controller module issues instructions to ones of the controller modules in the hierarchy to cause the commands of the workflow to be carried out such that one or more state changes are made to the target computer environment relative to the initial state. In some cases, issuing the instructions may cause a particular controller module within the hierarchy to implement a second, different workflow. The workflow and the second workflow may form a hierarchy of workflows that includes the workflow at a top level of the hierarchy of workflows and the second workflow at a next level of the hierarchy of workflows. In some cases, the particular controller module may implement the second workflow by issuing instructions to components in a next level of the hierarchy of components relative to a level that includes the particular controller module.

In step 1624, as part of implementing the workflow, the orchestrator controller module maintains state information (e.g., workflow state information 1430) identifying a current state of the target computer environment that permits a response to an error in implementing the workflow. In some cases, the error may include the orchestrator controller module hanging while implementing the workflow. Accordingly, the state information may permit a reinstated orchestrator controller module to subsequently resume implementation of the workflow. In some embodiments, the state information specifies configuration variables (e.g., variables 340) for the set of components included in the target computer environment.

Figure 17:
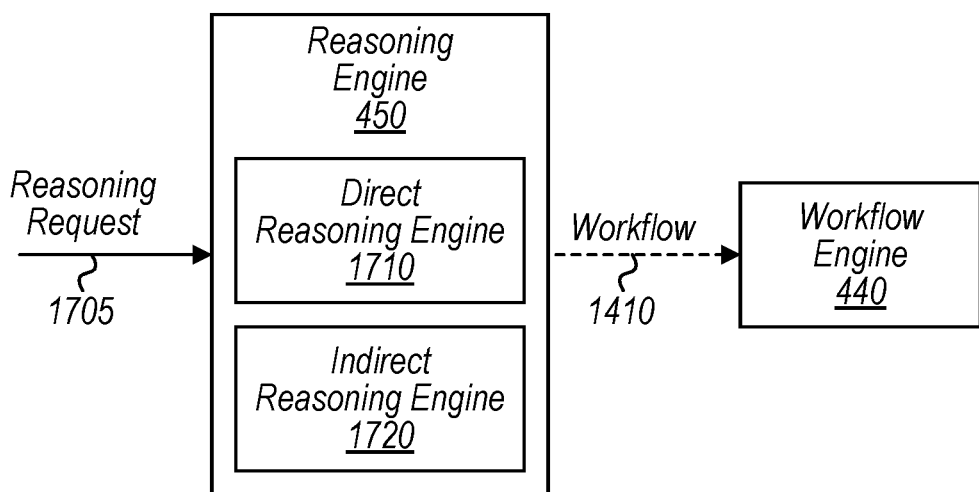
FIG. 17 is a block diagram illustrating example elements of a reasoning engine, according to some embodiments.

Turning now to FIG. 17, a block diagram of a reasoning engine 450 is depicted. In the illustrated embodiment, reasoning engine 450 includes a direct reasoning engine 1710 and an indirect reasoning engine 1720. As illustrated, reasoning engine 450 can provide a workflow 1410 to workflow engine 440 for implementation.

In some embodiments, reasoning engine 450 may be implemented differently than shown. For example, reasoning engine 450 may operate without workflow engine 440. That is, reasoning engine 450 may generate and implement steps to move system 100 to an intended state. This may involve the reasoning engine 450 assessing the state of system 100, issuing a command that control API 700 supports, and then reassessing the state of system 100 until the intended state is reached. For example, reasoning engine 450 may receive a reasoning request 1705 to transition an application version from "A" to "X". Accordingly, reasoning engine 450 may issue a transition command to transition the application version from "A" to "X". But if, for example, a database server associated with the transition command crashes, then reasoning engine 450 may identify this new state of system 100. Accordingly, reasoning engine 450 may generate and issue a new command to transition the database server's status from "offline" to "online." Reasoning engine 450 may then reattempt transitioning the application version from "A" to "X". In this manner, reasoning engine 450 may implement steps in an order much like workflow engine 440, but the steps can be generated on the fly or in bulk up front.

Direct reasoning engine 1710, in various embodiments, is a set of software routines executable to generate a workflow 1410. As shown, reasoning engine 450 can receive a reasoning request 1705. Instead of specifying a workflow 1410 to be implemented, reasoning request 1705 may specify a high-level goal (e.g., a desired state of the system under management) or a command such as transition version command to be achieved. For example, reasoning request 1705 might specify that a database service entity 110 should be instantiated that includes one or more database server entities 110 and one or more metric server entities 110. That reasoning request, however, may also not specify commands for instantiating the database service entity 110. Accordingly, direct reasoning engine 1710 may apply direct reasoning concepts in order to generate a workflow 1410 that can be implemented to achieve the high-level goal. In various cases, direct reasoning engine 1710 may use information, such as relationship information 330 included in blueprints 210, to identify how operational entities 110 are related. Based on how operational entities 110 are related, direct reasoning engine 1710 may determine that particular operational entities 110 should be instantiated before other operational entities 110. Based on this reasoning, direct reasoning engine 1710 may generate an ordered set of commands.

Continuing with the previous example, the reasoning request 1705 may specify a UUT 321 or a UUID 325 for the database service entity 110. Direct reasoning engine 1710 may use that information to access a blueprint 210 for that database service entity 110. That blueprint may indicate that the database service entity 110 comprises a database server entity 110 and a metric server entity 110. Based on the database service entity's blueprint 210, direct reasoning engine 1710 may access a blueprint 210 for the database server entity 110 and a blueprint 210 for the metric server entity 110. Those blueprints 210 may indicate a relationship 331 between the database server entity 110 and the metric server entity 110. In some cases, the relationship 331 might indicate that the metric server entity 110 depends on the existence of the database server entity in order for the metric server entity 110 to operate correctly. Accordingly, direct reasoning engine 1710 may determine, based on the relationship, that the database server entity 110 needs to be instantiated before the metric server entity 110. Based on that determination, direct reasoning engine 1710 may generate a set of commands that includes a command for instantiating the database server entity 110, where the set of commands are ordered such that that command comes before another command for instantiating the metric server entity 110.

Indirect reasoning engine 1720, in various embodiments, is a set of software routines executable to generate a workflow 1410. In contrast to direct reasoning engine 1710, indirect reasoning engine 1720 may apply indirect reasoning concepts in order to generate a workflow 1410. For example, a database table might have a lot of expensive scans and a possible solution might be to create an index. Accordingly indirect reasoning engine 1720 may determine that an index should be created for that database table (e.g., by analyzing information that indicates that an index has been beneficial for other database tables that had expensive scans). Indirect reasoning engine 1720 may generate a workflow 1410 having a set of commands to create the index for that database table. After a workflow 1410 has been generated by reasoning engine 450, the workflow 1410 may be provided to workflow engine 440 for implementation. In some cases, a workflow 1410 may be stored (e.g., at database 130) so that the workflow 1410 can be retrieved to implement the high-level goal again without having to be regenerated.

Figure 18:
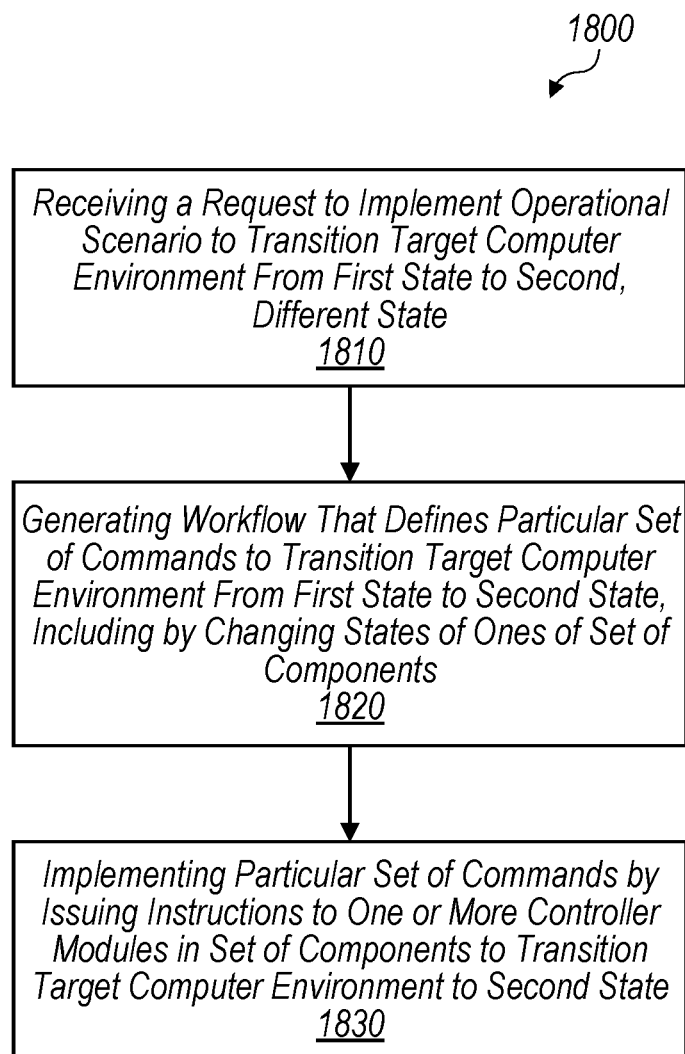
FIGS. 18 and 19 are flow diagrams illustrating example methods relating to generating a workflow, according to some embodiments.

Turning now to FIG. 18, a flow diagram of a method 1800 is shown. Method 1800 is one embodiment of a method performed by an orchestrator controller module (e.g., a controller module 120) in order to generate and implement a workflow (e.g., a workflow 1410) on a target computer environment (e.g., target environment 137). Method 1800 may be performed by executing a set of program instructions stored on a non-transitory computer-readable medium. In some embodiments, method 1800 may include additional steps. As an example, the orchestrator controller module may store a generated workflow in a database to permit the operational scenario to be re-implemented without having to regenerate the workflow.

Method 1800 begins in step 1810 with the orchestrator controller module receiving a request (e.g., reasoning request 1705) to implement an operational scenario to transition a target computer environment from a first state to a second, different state. The target computer environment may have a set of components that include controller modules and operational entities. In various cases, the received request may not specify commands for transitioning the target computer environment from the first state to the second state. The request may identify first and second components to be instantiated in the target computer environment as part of the operational scenario. The operational scenario may include starting up a database service having a set of database servers capable of performing database transactions on behalf of users of the computer system.

In step 1820, the orchestrator controller module generates a workflow that defines a particular set of commands to transition the target computer environment from the first state to the second state, including by changing states of ones of the set of components. In various cases, the orchestrator controller module may access blueprints (e.g., blueprints 210) that correspond to the set of components, the first component, and the second component. The blueprints may define relationships between components that affect an order in which the particular set of commands are implemented. For example, the relationships may include a dependence relationship in which the first component depends on the existence of the second component in order for the first component to operate in a valid manner. As such, the particular set of commands may include a first command to instantiate the first component and a second command to instantiate the second component. The particular set of commands may be ordered based on the dependence relationship such that the second command precedes the first command in implementation.

In step 1830, the orchestrator controller module implements the particular set of commands by issuing instructions to one or more controller modules in the set of components to transition the target computer environment to the second state. In some cases, the particular set of commands may be defined such that the particular set of commands can be implemented in a forward order to transition the target computer environment from the first state to the second state and implemented in a backwards order to transition the target computer environment to the first state. In response to detecting an error in implementing the particular set of commands, the orchestrator controller module may transition the target computer environment from a current state back to the first state according to the backwards order. In some cases, changing the states of ones of the set of components may include updating an operational entity from a first version to a second version.

Figure 19:
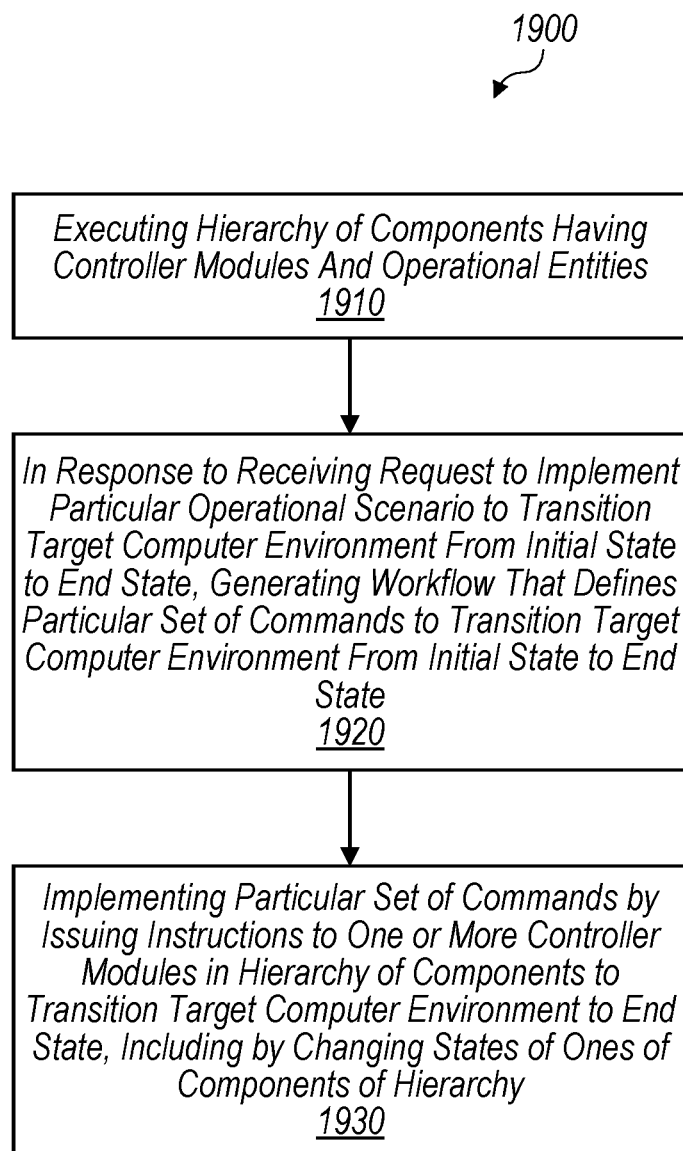

Turning now to FIG. 19, a flow diagram of a method 1900 is shown. Method 1900 is one embodiment of a method performed in order to generate and implement a workflow (e.g., a workflow 1410) on a target computer environment (e.g., target environment 137). Method 1900 may be performed by executing a set of program instructions stored on a non-transitory computer-readable medium. In some embodiments, method 1900 may include additional steps. For example, the orchestrator controller module may store a generated workflow in a database to permit the operational scenario to be re-implemented without having to regenerate the workflow.

Method 1900 begins in step 1910 with a computer system executing a hierarchy of components having controller modules and operational entities. The hierarchy may include an orchestrator controller module at a top level of the hierarchy that is executable to implement an operational scenario by carrying out a set of commands that correspond to a sequence of steps of the operational scenario.

In step 1920, in response to receiving a request (e.g., reasoning request 1705) to implement a particular operational scenario to transition a target computer environment from an initial state to an end state, the orchestrator controller module generates a workflow that defines a particular set of commands to transition the target computer environment from the initial state to the end state. In various cases, the request may not identify the particular set of commands. The particular operational scenario may involve creating an operational entity. As such, generating the workflow may include accessing a blueprint (e.g., a blueprint 210) for the operational entity. In some cases, the blueprint may identify a second operational entity that is to be created in addition to the operational entity. Consequently, the orchestrator controller module may determine, based on a relationship between the operational entity and the second operational entity, an order in which to create the operational entity and the second operational entity. The particular set of commands may be generated based on the determined order.

In step 1930, the orchestrator controller module implements the particular set of commands by issuing instructions to one or more controller modules in the hierarchy of components to transition the target computer environment to the end state, including by changing states of ones of the components of the hierarchy.

Figure 20A:
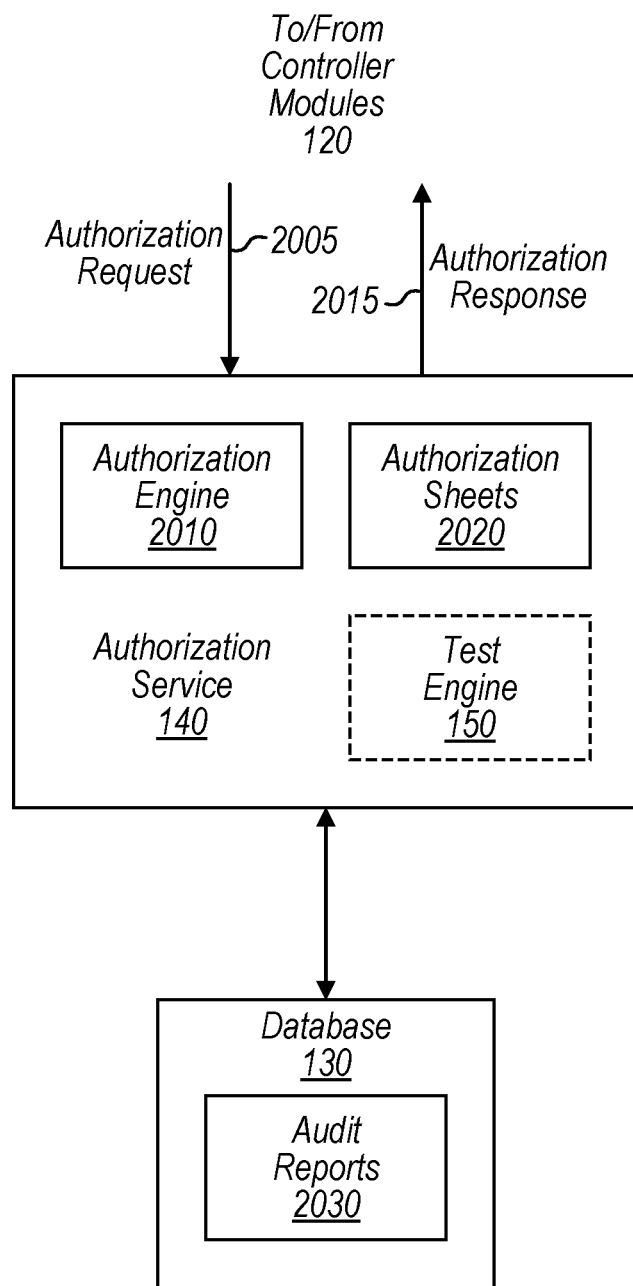
FIGS. 20A and 20B are block diagrams illustrating example elements of an authorization service, according to some embodiments.

Turning now to FIG. 20A, a block diagram of authorization service 140 is depicted. As mentioned above, it can be important to ensure that an actor is not able to issue unauthorized instructions to the system 100 to achieve some undesired ends. To protect system 100, authorization service 140 may be employed to audit the actions being requested by an actor interfacing with the system 100. In the illustrated embodiment, authorization service 140 includes authorization engine 2010, authorization sheets 2020, and test engine 150 and may interface with database 130 including audit reports 2030. As shown in FIG. 20A, in some embodiments, authorization service 140 is a separate authorization component from controller modules 120 to audit commands issued to controller modules 120 and/or operational entities 110. In other embodiments, authorization service 140 may be implemented differently than shown. For example, as will be discussed below with FIG. 20B, authorization service 140 may be integrated into controller modules 120 (or orchestrator controller module 120), authorization service 140 may not include test engine 150, etc.

Authorization engine 2010, in various embodiments, is a set of instructions executable to perform the auditing of issued commands. For example, a particular user may have issued a command to an orchestrator controller module 120 to transition a specific database cluster from online to offline. Before the orchestrator controller module 120 begins implementing this command, authorization engine 2010 may confirm whether the particular user (or a controller module 120 if it had issued the command) is authorized to issue such a command. In the illustrated embodiment, authorization service 140 receives indications of what commands have been issued via authorization requests 2005. Accordingly, when a controller module 120 receives a command from an entity (e.g., a user, a higher-level controller module 120, etc.) to perform one or more actions, the controller module 120 may send a request 2005 to authorize performance of a received command and identify various information about the command such as the actions to be performed, the issuer of the command, or other contextual information about the command. In the illustrated embodiment, authorization engine 2010 evaluates the information included in authorization requests 2005 against a set of security rules defined in authorization sheets 2020 in order to verify that the issued commands comply with the permissible actions defined by the set of security rules. One example of authorization sheets 2020 is discussed below in greater detail below with respect to FIG. 21.

As part of the audit process, in various embodiments, authorization engine 2010 (or others component of service 140 or system 100) may authenticate various entities associated with authorization requests 2005, which may occur before (or after) receiving requests 2005. In some embodiments, this includes authenticating the initial issuer (e.g., a user or a controller module 120) of the command. Accordingly, if a user is the issuer, an authentication prompt asking for a username and password may be presented to the user to confirm his or her identity. In some embodiments, this includes authenticating the controller module 120 making an authorization request 2005. In some embodiments, to implement this authentication, operational entities 110, controller modules 120, and/or authentication service 140 may be provisioned with certificates for public-key pairs by maintained by components 110, 120 and 140. Components 110, 120, and 140 may then exchange these certificates to mutually authenticate one another and establish secure communication links. For example, a controller model 120 and authorization service 140 may exchange certificates in an Elliptic-curve Diffie-Hellman (ECDH) exchange to mutually authenticate and establish a shared secret for a Transport Layer Security (TLS) session through which authorization requests 2005 and authorization responses 2015 may be securely exchanged.

In various embodiment, the auditing performed by authorization engine 2010 also includes maintaining a log of audit reports 2030 in database 130. Accordingly, when an authorization request 2005 is received, authorization engine 2010 may record various information about the request 2005 in an audit report 2030. This information may include who issued the command such as a user's or component's name (e.g., an identifier value of the orchestrator controller module 120) as well as who is the command's target such as a name or UUID of a controller module 120 or operational entity 110. This information may include what action or actions are being instructed by the command. This information may include when the command was issued. This information may include an indication of the command origin such as an IP address, UDP or TCP port number, etc. Authorization engine 2010 may also record information about the corresponding authorization response 2015 such as whether a given request 2005 was granted or denied—and the reasons for denial in such an event. In some embodiments, database 130 may restrict authorization service 140's access to audit reports 2030 such that service 140 is permitted to write audit reports 2030 but not to delete any reports 2030. Thus, audit reports 2030 may be preserved even if authorization service 140 becomes compromised or an authorized manager of service 140 attempts to abuse his or her access privileges.

Based on its evaluation of authorization sheets 2020 for a given request 2005, authorization engine 2010 may issue a corresponding response 2015 indicating whether a received command is authorized or not. As will be discussed below with respect to FIG. 22, in some embodiments, authorization engine 2010 may include a signed token in its authorization response 2015 that is usable by subsequent components (e.g., controller modules 120 and/or operational entities 110) to confirm that performance one or more actions identified in an issued command have been authorized by service 140. In doing so, an initial controller module 120 (e.g., orchestrator controller module 120) may handle interaction with authorization service 140 to obtain a token and then can pass the token on to the one or more other components performing the actions and who verify that approval for the actions has been granted without having to contact authorization service 140 again for the same approved actions.

Figure 20B:
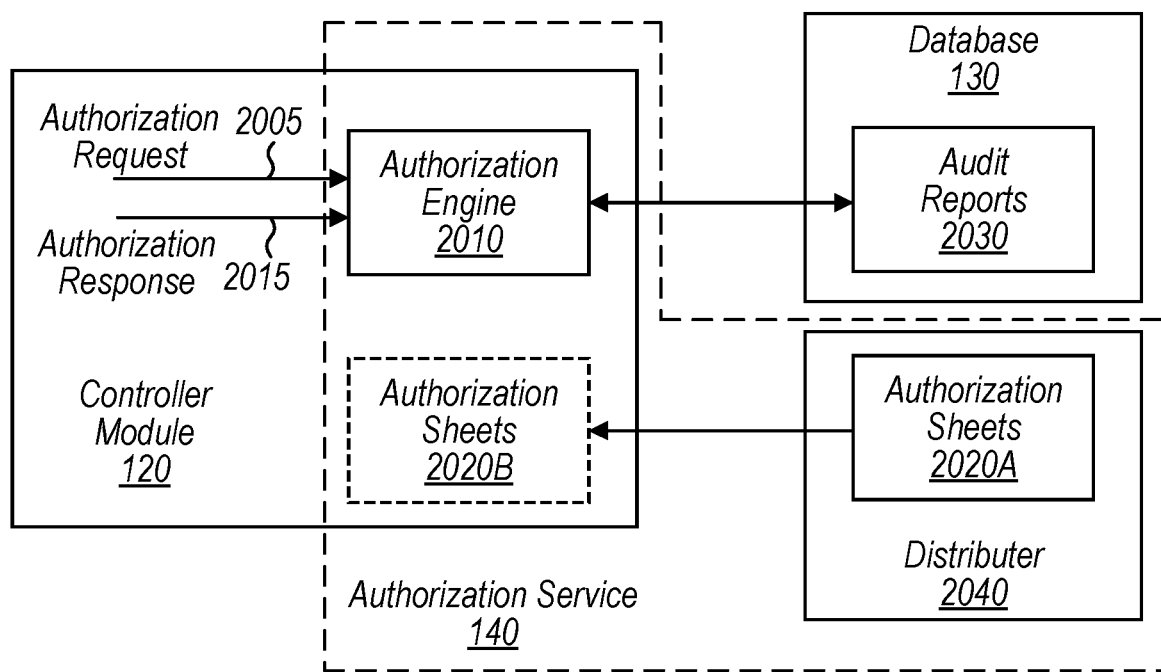

Turning now to FIG. 20B, another block diagram of authorization service 140 is depicted. In the illustrated embodiment depicted in FIG. 20A discussed above, components of authorization service 140 are distinct from controller modules 120 and/or operational entities 110. In some embodiments, however, components of authorization service 140 may be interspersed among components 120 and/or 110. For example, as shown in FIG. 20B, an instance of authorization engine 2010 may be included in a controller module 120 in order to verify that commands received by the controller module 120 comply with the permissible actions defined by rules within authorization sheets 2020. In the illustrated embodiment, authorization service 140 also include a distributer 2040 that maintains a master copy of authorization sheets 2020A and distributes copies of authorization sheets 2020B to each instance of authorization engine 2010 to facilitate its locally performed evaluations. In some embodiments, a local copy of authorization sheets 2020B may contain only the rules applicable to that engine 2010 rather than a full copy of each rule contained in authorization sheets 2020A. In various embodiments, distributer 2040 also signs each copy of authorization sheets 2020B to preserve its integrity. In some embodiments, authorization service 140 may be implemented differently than shown. For example, each instance of authorization engine 2010 may be responsible for maintaining its own sheets 2020 rather than receiving a copy of sheets 2020 from a centralized entity, instances of authorization engine 2010 may also be located within operational entities 110, etc.

Turning now to FIG. 21, a block diagram of an authorization sheet 2020 is depicted. As shown, authorization sheets 2020 may include a list of rules 2100, which, as mentioned above, may be evaluated by authorization engine 2010 when determining whether to grant an authorization request 2005. In the illustrated embodiment, rules 2100 include permissions 2102, subjects 2104, actions 2106, and other parameters 2108. In other embodiments, rules 2100 may include other suitable criteria for evaluating issued commands.

Permissions 2102, in various embodiments, define whether a given rule 2100 grants rights or restricts rights. For example, the permission of rule 2100A indicates that it is restrictive with respect to the subject 2104 John while the permission of rule 2100B indicates that it is permissive with respect to the subject 2104 Jan.

Subjects 2104, in various embodiments, identify the issuer/requester (i.e., the one issuing the command being evaluated) with respect to a given rule 2100. For example, the subjects 2104 for the rules 2100B and 2100C indicate that both rules 2100 pertains to the requester Jan. Accordingly, when a request 2005 is received for a given command to be issued to one of the components in the hierarchy, authorization engine 2010 may verifying whether a requester of the command corresponds to authorized requester identified by subjects 2104. Although the examples depicted in FIG. 21 are user names, other forms of identification may be used such as IP addresses, UUIDs, etc.

Actions 2106, in various embodiments, identify actions acceptable or unacceptable with respect to a given rule 2100. For example, actions for rules 2100B and 2100C indicate that subject Jan is allowed to request the actions "create" and "transition." In the case of rule 2100A, an asterisk is used to reject all actions with respect to subject 2104 John. Accordingly, when a request 2005 is received for a given command, authorization engine 2010 may, in additional to verifying elements 2102 and 2104, also verify that whether an action to be performed by the command is one of the authorized actions 2106.

Parameters 2108, in various embodiments, include various additional criteria associated with a given action 2106. For example, rule 2100B specifies the parameters of "DB" and "instance" to indicate that the action "create" for "Jan" is restricted to instances of databases. Other examples of parameters 2108 may include time restrictions (e.g., when action can (or cannot) be requested), target restrictions (e.g., identifying a particular UUID for a target where an action may (or may not) be performed), IP address restrictions, etc.

In various embodiments, authorization service 140 provides a user interface, which may be a command line interface or graphical user interface, to allow a security team to set various ones of rules 2100. In some embodiments, the security team is distinct from the potential users administrating the system. The rules 2100 may also be signed, downloaded, and validated periodically to ensure that they have not be tampered with.

Figure 22:
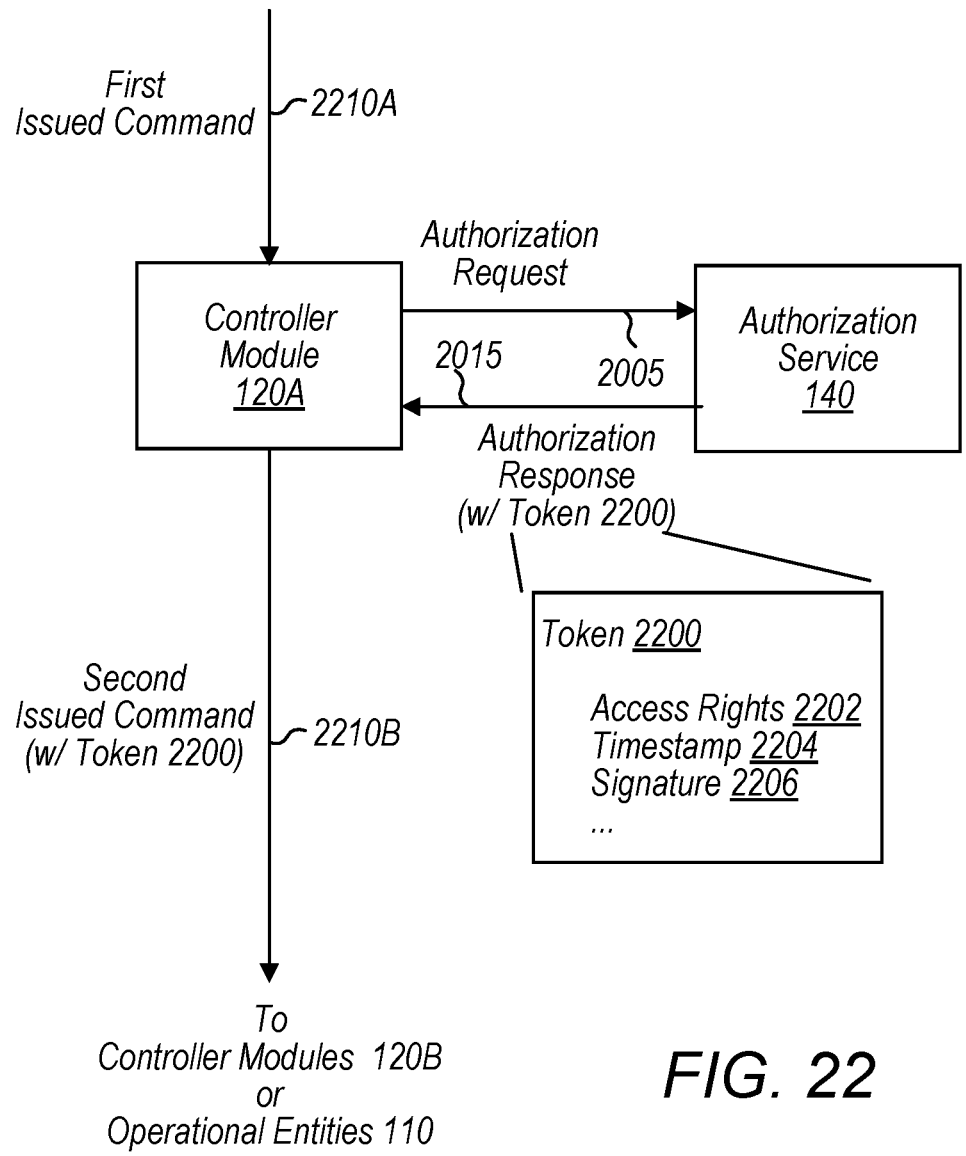
FIG. 22 is a block diagram illustrating example elements of a token created by the authorization service, according to some embodiments.

Turning now to FIG. 22, a block diagram of an exchange using a token 2200 is depicted. As mentioned above, in some embodiments, authorization service 140 may issue a token 2200 that is usable by controller modules 120 and/or operational entities 110 to confirm that a set of actions associated with a received command has already been authorized by authorization service 140. For example, a first controller module 120A might receive a first issued command 2210A to create multiple instances of a database and, to implement this command 2210A, intend to issue a second command 2210B to each controller module 120 (or operational entity 110) handing creation of a respective one of the database instances. In the illustrated embodiment, controller module 120A can issue an authorization request 2005 corresponding to the received first command 2210A. In response to approving the request 2005, authorization service 140 may send back an authorization response 2015 that includes a token 2200 indicating that the various actions needed to create the database instances have been authorized. Controller module 120A can then include the token 2200 in the second set of commands 2210B issued to subsequent controller modules 120 and/or operational entities 110, which can determine, from token 2200, what actions have already been authorized and begin performing them without having to recontact authorization service 140 for permission to perform those actions.

Token 2200 may include any suitable content for facilitating confirmation that performance of commands 2210 has been authorized by authorization service 140. In the illustrated embodiment, token 2200 includes access rights 2202, timestamp 2204, and signature 2206. In other embodiment, token 2200 may include more (or less) components than shown. In some embodiments, token 2200 may be implemented as a JSON web token (JWS), Kerberos token, X.509 certificate, or some other standard format for a signed attestation.

Access rights 2202, in various embodiments, indicate a set of particular actions that have been approved for performance by authorization service 140 and may, in general, include various elements from rules 2100 discussed above. Accordingly, a given right 2202 may identify not only identify a given action 2106 but also indicate a particular subject 2104 permitted to issue a command for that action 2106. Thus, in response to receiving a command 2210B from controller module 120A to perform a particular action, a controller module 120B may verify that controller module 120A is identified in access rights 2202 as being permitted to request the particular action. In some embodiments, access rights 2202 may also identify the targets authorized to perform particular actions, which may be identified using an IP address, UUID, etc. Accordingly, a controller module 120B receiving a token 2200 may confirm that it is identified in token 2200 as an authorized target to perform a particular action identified in command 2210B.

Timestamp 2204 and signature 2206, in various embodiments, are included to facilitate verification for a token 2200 by subsequent recipients such as controller modules 120 or operation entities 110. In general, timestamp 2204 may be some restriction for how long an issued token 2200 is valid. Accordingly, in one embodiment, timestamp 2204 may be a time value indicating when a token 2200 was issued, and components 120 and 110 may be operable to accept a token 2200 only within some window after timestamp 2204. In another embodiment, timestamp 2204 may be a start time and a stop time indicating a window in which actions authorized by access rights must be performed. In yet another embodiment, timestamp 2204 may indicate an expiration time value after which token 2200 is no longer valid. Signature 2206 may generally be used to ensure that the integrity of token 2200 is preserved—or, said differently, that token 2200 has not been tampered with (or is a counterfeit). Accordingly, in some embodiments, signature 2206 is generated from the contents of token 2200 by a private key maintained by authorization service 140 and having a corresponding trusted public key known to components 120 and 110. In response to receiving a token 2200, a component 110 or 120 may use the public key to verify the signature 2206 against the contents of token 2200 before performing any actions identified in issued command 2210B.

Figure 23:
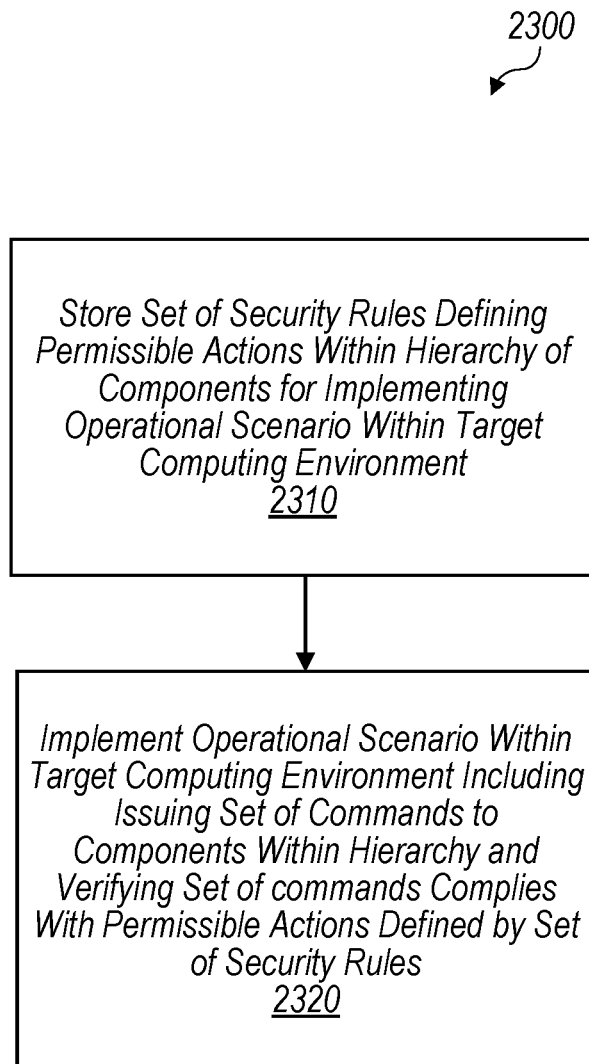
FIG. 23 is a flow diagram illustrating an example method relating to the authorization service, according to some embodiments.

Turning now to FIG. 23, a flow diagram of a method 2300 is shown. Method 2300 is one embodiment of a method performed by a computer system having an authorization service associated with a target computing environment such as authorization service 140. In various embodiments, performance of method 2300 may improve the security of the target computing environment.

Method 2300 begins in step 2310 with the computer system storing a set of security rules (e.g., rules 2100 included in authorization sheets 2020) defining permissible actions within a hierarchy of components (e.g., operational entities 110, controller modules 120, etc.) for implementing an operational scenario within a target computing environment. In step 2320, the computer system implements the operational scenario within the target computing environment including issuing a set of commands to components within the hierarchy and verifying that the set of commands complies with the permissible actions defined by the set of security rules.

In various embodiments, issuing the set of commands includes a first component of the hierarchy sending, to an authorization service (e.g., authorization service 140) performing the verifying, an authorization request (e.g., authorization request 2005) for a particular issued command and, in response to the authorization service determining that the particular command complies with the permissible actions defined by the set of security rules, the first component receiving a response (e.g., authorization response 2015) authorizing performance of the command. Based on the authorizing response, the first component performs one or more actions identified in the issued command. In some embodiments, the verifying includes the authorization service authenticating a source of the authorization request prior to sending the authorizing response. In some embodiments, the verifying includes the authorization service storing, in a log, a report (e.g., audit reports 2030 in database 130) identifying reception of the authorization request. In some embodiments, the received authorizing response includes a token (e.g., token 2200) indicating that a second component in the hierarchy is authorized to perform of a particular action, and performing the one or more actions includes the first component issuing, to the second component, a command (e.g., second issued command 2210B) including the token, the token being verifiable by the second component to confirm performance of the particular action has been authorized. In some embodiments, the token identifies the particular action (e.g., in access rights 2202), the first component, and a signature (e.g., signature 2206) of the authorization service.

In various embodiments, the set of rules includes a rule identifying an authorized requester (e.g., subject 2104) and one or more authorized actions (e.g. actions 2106) associated with the authorized requester, and the verifying includes receiving an indication of a command to be issued to one of the components in the hierarchy, verifying whether a requester of the command corresponds to the authorized requester, and verifying whether an action to be performed by the command is one of the authorized actions.

In various embodiments, method 2300 further includes a first component in the hierarchy receiving a request to issue a command to a second component in the hierarchy, and the verifying includes the first component verifying (e.g., using authorization sheets 2020B) that the requested command complies with the permissible actions defined by the set of security rules prior to the first component issuing the command to the second component. In some embodiments, the second component is an operational entity (e.g., operational entity 110) operable to perform the issued command. In some embodiments, the second component is a controller module (e.g., a controller module 120) operable to cause one or more operational entities to perform the issued command.

Figure 24:
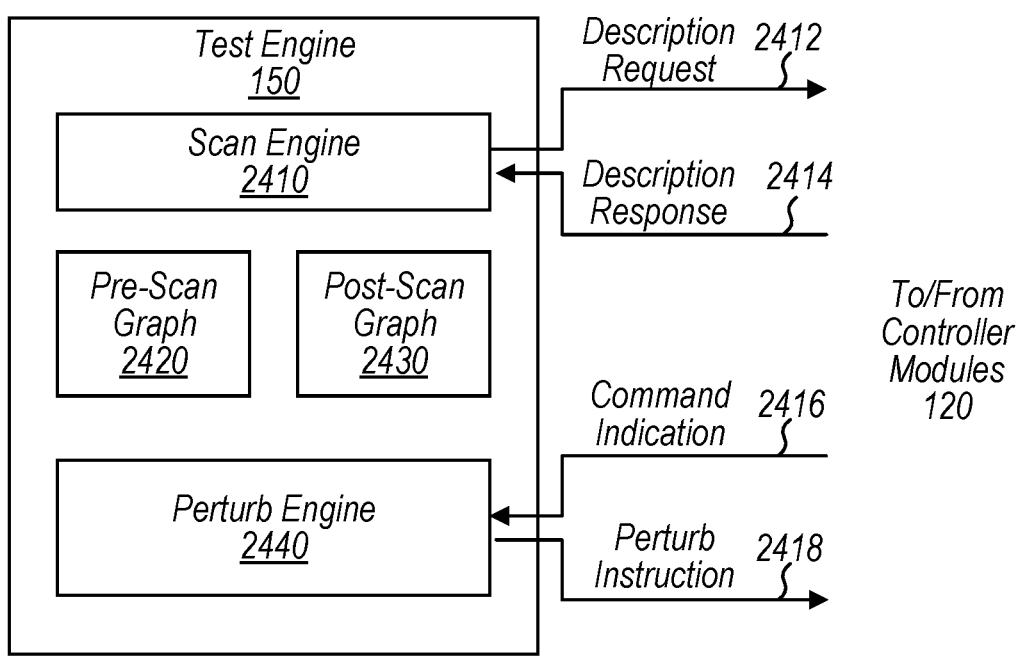
FIG. 24 is a block diagram illustrating example elements of a testing engine, according to some embodiments.

Turning now to FIG. 24, a block diagram of testing engine 150 is depicted. As mentioned above, performing adequate testing can be important for ensuring that a system operates reliably. In many instances, however, it may be difficult to test every possible state that a system may experience during its lifetime-particularly when such testing is performed manually. As will be discussed below, in various embodiments, test engine 150 is employed to automate testing of system 100 through injection of various fault conditions in order to identify states in which system 100 fails to function properly. In the illustrated embodiment, test engine 150 includes a scan engine 2410, pre-scan graph 2420, post-scan graph 2430, and perturb engine 2440. In other embodiments, test engine 150 may be implemented differently than shown.

Scan engine 2410, in various embodiments, handles collection of information about controller modules 120 and operational entities 110 in order to facilitate operation of test engine 150. In some embodiments, this collection begins with performance of a discovery operation in which scan engine 2410 attempts to learn about the various controller modules 120 and operational entities 110 within system 100. Accordingly, scan engine 2410 may initially send a request 2412 asking orchestrator controller module 120 to describe itself and identify other controller modules 120, which directly (or indirectly in some embodiments) interact with orchestrator controller module 120. In some embodiments, orchestrator controller module 120 may send a response 2414 including a graph data structure identifying the controller modules 120 and operational entities 110 of system 100 as well as describing their arrangement. Based on this received information, scan engine 2410 may then send description requests 2412 to the newly discovered controller modules 120 and operational entities 110. These components may then send corresponding description responses 2414, which may include any of various suitable information. For example, a given controller module 120 or operational entity 110 may include a general description of itself, which may include identifying its role in system and including information such as its universally unique identifier (UUID), vendor, version, relationships to other controller modules 120 and/or operational entities 110, attributes, configuration variables, etc. In some embodiments, a given controller module 120 may also identify in a response 2414 various application programmable interface (API) functionality supported by it. For example, a controller module 120 may support API calls from scan engine 2410 to retrieve information about a controlled operational entity 110 such as fetching configuration information, logs, metrics, facts, etc. In various embodiments, controller modules 120 may also identify in their responses 2414 what injectable fault conditions are supported and can be request by test engine 150. For example, a controller module 120 that controls multiple database operational entities 110 may advertise that it supports killing a database instance (or a killing a container including a database instances), halting execution of a database instances, starving a database instance, etc.

In various embodiments, scan engine 2410 also collects various state information about the state of system 100 before injection of a fault condition and the state of system 100 after injection of a fault condition. Accordingly, scan engine 2410 may collect this information through the issuance of requests 2412 and reception of responses 2414 as discussed above. In some embodiments, controller modules 120 may also provide real-time telemetry data to scan engine 2410. For example, a controller module 120 maintaining database instances may indicate how many database instances are currently in operation and notify scan engine 2410 when that number changes. As noted above, in some embodiments, scan engine 2410 may receive information through test engine 150's integration into authorization service 140. For example, if a controller module 120 has been issued a command to provision another database instance, scan engine 2410 may learn of this issued command when the controller module 120 sends an authorization request 2005 to authorization service 140 to ask permission to implement the command. In the illustrated embodiment, metadata collected about the state before the fault-condition injection may be assembled into pre-scan graph 2420, and metadata collected about the state after the fault-condition injection may be assembled into post-scan graph 2430. As will be described below, scan engine 2410 (or some other component of test engine 150 in other embodiments) may compare these graphs 2420 and 2430 in order to glean insight into how an injected fault condition affects system 100. In some embodiments, to facilitate organization of this metadata and subsequent comparison of graphs 2420 and 2430, scan engine 2410 assembles graphs 2420 and 2430 as respective graph data structures. Accordingly, each node in pre-scan graph 2420 may correspond to a respective controller module 120 or operational entity 110 within system 100 and may include various metadata collected about the state of that module 120 or entity 110 before injection. Edges between nodes may correspond to relationships that exist between controller modules 120 and operational entities 110. Each node in post-scan graph 2430 may be similarly organized and include metadata about a given controller module 120's or operational entities 110's state after injection of a fault condition. Scan engine 2410 may then determine how a given injected fault condition affected system 100 by identifying what nodes have been altered between pre-scan graph 2420 and post-scan graph 2430 and then examining the contents of altered nodes to determine specific details resultant from the injected fault condition.

Perturb engine 2440, in various embodiments, is responsible for selecting fault conditions for injection and sending perturb instructions 2418 to the appropriate controller modules to cause their injection. These fault conditions may correspond to any suitable conditions that may cause system 100 to experience a fault. For example, in some embodiments, perturb engine 2440 may issue a perturb instruction 2418 to kill, suspend, halt, hang, or terminate an operational entity 110 to see its effect on system 100. In some embodiments, perturb engine 2440 may issue a perturb instruction 2418 to alter the resources available to an operational entity 110 to starve or overload the entity 110. For example, perturb engine 2440 may alter the processing resources available to an operational entity 110 causing the operational entity 110 to be assigned a lower execution priority, scheduled less frequently for execution, allocated less processors for execution, etc. Perturb engine 2440 may alter the memory resources available to an operational entity 110 by allocating it less volatile or non-volatile storage, swapping out pages to memory, etc. Perturb engine 2440 may alter the network resources available to an operational entity 110 by reducing the network bandwidth available for communications with the operational entity 110, increasing a latency for communications with the operational entity 110, dropping communications with the operational entity 110, disconnecting a network connection of the operational entity 110, etc. In various embodiments, perturb engine 2440 may inject fault conditions to interfere with the interdependencies of operational entities 110 within system 100. For example, an application server (a first operational entity 110) may rely on data stored in a database server (a second operation entity 110). To test a resiliency of the application server, perturb engine 2440 may corrupt the data in the database (or merely crash the database) to determine the effect on the application server. As another example, two or more operational entities 110 may work together in lockstep to achieve some purpose, and perturb engine 2440 may attempt to halt operation of one of the entities 110 to determine whether a deadlock can be successfully achieved. As another yet example, an operational entity 110 may rely on configuration data stored in a configuration file, and perturb engine 2440 may alter (or even corrupt) that data to interfere with its operation. Perturb engine 2440 may also inject other real-world fault conditions such as causing power failures, disconnecting blade servers, causing network switch failures, etc. As noted above, these fault conditions may be injected on the actual system while it is running/live (as opposed to operating on some theoretical model of the system).

Perturb engine 2440 may employ any suitable selection algorithm for determining what fault conditions to inject. In some embodiments, perturb engine 2440 may randomly select fault conditions and issue corresponding instructions 2418 to have those fault conditions injected. In various embodiments, perturb engine 2440 may be instructed to target a particular aspect of system 100, such as a particular operational entity 110 or group of entities 110, and select a fault condition associated with that aspect. In various embodiments, perturb engine 2440 monitors the commands being issued to controller modules 120 and/or operational entities 110 and selects fault conditions for injection based on the issued commands. For example, test engine 150 may be instructed to target an update process being performed with respect to system 100. In response to a controller module 120 providing an indication 2416 that a particular command has been issued to it with respect to the update process, perturb engine 2440 may select a corresponding fault condition and issue the appropriate perturb instruction 2418 in order to attempt to interfere with the update process. The selected fault condition may, for example, include terminating execution of an operational entity 110 being updated during the update process such as crashing a container including a database instance that is undergoing an update. The selected fault condition may, as another example, include increasing a network latency for communications with an operational entity 110 being updated during the update process in an attempt to cause a failure associated with the update. In some embodiments, perturb engine 2440 may maintain history information identifying previously injected fault conditions and determine, for each a set of fault conditions being considered for selection, a respective entropy score that indicates how different that fault condition is relative to what was previously injected as determined from the history information. Perturb engine 2440 may then select the fault condition having the entropy score indicating that it is the most different (or, at least, sufficiently different) from what was previously selected. In some embodiments, perturb engine 2440 may maintain history information identifying previously injected fault conditions that produced faults in system 100 and may reselect those fault conditions after an attempt has been made to correct for those conditions in order to determine whether those corrections have been successful.

As mentioned above, scan engine 2410 (or some other component) may compare metadata from pre-scan graph 2420 and post-scan graph 2430 in order to glean better insight about system 100. In some instances, this comparison may be performed to determine what may be affected by a particular injected fault condition. Such a determination may include scan engine 2410 identifying which operational entities 110 are directly affected by an injected fault condition—as well as identifying which operational entities 110 may indirectly be affected by an injected fault condition due to an unforeseen relationship between entities 110. For example, issuing a perturb instruction 2418 to crash one operational entity 110 might reveal that another operational entity 110 crashes—and thus some unperceived dependency may exist. Such a determination may also be used to establish that no operational entities 110 is affected (or at least not affected to the point of experiencing a fault) by an injected fault condition. For example, scan engine 2410 may determine that reducing a network connection's bandwidth by a particular amount does not result in a failure of operational entity 110 using the network connection. In some instances, this comparison may be performed to determine system 100's resiliency to a fault condition. For example, a controller module 120 may be instructed to maintain a particular number of instances of an operational entity 110. Perturb engine 2440 may then issue a perturb instruction 2418 to kill one of the instances of the operational entity 110 in order to determine whether the controller module 120 instantiates another instance of the operation entity 110 in response to the killing. In this example, a successful outcome may be that no difference is identified when pre-scan graph 2420 and post-scan graph 2430—meaning that system 100 was able to recover after the controller module 120 was able to successfully instantiate a new instance of the operational entity 110 to replace the previously killed one.

In many instances, using test engine 150 in this manner may allow system 100 to be thoroughly tested in order to better understand operation of system 100. With the knowledge obtained from test engine 150, administrators may be able to better identify potential vulnerabilities and take corrective actions to address them. Administrators can also be more confident in knowing that a well-tested system can operate as designed when adverse conditions arise. Moreover, test engine 150 may automatically and thoroughly explore the fault behavior of any component (independent of type) deployed within system 100.

Figure 25:
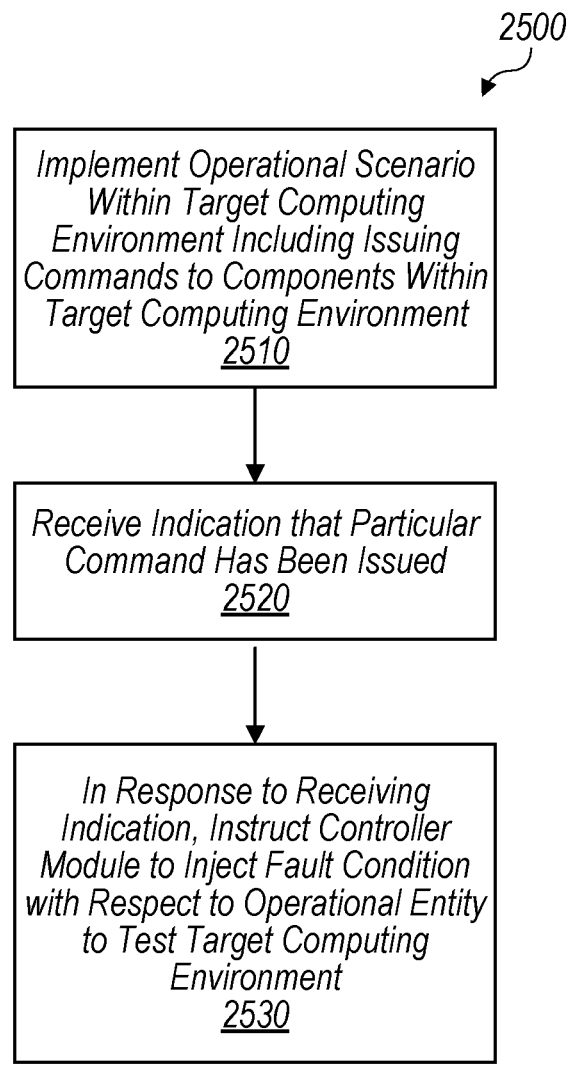
FIG. 25 is a flow diagram illustrating an example method relating to the testing engine, according to some embodiments.

Turning now to FIG. 25, a flow diagram of a method 2500 is shown. Method 2500 is one embodiment of a method performed by a computer system testing a target computing environment such as a computer system including test engine 150. In many instances, performance of method 2500 may be usable to identify issues that, when corrected, improve the resiliency of the target computing environment.

Method 2500 begins in step 2510 with the computer system implementing an operational scenario within a target computing environment having a hierarchy of components including controller modules (e.g., controller modules 120) and operational entities (e.g., operational entities 110). In various embodiments, the implementing includes issuing a set of commands to components within the target computing environment. In step 2520, the computer system receives an indication (e.g., command indication 2416) that a particular one of the set of commands has been issued. In step 2530, in response to receiving the indication, the computer system instructs (e.g., via a perturb instruction 2418) one of the controller modules to inject a fault condition with respect to one of the operational entities to test the target computing environment.

In various embodiments, method 2500 further includes the computer system collecting metadata (e.g., pre-scan graph 2420) about a first state of the target computing environment before injection of the fault condition, collecting metadata (e.g., post-scan 2430) about a second state of the target computing environment after injection of the fault condition, and comparing the metadata about the first state and the metadata about the second state to determine an effect of the fault condition. In some embodiments, the computer system assembles a first graph data structure from the collected metadata about the first state, assembles a second graph data structure from the collected metadata about the second state, and compares the first graph data structure with the second graph data structure. In some embodiments, the computer system determines, based on the received indication, that the particular command is associated with an update process to update one or more of the components in the hierarchy and selects a fault condition to attempt to interfere with the update process. In one such embodiment, the selected fault condition includes terminating execution of an operational entity being updated during the update process. In one such embodiment, the selected fault condition includes increasing a latency for communications with an operational entity being updated during the update process.

In various embodiments, method 2500 further includes the computer system performing a discovery operation (e.g., via requests 2412 and responses 2414) to identify a set of injectable fault conditions supported by the controller modules and, based on the particular issued command, selecting one of the set of injectable fault conditions for injection by the instructed controller module. In some embodiments, the discovery operation includes the computer system contacting an orchestrator (e.g., orchestrator controller module 120) of the hierarchy to determine identities of one or more of the controller modules, the orchestrator being a controller module that issues commands to other controller modules. In some embodiments, the discovery operation includes the computer system sending, based on the determined identities and to the one or more controller modules, requests asking for the one or more controller modules to identify injectable fault conditions supported by the one or more controller modules. In some embodiments, the computer system maintains history information identifying previously injected fault conditions and, based on the history information, determines a respective difference score for each of the set of injectable fault conditions, each difference score being indicative of a difference of that fault condition relative to the previously injected fault conditions. In such an embodiment, the selecting of the fault condition for injection is further based on the determined difference scores.

Exemplary Computer System

Figure 26:
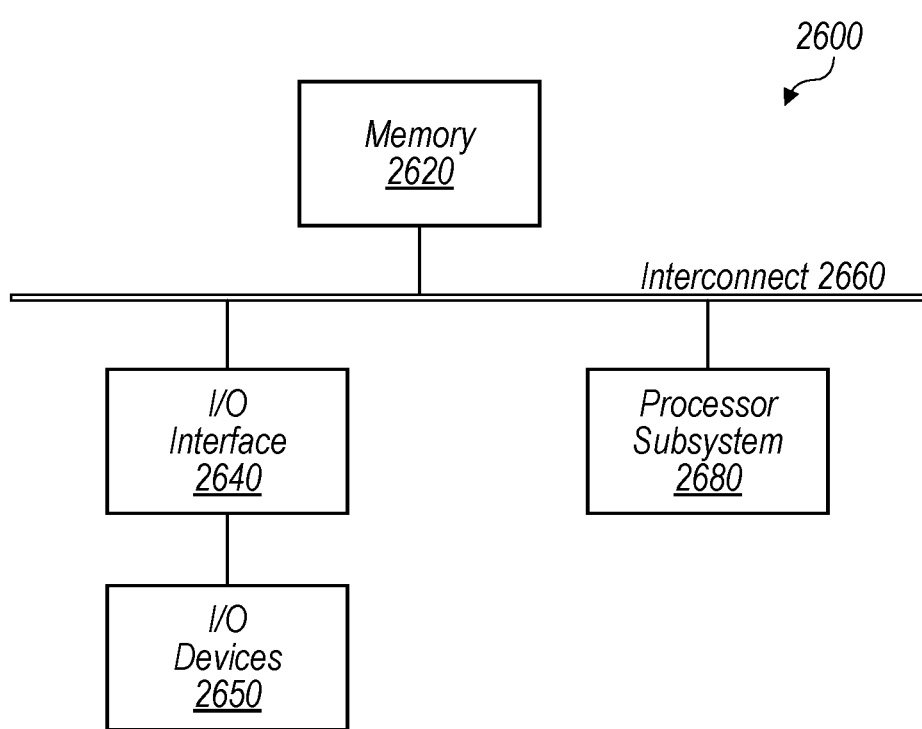
FIG. 26 is a block diagram illustrating an example computer system, according to some embodiments.

Turning now to FIG. 26, a block diagram of an exemplary computer system 2600, which may implement a system 100, operational entity 110, controller module 120, database 130, and/or authorization service 140, is depicted. Computer system 2600 includes a processor subsystem 2680 that is coupled to a system memory 2620 and I/O interfaces(s) 2640 via an interconnect 2660 (e.g., a system bus). I/O interface(s) 2640 is coupled to one or more I/O devices 2650. Computer system 2600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 2600 is shown in FIG. 26 for convenience, system 2600 may also be implemented as two or more computer systems operating together.

Processor subsystem 2680 may include one or more processors or processing units. In various embodiments of computer system 2600, multiple instances of processor subsystem 2680 may be coupled to interconnect 2660. In various embodiments, processor subsystem 2680 (or each processor unit within 2680) may contain a cache or other form of on-board memory.

System memory 2620 is usable store program instructions executable by processor subsystem 2680 to cause system 2600 perform various operations described herein. System memory 2620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 2600 is not limited to primary storage such as memory 2620. Rather, computer system 2600 may also include other forms of storage such as cache memory in processor subsystem 2680 and secondary storage on I/O Devices 2650 (e.g., a hard drive, storage array, etc.). In some embodiments, these other forms of storage may also store program instructions executable by processor subsystem 2680. In some embodiments, program instructions that when executed implement operational entity 110, controller module 120, database 130, authorization service 140, and/or test engine 150 may be included/stored within system memory 2620.

I/O interfaces 2640 may be any of various types of interfaces configured to couple to and communicate with other devices, according to various embodiments. In one embodiment, I/O interface 2640 is a bridge chip (e.g., Southbridge) from a front-side to one or more back-side buses. I/O interfaces 2640 may be coupled to one or more I/O devices 2650 via one or more corresponding buses or other interfaces. Examples of I/O devices 2650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 2600 is coupled to a network via a network interface device 2650 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    accessing, by an orchestrator controller module that is executing on a computer system, workflow information that defines a workflow having a set of commands that correspond to a sequence of steps for automatically implementing an operational scenario on a target computer environment having an initial state and a set of components that includes controller modules and operational entities;
    implementing, by the orchestrator controller module, the set of commands of the workflow by issuing instructions to ones of the set of components to cause the sequence of steps to be carried out, wherein implementing the set of commands causes one or more state changes in the target computer environment relative to the initial state; and
    maintaining, by the orchestrator controller module, state information that identifies a current state of the target computer environment that permits the orchestrator controller module to respond to an error in implementing the set of commands, wherein the state information is maintained at a database that is external to the orchestrator controller module such that the state information is maintained in an event that the orchestrator controller module crashes.

2. The method of claim 1, wherein the set of commands are defined such that ones of the set of commands enable the orchestrator controller module to:
    transition the target computer environment from the initial state to a specified end state; and
    transition the target computer environment from the current state back to the initial state.

3. The method of claim 2, wherein the error prevents the set of commands from being completed, and wherein responding to the error includes:
    reversing, by the orchestrator controller module, the one or more state changes in the target computer environment to return the target computer environment to the initial state.

4. The method of claim 3, wherein reversing the one or more state changes includes:
    traversing, by the orchestrator controller module, backwards through an order in which ones of the set of commands have been completed; and
    while performing the traversing, the orchestrator controller module undoing the one or more state changes caused by those commands that have been completed.

5. The method of claim 1, wherein the error includes the orchestrator controller module crashing while implementing the set of commands, and wherein the state information allows for a reinstated orchestrator controller module to subsequently resume implementation of the set of commands.

6. The method of claim 1, further comprising:
    receiving, by the orchestrator controller module, a request to perform the operational scenario, wherein the request specifies a name value corresponding to the workflow that permits the workflow information to be accessed.

7. The method of claim 1, wherein the one or more state changes in the target computer environment include a state change in which a particular component of the set of components instantiates a new component in the target computer environment, wherein the new component has a different role in the target computer environment than the particular component.

8. The method of claim 1, wherein the operational scenario includes starting up a database service having one or more database servers capable of performing database transactions on behalf of users of the computer system.

9. A non-transitory computer readable medium having program instructions stored thereon that are capable of causing a computer system to implement an orchestrator controller module that is capable of performing operations comprising:
    accessing workflow information that defines a workflow having a set of commands that correspond to a sequence of steps for implementing an operational scenario on a target computer environment having an initial state and a set of components that includes controller modules and operational entities;

implementing the set of commands of the workflow by issuing instructions to ones of the set of components to cause the sequence of steps to be carried out, wherein implementing the set of commands causes one or more state changes in the target computer environment relative to the initial state; and maintaining state information that identifies a current state of the target computer environment that permits the orchestrator controller module to respond to an error in implementing the set of commands, wherein the state information is maintained at a database that is external to the orchestrator controller module such that the state information is maintained in an event that the orchestrator controller module crashes.

10. The medium of claim 9, wherein the operations further comprise:
in response to detecting that a particular step of the sequence of steps failed to be carried out, reattempting the particular step by reissuing, to ones of the set of components, one or more instructions corresponding to the particular step.

11. The medium of claim 9, wherein the operations further comprise:
in response to detecting that a particular step of the sequence of steps cannot be carried out, reversing the one or more state changes in the target computer environment to return the target computer environment to the initial state.

12. The medium of claim 9, wherein the set of commands are defined such that the set of commands can be traversed in a forward order to transition the target computer environment from the initial state to an end state and traversed in a backwards order to transition the target computer environment from a current state to the initial state.

13. A method, comprising:
executing, by a computer system, a hierarchy of components having controller modules and operational entities, wherein the hierarchy includes an orchestrator controller module at a top level of the hierarchy that is executable to implement an operational scenario by carrying out a set of commands that correspond to a sequence of steps of the operational scenario; and in response to receiving a request to implement a particular operational scenario for a target computer environment having an initial state and a set of components of the hierarchy, the orchestrator controller module implementing a workflow having commands corresponding to the particular operational scenario, wherein implementing the workflow includes:
issuing instructions to ones of the controller modules in the hierarchy to cause the commands of the workflow to be carried out such that one or more state changes are made to the target computer environment relative to the initial state; and maintaining state information identifying a current state of the target computer environment that permits a response to an error in implementing the workflow, wherein the error includes the orchestrator controller module hanging while implementing the workflow, wherein the state information permits a reinstated orchestrator controller module to subsequently resume implementation of the workflow.

14. The method of claim 13, wherein issuing the instructions causes a particular controller module within the hierarchy to implement a second, different workflow, wherein the workflow and the second workflow form a hierarchy of workflows that includes the workflow at a top level of the hierarchy of workflows and the second workflow at a next level of the hierarchy of workflows.

15. The method of claim 14, wherein the particular controller module is operable to implement the second workflow by issuing instructions to components in a next level of the hierarchy of components relative to a level that includes the particular controller module.

16. The method of claim 13, wherein the state information specifies configuration variables for the set of components included in the target computer environment.

* * * * *